US010275121B1

(12) United States Patent
Geiger et al.

(10) Patent No.: US 10,275,121 B1
(45) Date of Patent: Apr. 30, 2019

(54) SYSTEMS AND METHODS FOR CUSTOMIZED AVATAR DISTRIBUTION

(71) Applicant: BLEND SYSTEMS, INC., San Francisco, CA (US)

(72) Inventors: Matthew J. Geiger, South San Francisco, CA (US); Akash R. Nigam, San Francisco, CA (US); Evan K. Rosenbaum, San Francisco, CA (US)

(73) Assignee: GENIES, INC., Venice, CA (US)

(*) Notice: Subject to any disclaimer, the term of this patent is extended or adjusted under 35 U.S.C. 154(b) by 0 days.

(21) Appl. No.: 15/793,236

(22) Filed: Oct. 25, 2017

Related U.S. Application Data

(60) Provisional application No. 62/573,593, filed on Oct. 17, 2017.

(51) Int. Cl.
| | |
|---|---|
| *G06F 3/0482* | (2013.01) |
| *H04L 29/08* | (2006.01) |
| *H04L 29/06* | (2006.01) |
| *G06Q 30/02* | (2012.01) |

(52) U.S. Cl.
CPC ...... *G06F 3/0482* (2013.01); *H04L 29/06176* (2013.01); *H04L 29/08306* (2013.01); *G06Q 30/0269* (2013.01)

(58) Field of Classification Search
CPC ..... G06T 13/40; G06Q 30/0269; H04L 51/12; G04L 51/32
See application file for complete search history.

(56) References Cited

U.S. PATENT DOCUMENTS

| | | |
|---|---|---|
| 6,937,950 B2 | 8/2005 | Cragun et al. |
| 7,409,639 B2 | 8/2008 | Dempski et al. |
| 7,484,176 B2 | 2/2009 | Maravich et al. |

(Continued)

FOREIGN PATENT DOCUMENTS

| | | |
|---|---|---|
| EP | 2391075 A2 | 11/2011 |
| JP | 2015-505249 A | 2/2015 |

(Continued)

OTHER PUBLICATIONS

Gobron, S. et al., "Impact of Nonverbal Facial Cues on Spontaneous Chatting with Virtual Humans," Journal of Virtual Reality and Broadcasting, vol. 19(2013), No. 6.

*Primary Examiner* — Jennifer N To
*Assistant Examiner* — Eric J Yoon
(74) *Attorney, Agent, or Firm* — Morgan, Lewis & Bockius LLP

(57) ABSTRACT

Systems and methods for customizing avatars responsive to events are provided. An event is received and a topical category for the event is determined. A plurality of assets and a scene responsive to the event is obtained. Each such asset determines a position of an avatar in the scene over time. The avatar is associated with a user that has designated an interest in the topical category. The avatar is obtained from a user profile associated with the user. A sticker is formed comprising the scene and an altered version of the avatar. The altered version of the avatar comprises: (i) one or more visible layers that are present in the avatar and (ii) one or more visible layers that are not present in the avatar and that include all or a portion of the plurality of assets, thereby forming a sticker. The sticker is then provided to the user.

32 Claims, 48 Drawing Sheets

(56) References Cited

U.S. PATENT DOCUMENTS

| | | |
|---|---|---|
| 8,388,442 B2 | 3/2013 | Bates et al. |
| 8,635,637 B2 | 1/2014 | Krum et al. |
| 8,836,706 B2 | 9/2014 | Zhao et al. |
| 8,898,687 B2 | 11/2014 | Hulten et al. |
| 8,996,530 B2 | 3/2015 | LuVogt et al. |
| 9,086,776 B2 | 3/2015 | Ye et al. |
| 9,652,134 B2 | 5/2017 | Goossens et al. |
| 9,706,040 B2 | 7/2017 | Kadirvel et al. |
| 2008/0214214 A1 | 9/2008 | Reissmueller et al. |
| 2009/0055484 A1 | 2/2009 | Vuong et al. |
| 2009/0144639 A1 | 6/2009 | Nims et al. |
| 2009/0318773 A1 | 12/2009 | Jung et al. |
| 2010/0115426 A1 | 5/2010 | Liu et al. |
| 2010/0156909 A1* | 6/2010 | Banerjee ............... A63F 13/12 345/469.1 |
| 2011/0072448 A1 | 3/2011 | Stiers et al. |
| 2011/0098109 A1* | 4/2011 | Leake ................. A63F 13/428 463/30 |
| 2011/0225519 A1 | 9/2011 | Glodman et al. |
| 2011/0265018 A1 | 10/2011 | Borst et al. |
| 2012/0130717 A1 | 5/2012 | Xu et al. |
| 2013/0031475 A1 | 1/2013 | Maor et al. |
| 2013/0174052 A1 | 7/2013 | Blattner et al. |
| 2013/0194280 A1* | 8/2013 | Kwon .................... G06T 13/40 345/473 |
| 2013/0257877 A1 | 10/2013 | Davis |
| 2013/0290339 A1 | 10/2013 | LuVogt et al. |
| 2014/0078144 A1* | 3/2014 | Berriman .............. A63F 13/10 345/426 |
| 2014/0129343 A1* | 5/2014 | Finster .............. G06Q 30/0269 705/14.66 |
| 2014/0160149 A1 | 6/2014 | Blackstock |
| 2014/0347368 A1 | 11/2014 | Kishore et al. |
| 2016/0361653 A1 | 12/2016 | Zhang et al. |
| 2017/0046745 A1* | 2/2017 | Zhu ...................... H04W 4/21 |
| 2017/0213378 A1* | 7/2017 | Mandel ................. G06T 13/80 |

FOREIGN PATENT DOCUMENTS

| | | |
|---|---|---|
| KR | 10-2015-0068509 A | 6/2015 |
| WO | WO 2008/109299 A2 | 9/2008 |

\* cited by examiner

Provide, at a time after the selection of the first electronic communication 252, a first affordance. First user 340 selection of the first affordance displays a tool for selection from a plurality of second avatars 238 other than the first avatar 238. Each such second avatar is associated with a different user 340 in a contact list 250 of the first user 340 within the application or an enumerated list of avatars provided by the application, each avatar in the enumerated list of avatars representing a different public figure. Responsive to receiving a selection of one or more second avatars from the plurality of avatars, compile the one or more second avatars from the plurality of avatars into the sticker 256. The forming further comprises concurrently displaying the altered version 258 of the first avatar, the one or more selected second avatars, and an emotion slide bar on the display. First user 340 selection of each different portion of the emotion slide bar provides a different emotion on the altered version 258 of the first avatar and each second avatar in the one or more second avatars from a discrete set of emotions. Responsive to receiving a user swipe of the emotion slide bar, the emotion displayed on the altered version 258 of the first avatar and the one or more selected second avatars is changed to the emotion associated with the different portion of the emotion slide bar in which the user swipe ended.

The first electronic communication 252 is a news article received from a remote publication source.

Provide, at a time after the selection of the first electronic communication 252, a first affordance. Selection of the first affordance by the first user displays a first tool for modifying the sticker 256. The modifying the sticker comprises adding a quote bubble 268, provided by the first user, to the sticker using the first affordance, associating a sound construct 260, selected by the first user, to the sticker 256 using the first affordance, adding the avatar 238 of one or more friends of the first user, and designated by the first user through the first affordance, to the sticker, changing the expression on each avatar 238 in the sticker 256 using the first affordance, adding or removing a prop 262 or background scene 266 to the sticker using the affordance, changing an article of clothing worn by an avatar 238 in the sticker using the affordance, repositioning or rescaling a layer that includes props 262 / backgrounds 266 / clothing using the affordance, changing the bone position of an avatar 238 in the sticker 256 using the first affordance, and/or changing a headline 270 of the sticker using the first affordance.

Concurrently display the first avatar 238 and a second elliptical composer graphic on the display after the first trait 240 is selected. Each different portion of the second elliptical composer graphic provides a different value 242 for a second trait associated with the second elliptical composer graphic. The method further comprises executing a second procedure comprising: (i) displaying on the first avatar the second trait set at a value 242 associated with a respective position of the second elliptical composer graphic selected by the first user 340 without user intervention responsive to the user selection of the respective position of the second elliptical composer graphic, and (ii) associating the value of the first trait with the first avatar 238 that is associated with the position of the second elliptical composer graphic that was selected by the first user 340. This associating displays on the first avatar the second trait set at the selected value 242 of the second trait.

616

The displaying 614 is repeated for each portion of the second elliptical composer graphic contacted by the first user 340 until a break in user contact with the second elliptical composer graphic is detected, and the position of the second elliptical component that is selected by the first user 340 is the position of the second elliptical composer graphic that was last contacted by the first user 340 when the break with the second elliptical component was detected.

618

The method further comprises receiving a specification of a gender of the first avatar 238, including a gender layer 244 on the first avatar from the set of male gender and female gender responsive to the specification of gender from the first user 340, receiving a selection of one or more topical categories from an enumerated plurality of topical categories, and associating the one or more topical categories with the first avatar 238.

Receive a selection of a first electronic communication 252 within the application. The first electronic communication 252 is associated with a topical category 248 in the one or more topical categories. Form a sticker comprising an altered version 258 of the first avatar responsive to the selection of the first electronic communication 252. The altered version of the first avatar comprises one or more visible layers that are present in the first avatar and one or more visible layers that are not present in the first avatar. Provide the sticker to one or more other users 340 using the application.

622

The first electronic communication 252 is selected from among a plurality of electronic communications by the first user 340. Each electronic communication in the plurality of electronic communications is associated with a category 248 in the one or more topical categories.

624

The forming the sticker 256 comprises concurrently displaying the altered version 258 of the first avatar and an emotion slide bar on the display. First user selection of each different portion of the emotion slide bar displays a different emotion on the altered version 258 of the first avatar from a discrete set of emotions and, responsive to receiving a user swipe of the emotion slide bar, the different emotion displayed on the altered version 258 of the first avatar is changed to the emotion associated with the different portion of the emotion slide bar in which the user swipe ended.

626

The altered version 258 of the first avatar includes a pair of eyes, a pair of eyelids, a set of lips, and a pair of eyebrows. Each respective emotion in the discrete set of emotions specifies at least a first characteristic position for the set of lips of the first avatar and a second characteristic position for the pair of eyebrows of the first avatar.

SYSTEMS AND METHODS FOR CUSTOMIZED AVATAR DISTRIBUTION

CROSS REFERENCE TO RELATED APPLICATION

This application claims priority to U.S. Provisional Patent Application No. 62/573,593 entitled "Systems and Methods for Distributing Customized Avatars Responsive to Events," filed Oct. 17, 2017, which is hereby incorporated by reference.

TECHNICAL FIELD

This relates generally to systems and methods for distributing customized avatars responsive to events.

BACKGROUND

Environments that use avatars to represent users typically provide avatar creation tools. Creation of an avatar frequently takes several steps and can be quite labor intensive. Moreover, an avatar created in one environment is often limited to that environment. Environment, in such a context, broadly means any environment where an avatar may be manifested. For example, an environment may be an avatar creation application, video game, social networking website, messaging application, smartphone address book, or any other application where a user may want to have a representation.

Despite the apparent inefficiency of creating avatars, invoking a multiplicity of avatars, each representing the same user, serves a practical purpose. As noted by Blackstock et al. in U.S. patent application Ser. No. 13/979,974, (published as US 2014/0160149 A1 and entitled "System and Method for Adaptable Avatars") just as in real life, digital users exist in multiple contexts and may require different identities in different environments.

There are tools that, once an avatar is made, enable users to use the same avatar in multiple environments, such as one disclosed by Mason et al. in U.S. patent application Ser. No. 12/279,643 (published as US 2010/0011422 A1). However, the mechanisms disclosed by Mason et al., require an avatar to be rendered identically in each environment. While Blackstock et al. in U.S. patent application Ser. No. 13/979, 974, attempt to address such shortcomings, the tools for making an avatar for a user and customizing such avatars for such purposes remain unsatisfactory.

Therefore, what is needed in the art is a solution to address at least some of these limitations.

SUMMARY

The present disclosure details electronic devices and methods that provide faster, more convenient methods for customizing avatars. With the disclosed systems and methods for making avatars, improved systems for distributing such customized avatars are provided in which avatars representing individual users responding to contemporary events are distributed in real time while such contemporary events are still actively trending in an online community.

For instance, in some embodiments, the disclosed systems and methods enable a user of an application to select one or more topical categories from a plurality of categories by a user of an application. Within the application, the user is associated with an avatar representing the user. A selection of an electronic communication, received within the application, is made by the user. The communication, describing an event, is classified into a category in the one or more categories. A sticker comprising an altered version of the avatar is formed responsive to the communication selection. The altered avatar comprises one or more visible layers present in the avatar, prior to alteration, and one or more visible layers not present in the avatar, prior to alteration. The sticker can be provided to one or more other users using the application.

Use of a Contemporary Event to Customize an Avatar.

One aspect of the present disclosure provides a method of customizing a first avatar responsive to an event. The method comprises, in accordance with an application on a first electronic device associated with a first user, where the application includes a first avatar representing the first user, the first electronic device comprising one or more processors, memory, and a display, receiving a selection of one or more topical categories from an enumerated plurality of topical categories. One or more topical categories is associated with the first avatar. A selection of a first electronic communication within the application is received. The selection is made by the first user. The first electronic communication is received by the first user in the application. Further, the first electronic communication is classified into a topical category in the one or more topical categories and describes the event.

The method continues by forming a sticker comprising an altered version of the first avatar responsive to the selection of the first electronic communication by the first user. The altered version of the first avatar comprises one or more visible layers that are present in the first avatar and one or more visible layers that are not present in the first avatar.

The method continues by providing the sticker to one or more other users using the application.

In some embodiments, method further comprises customizing the first avatar prior to selection of the first electronic communication. In some such embodiments, the customizing comprises concurrently displaying the first avatar and a first composer graphic on the display. Each different portion of the first composer graphic provides a different value for a first trait associated with the first composer graphic. In such embodiments, the first avatar includes a face comprising a pair of eyes, a nose, and a set of lips, and the customizing further comprises executing a first procedure comprising (i) displaying on the first avatar the first trait, set at a value associated with a respective portion of the first composer graphic selected by the first user without user intervention responsive to the user selection of the respective portion of the first composer graphic, (ii) repeating the displaying (i) for each portion of the first composer graphic contacted by the first user until a first break in user contact with the first composer graphic is detected, where the repeating occurs at least one time, and (iii) associating the value of the first trait with the first avatar that is associated with the portion of the first composer graphic that was last contacted by the first user when the first break was detected, where the associating displays on the first avatar the first trait set at the value of the first trait associated with the portion of the first composer graphic that was last contacted by the first user when the first break was detected. Moreover, responsive to detection of the first break, the first avatar and a second composer graphic are concurrently posted on the display. Each different portion of the second composer graphic provides a different value for a second trait associated with the second composer graphic. In such embodiments, the method further comprises executing a second procedure comprising: (i) displaying on the first avatar the second trait set at a value associated with a respective portion of the second composer graphic selected by the first user without user intervention responsive to the user selection of the respective portion of the second composer graphic, (ii) repeating the displaying (i) for each portion of the second composer graphic contacted by the first user until a second break in user contact with the second composer graphic is detected, wherein the repeating occurs at least one time, and (iii) associating the value of the second trait with the first avatar that is associated with the portion of the second composer graphic that was last contacted by the first user when the second break was detected, wherein the associating displays on the first avatar the second trait set at the value of the second trait associated with the portion of the second composer graphic that was last contacted by the first user when the second break was detected.

In some embodiments, the first trait or the second trait is one of hair style, ear size, skin color, head shape, eye pupil color, eye pupil size, eye size, rotation of the eyes, height of the eyes on the face, distance between the eyes, ear style, ear size, hair style, hair color, amount of face wrinkles, an amount of cheek indents/dimples, an amount of face pimples, stomach thickness, overall body height, arm length, leg length, foot size, facial hair style, facial hair color, eyebrow length, eyebrow color, eyebrow height, a thickness of eyelashes, an eyelash color, an eyelash length, a nose style, a nose size, a height of the nose on the face, a mouth size, a mouth shape, a height of the mouth on the face, a teeth style, a teeth size, a teeth color, a lip style, a lip size, a lip color, absence or presence of a facial blush, absence or presence of an eyeshadow, an eye shadow color, a shirt, a vest, a jacket, a dress, a skirt, a pair of pants, a pair of shorts, a pair of eye glasses, a hat, a pair of earphones, a necklace, a pair of earrings, a watch, a bracelet, a scarf, or a mask.

In some embodiments, the method further comprises customizing the first avatar prior to selection of the first electronic communication. The customizing comprises receiving a specification of the gender of the first avatar from the first user and including a gender layer on the first avatar, from the set of male gender and female gender, responsive to the specification of gender from the first user.

In some embodiments, the first electronic communication is selected from among a plurality of electronic communications by the first user, and each electronic communication in the plurality of electronic communications is associated with a category in the one or more topical categories. In some embodiments, each respective communication in the plurality of electronic communications includes a different corresponding instance of the altered version of the first avatar customized for the respective communication by addition of one or more layers not present in the first avatar.

In some embodiments, the forming the sticker comprises concurrently displaying the altered version of the first avatar and an emotion slide bar on the display, first user selection of each different portion of the emotion slide bar displays a different emotion on the altered version of the first avatar from a discrete set of emotions, and responsive to receiving a user swipe of the emotion slide bar, the different emotion displayed on the altered version of the first avatar is changed to the emotion associated with the different portion of the emotion slide bar in which the user swipe ended. In some such embodiments, the first avatar includes a pair of eyes, a nose, and a set of lips, a pair of eyebrows, a pair of ears, and a body, and each respective emotion in the discrete set of emotions specifies at least a first characteristic position for the set of lips of the first avatar and a second characteristic position for the pair of eyebrows of the first avatar.

In some embodiments, the method further comprises providing, at a time after the selection of the first electronic communication, a first affordance, where selection of the first affordance by the first user displays a first tool for selection from a plurality of second avatars other than the first avatar, and each second avatar in the plurality of second avatars is associated with a different user in a contact list of the first user within the application or an enumerated list of avatars provided by the application where each avatar in the enumerated list of avatars represents a different public figure. In some embodiments, the contact list avatars and public figure avatars are provided in a merged list. Responsive to receiving a selection of one or more second avatars from the plurality of second avatars, the method further comprises compiling the one or more second avatars into the sticker.

In some embodiments, the method further comprises providing, at a time after the selection of the first electronic communication, a first affordance. Selection of the first affordance by the first user displays a first tool for annotating the sticker with a first user provided expression encapsulated in a bubble.

In some alternative embodiments, the method comprises providing, at a time after the selection of the first electronic communication, a first affordance and a second affordance, where selection of the first affordance by the first user displays a first tool for selection from a plurality of second avatars other than the first avatar, where each second avatar in the plurality of second avatars is associated with a different user in a contact list of the first user within the application or an enumerated list of avatars provided by the application where each avatar in the enumerated list of avatars represents a different public figure. Responsive to receiving a selection of one or more second avatars from the plurality of second avatars, the one or more second avatars from the plurality of avatars is compiled into the sticker. Selection of the second affordance by the first user displays a second tool for annotating the sticker with a first user provided expression encapsulated in a bubble. In some such embodiments, the bubble can move along with one of the avatars in the sticker. Since the scene within the sticker is animated in some embodiments, the bubble follows an anchor point associated with the first or second avatar so that the bubble always appears in the proper position to the first or second avatar in instances where the position of the first or second avatar moves in accordance with such animation.

In some embodiments, a sticker includes a single altered avatar and the bubble moves along with this single avatar in the sticker in instances where the single avatar is animated. Since the scene within the sticker is animated in some embodiments, the bubble follows an anchor point associated with the first avatar in such embodiments so that the bubble always appears in the proper position to the first altered avatar.

In some embodiments, the method further comprises providing, at a time after the selection of the first electronic communication, a first affordance, where selection of the first affordance by the first user displays a first tool for selection from a plurality of second avatars other than the first avatar. Each second avatar in the plurality of second avatars is associated with a different user in a contact list of the first user within the application or an enumerated list of avatars provided by the application. Each avatar in the enumerated list of avatars represents a different public figure and responsive to receiving a selection of one or more second avatars from the plurality of second avatars. The one or more second avatars are compiled from the plurality of avatars into the sticker. The forming further comprises concurrently displaying the altered version of the first avatar, the one or more selected second avatars, and an emotion slide bar on the display. First user selection of each different portion of the emotion slide bar provides a different emotion on the altered version of the first avatar and each second avatar in the one or more second avatars from a discrete set of emotions. Responsive to receiving a user swipe of the emotion slide bar, the emotion displayed on the altered version of the first avatar and the one or more selected second avatars is changed to the emotion associated with the different portion of the emotion slide bar in which the user swipe ended. Moreover, in some embodiments, the user can replace the first altered avatar, which is representing the first user, with a second avatar (from the user's contact list or a public figure avatar). As such, in some embodiments the sticker does not include an altered avatar representing the first user, but rather, includes one or more avatars from the user's contact list and/or public figures.

In some embodiments, the first electronic communication is a news article received from a remote publication source. In some embodiments, the altered version of the first avatar includes a pair of eyes, a pair of eyelids, a set of lips, and a pair of eyebrows, and the altered version of the first avatar is rendered dynamic within the sticker by relative movement of the pair of eyes, the pair of eyelids, the set of lips and the pair of eyebrows with respect to the altered version of the first avatar through a repeating pattern of expressions over time. In some such embodiments, the altered version of the first avatar is rendered dynamic within the sticker by any combination of: varying an amount of facial bone deformation in the altered version of the first avatar over time, varying a pupil size in the altered version of the first avatar over time, varying eyelid position in the altered version of the first avatar over time, varying an eye size in the altered version of the first avatar over time, varying pupil position in the altered version of the first avatar over time, varying mouth position in the altered version of the first avatar over time, varying nose position in the altered version of the first avatar over time, varying ear position in the altered version of the first avatar over time, varying a mouth size in the altered version of the first avatar over time, varying a face perspective in the altered version of the first avatar over time, varying a position of the altered version of the first avatar in the sticker over time, varying a scale of the altered version of the first avatar in the sticker over time, or moving a body part of the altered version of the first avatar in the sticker over time. In some such embodiments, the altered version of the first avatar is rendered dynamic within the sticker by at least moving one or more body parts of the altered version of the first avatar in the sticker over time, and the one or more body parts is selected from the group consisting of the arms, the feet, the legs, the hands, the neck, or the head of the altered version of the first avatar. In some embodiments, the scene in the sticker is rendered dynamic through animated props and/or background elements.

In some embodiments, the method further comprises providing, at a time after the selection of the first electronic communication, a first affordance. User election of the first affordance displays a first tool for modifying the sticker. Such modification comprises: adding a quote bubble, provided by the first user, to the sticker using the first affordance, associating a sound construct, selected by the first user, to the sticker using the first affordance, adding the avatar of one or more friends of the first user, and designated by the first user through the first affordance, to the sticker, changing the expression on each avatar in the sticker using the first affordance, adding or removing a prop or background scene to the sticker using the affordance, animating a prop or background scene in the sticker using the affordance, changing an article of clothing worn by an avatar in the sticker using the affordance, repositioning or rescaling a layer that includes props/backgrounds/clothing using the affordance, changing the bone position of an avatar in the sticker using the first affordance, or changing a headline of the sticker using the first affordance. In some such embodiments, natural language processing of the original selected first electronic communication for which the sticker is being built in reaction to is used to recommend props or background elements for the user to add to the sticker. In some embodiments, the disclosed modification comprises, in addition to allowing user adjustment of the body position/expression of an altered avatar, permitting the user to apply an enumerated animation, selected by the user from a plurality of enumerated animations independently to each avatar in the sticker (such as the character walking or jumping). In some such embodiments the plurality of enumerated animations comprises jumping, walking, skipping, hopping, waving, kicking, or stamping a foot. In some embodiments, the sticker includes a sound construct 260 and in some such embodiments the user can add, edit, or remove the sound construct 260. In some such embodiments, the sound construct comprises a sound effect, licensed commercial music, a voiceover (e.g., South Park style remarks), a soundtrack, or any combination thereof. In some embodiments, the disclosed modification comprises: allowing the user to reposition the altered avatars and/or the props 262 or foreground elements 264 within the sticker using the first affordance. In some embodiments, the disclosed modification comprises: allowing the user to independently adjust the Cartesian coordinates, scale, order (on the z axis orthogonal to the plane of the sticker) or rotational orientation of each altered avatar 258, prop 262, foreground element 264, bubble message 268, or headline 270 within the sticker 256 using the first affordance or a collection of first affordances.

In some embodiments, the method further comprises: adding a quote bubble, provided by an entity other than the application or the first user, to the sticker, associating a sound construct, provided by an entity other than the application or the first user, to the sticker, or adding or removing a prop or background scene, provided by an entity other than the application or the first user.

Building an Avatar Using Minimal Human Intervention.

Another aspect of the present disclosure provides a method of customizing an avatar, comprising in accordance with an application on a first electronic device associated with a first user, the first electronic device comprising one or more processors, memory, and a touchscreen display: concurrently displaying a first avatar, representing the first user, and a first composer graphic on the display, where each different portion of the first composer graphic provides a different value for a first trait associated with the first composer graphic. The method comprises executing a first procedure comprising: (i) displaying on the first avatar the first trait set at a value associated with a respective portion of the first composer graphic selected by the first user without user intervention responsive to the user selection of the respective portion of the first composer graphic, (ii) repeating the displaying (i) for each portion of the first composer graphic contacted by the first user until a first break in user contact with the first composer graphic is detected, wherein the repeating occurs at least one time, and (iii) associating the value of the first trait with the first avatar that is associated with the portion of the first composer graphic that was last contacted by the first user when the first break was detected, wherein the associating displays on the first avatar the first trait set at the value of the first trait associated with the portion of the first composer graphic that was last contacted by the first user when the first break was detected. Responsive to detection of the first break, the first avatar and a second composer graphic are concurrently displayed on the display. Each different portion of the second composer graphic provides a different value for a second trait associated with the second composer graphic.

The method further comprises executing a second procedure comprising: (i) displaying on the first avatar the second trait set at a value associated with a respective portion of the second composer graphic selected by the first user without user intervention responsive to the user selection of the respective portion of the second composer graphic, (ii) repeating the displaying (i) for each portion of the second composer graphic contacted by the first user until a second break in user contact with the second composer graphic is detected, where the repeating occurs at least one time, and (iii) associating the value of the second trait with the first avatar that is associated with the portion of the second composer graphic that was last contacted by the first user when the second break was detected. The associating displays on the first avatar the second trait set at the value of the second trait associated with the portion of the second composer graphic that was last contacted by the first user when the second break was detected.

In some embodiments, the first trait or the second trait is one of hair style, ear size, skin color, head shape, eye pupil color, eye pupil size, eye size, rotation of the eyes, height of the eyes on the face, distance between the eyes, ear style, ear size, hair style, hair color, amount of face wrinkles, an amount of cheek indents/dimples, an amount of face pimples, stomach thickness, overall body height, arm length, leg length, foot size, facial hair style, facial hair color, eyebrow length, eyebrow color, eyebrow height, a thickness of eyelashes, an eyelash color, an eyelash length, a nose style, a nose size, a height of the nose on the face, a mouth size, a mouth shape, a height of the mouth on the face, a teeth style, a teeth size, a teeth color, a lip style, a lip size, a lip color, absence or presence of a facial blush, absence or presence of an eyeshadow, an eye shadow color, a shirt, a vest, a jacket, a dress, a skirt, a pair of pants, a pair of shorts, a pair of eye glasses, a hat, a pair of earphones, a necklace, a pair of earrings, a watch, a bracelet, a scarf, or a mask.

In some embodiments, the method further comprise receiving a specification of the gender of the first avatar and including a gender layer on the first avatar from the set of male gender and female gender responsive to the specification of gender from the first user. The method further comprises receiving a selection of one or more topical categories from an enumerated plurality of topical categories and associating the one or more topical categories with the first avatar.

In some embodiments, the method further comprises receiving a selection of a first electronic communication within the application, where the first electronic communication is associated with a topical category in the one or more topical categories, forming a sticker comprising an altered version of the first avatar responsive to the selection of the first electronic communication, where the altered version of the first avatar comprises one or more visible layers that are present in the first avatar and one or more visible layers that are not present in the first avatar, and providing the sticker to one or more other users using the application.

In some embodiments, the first electronic communication is selected from among a plurality of electronic communications by the first user, where each electronic communication in the plurality of electronic communications is associated with a category in the one or more topical categories.

In some embodiments, the forming the sticker comprises concurrently displaying the altered version of the first avatar and an emotion slide bar on the display, first user selection of each different portion of the emotion slide bar displays a different emotion on the altered version of the first avatar from a discrete set of emotions, and responsive to receiving a user swipe of the emotion slide bar, the different emotion displayed on the altered version of the first avatar is changed to the emotion associated with the different portion of the emotion slide bar in which the user swipe ended. In some such embodiments, the altered version of the first avatar includes a pair of eyes, a pair of eyelids, a set of lips, and a pair of eyebrows, and each respective emotion in the discrete set of emotions specifies at least a first characteristic position for the set of lips of the first avatar and a second characteristic position for the pair of eyebrows of the first avatar.

In some embodiments, the altered version of the first avatar includes a pair of eyes, a pair of eyelids, a set of lips, and a pair of eyebrows, and the altered version of the first avatar is rendered dynamic within the sticker by relative movement of the pair of eyes, the pair of eyelids, the set of lips and the pair of eyebrows with respect to the altered version of the first avatar through a repeating pattern of expressions over time.

In some embodiments, the altered version of the first avatar is rendered dynamic within the sticker by any combination of: varying an amount of facial bone deformation, varying a pupil size, varying eyelid position, varying an eye size, varying pupil position, varying mouth position, varying nose position, varying ear position, varying a mouth size, or varying a face perspective in the altered version of the first avatar over time.

In some embodiments, the altered version of the first avatar is rendered dynamic within the sticker by any combination of: varying a position of the avatar in the sticker over time, varying a scale of the altered version of the first avatar in the sticker over time, moving a body part of the altered version of the first avatar in the sticker over time. In some such embodiments, the first avatar is rendered dynamic within the sticker by at least moving one or more body parts of the altered version of the first avatar in the sticker over time, where the one or more body parts is selected from the group consisting of the arms, the feet, the legs, the hands, the neck, or the head of the altered version of the first avatar.

In some embodiments, the method further comprises providing, at a time after the selection of the first electronic communication, a first affordance, where selection of the first affordance by the first user displays a first tool for selection from a plurality of second avatars other than the first avatar, where each second avatar in the plurality of second avatars is associated with a different user in a contact list of the first user within the application or an enumerated list of avatars provided by the application wherein each avatar in the enumerated list of avatars represents a different public figure. Responsive to receiving a selection of one or more second avatars from the plurality of second avatars, the one or more second avatars are compiled into the sticker.

In some embodiments the method further comprises providing, at a time after the selection of the first electronic communication, a second affordance, where selection of the second affordance by the first user displays a second tool for annotating the sticker with a first user provided expression encapsulated in a bubble.

In some embodiments, the method further comprises providing, at a time after the selection of the first electronic communication, a first affordance and a second affordance, where selection of the first affordance by the first user displays a first tool for selection from a plurality of second avatars other than the first avatar, where each second avatar in the plurality of second avatars is associated with a different user in a contact list of the first user within the application or an enumerated list of avatars provided by the application where each avatar in the enumerated list of avatars represents a different public figure and responsive to receiving a selection of one or more second avatars from the plurality of second avatars, compiling the one or more second avatars from the plurality of avatars into the sticker. Selection of the second affordance by the first user displays a second tool for annotating the sticker with a first user provided expression encapsulated in a bubble.

In some embodiments, the method further comprises providing, at a time after the selection of the first electronic communication, a first affordance, where selection of the first affordance by the first user displays a first tool for selection from a plurality of second avatars other than the first avatar, where each second avatar in the plurality of second avatars is associated with a different user in a contact list of the first user within the application or an enumerated list of avatars provided by the application where each avatar in the enumerated list of avatars represents a different public figure and responsive to receiving a selection of one or more second avatars from the plurality of avatars. The one or more second avatars is compiled from the plurality of avatars into the sticker. The forming further comprises concurrently displaying the altered version of the first avatar, the one or more selected second avatars, and an emotion slide bar on the display. First user selection of each different portion of the emotion slide bar provides a different emotion on the altered version of the first avatar and each second avatar in the one or more second avatars from a discrete set of emotions. Responsive to receiving a user swipe of the emotion slide bar, the emotion displayed on the altered version of the first avatar and the one or more selected second avatars are changed to the emotion associated with the different portion of the emotion slide bar in which the user swipe ended.

In some embodiments, the first electronic communication is a news article received from a remote publication source. In some embodiments, the first electronic communication relates to an event that is any one or more of topical news, human interest stories, social news, cultural news, and blend news. Non-limiting examples of topical news types include sports, politics, business, and cultural, etc. Non-limiting examples of topical news includes the announcement of President Trump firing the FBI director, the announcement of the Golden Gate Warriors winning a championship, the announcement of APPLE launching new IPHONE, the announcement of the winner of America's Got Talent show, the announcement of a song going platinum, etc. Non-limiting examples of human interest stories includes things to do over Labor Day weekend, the best food to eat on a weekend, and things to do when it rains. In typical embodiments, social news requires a user needs to authenticate with a participating social networking application such as FACEBOOK, INSTRAGRAM, etc. to get this type of news) and non-limiting examples of such news includes friend's birthdays, friend's relationship status changes, the user's relationship status changes, announcements when you have gotten more than X likes on a post, announcements regarding a friend that got a lot of FACEBOOK "likes" on a FACEBOOK post, announcements regarding which contact of the user got the most FACEBOOK "likes" in the past week etc. Non-limiting examples of cultural news includes announcements regarding "Taco Tuesday", "Hungover," etc. Blend news signifies stickers that are not based on topical news. In some embodiments, an event comprises a requested product placement. In some embodiments, an event comprises a sponsored or otherwise paid for post.

In some embodiments, the first avatar includes a pair of eyes, a pair of eyelids, a set of lips, a pair of eyebrows, a pair of ears, and a body.

In some embodiments, the method further comprises providing, at a time after the selection of the first electronic communication, a first affordance, where selection of the first affordance by the first user displays a first tool for modifying the sticker, where the modifying the sticker comprises: adding a quote bubble, provided by the first user, to the sticker using the first affordance, associating a sound construct, selected by the first user, to the sticker using the first affordance, adding the avatar of one or more friends of the first user, and designated by the first user through the first affordance, to the sticker, changing the expression on each avatar in the sticker using the first affordance, adding or removing a prop or background scene to the sticker using the affordance, changing an article of clothing worn by an avatar in the sticker using the affordance, repositioning or rescaling a layer that includes props/backgrounds/clothing using the affordance, changing the bone position of an avatar in the sticker using the first affordance, or changing a headline of the sticker using the first affordance.

Use of an Elliptical Composer Graphic to Customize an Avatar.

Another aspect of the present disclosure provides a method of customizing a first avatar, comprising in accordance with an application on a first electronic device associated with a first user, the first electronic device comprising one or more processors, memory, and a display, concurrently displaying the first avatar, representing the first user, and a first elliptical composer graphic on the display. Each different position on the first elliptical composer graphic provides a different value for a first trait associated with the first elliptical composer graphic. The method comprises executing a first procedure comprising (i) displaying on the first avatar the first trait set at a value associated with a respective portion of the first elliptical composer graphic selected by the first user without user intervention responsive to the user selection of the respective portion of the first elliptical composer graphic, and (ii) associating the value of the first trait with the first avatar that is associated with the position of the first elliptical composer graphic that was selected by the first user. The associating displays on the first avatar the first trait set at the selected value of the first trait.

In some embodiments, the displaying (i) is repeated for each portion of the first elliptical composer graphic contacted by the first user until a first break in user contact with the first elliptical composer graphic is detected, and the position of the first elliptical composer graphic that is selected by the first user is the position of the first elliptical composer graphic that was last contacted by the first user when the first break was detected.

In some embodiments, the method further comprises concurrently displaying the first avatar and a second elliptical composer graphic on the display after the first trait is selected, where each different portion of the second elliptical composer graphic provides a different value for a second trait associated with the second elliptical composer graphic. In such embodiments, the method further comprises executing a second procedure comprising (i) displaying on the first avatar the second trait set at a value associated with a respective position of the second elliptical composer graphic selected by the first user without user intervention responsive to the user selection of the respective position of the second elliptical composer graphic, and (ii) associating the value of the first trait with the first avatar that is associated with the position of the second elliptical composer graphic that was selected by the first user, wherein the associating displays on the first avatar the second trait set at the selected value of the second trait.

In some embodiments, the displaying (i) is repeated for each portion of the second elliptical composer graphic contacted by the first user until a break in user contact with the second elliptical composer graphic is detected, and the position of the second elliptical component that is selected by the first user is the position of the second elliptical composer graphic that was last contacted by the first user when the break with the second elliptical component was detected.

In some embodiments, the first trait is one of hair style, ear size, skin color, head shape, eye pupil color, eye pupil size, eye size, rotation of the eyes, height of the eyes on the face, distance between the eyes, ear style, ear size, hair style, hair color, amount of face wrinkles, an amount of cheek indents/dimples, an amount of face pimples, stomach thickness, overall body height, arm length, leg length, foot size, facial hair style, facial hair color, eyebrow length, eyebrow color, eyebrow height, a thickness of eyelashes, an eyelash color, an eyelash length, a nose style, a nose size, a height of the nose on the face, a mouth size, a mouth shape, a height of the mouth on the face, a teeth style, a teeth size, a teeth color, a lip style, a lip size, a lip color, absence or presence of a facial blush, absence or presence of an eyeshadow, an eye shadow color, a shirt, a vest, a jacket, a dress, a skirt, a pair of pants, a pair of shorts, a pair of eye glasses, a hat, a pair of earphones, a necklace, a pair of earrings, a watch, a bracelet, a scarf, or a mask.

In some embodiments, the method further comprises receiving a specification of a gender of the first avatar. A gender layer is included on the first avatar from the set of male gender and female gender responsive to the specification of gender from the first user. A selection of one or more topical categories from an enumerated plurality of topical categories is also received and associated with the first avatar.

In some embodiments, the method further comprises receiving a selection of a first electronic communication within the application, wherein the first electronic communication is associated with a topical category in the one or more topical categories. A sticker is formed that comprises an altered version of the first avatar responsive to the selection of the first electronic communication. The altered version of the first avatar comprises one or more visible layers that are present in the first avatar and one or more visible layers that are not present in the first avatar. The sticker is made available to one or more other users using the application, typically by making the sticker available to applications such as SNAPCHAT, text messaging, FACEBOOK, etc.

In some embodiments, the first electronic communication is selected from among a plurality of electronic communications by the first user, and each electronic communication in the plurality of electronic communications is associated with a category in the one or more topical categories.

In some embodiments, the forming the sticker comprises concurrently displaying the altered version of the first avatar and an emotion slide bar on the display, first user selection of each different portion of the emotion slide bar displays a different emotion on the altered version of the first avatar from a discrete set of emotions, and responsive to receiving a user swipe of the emotion slide bar, the different emotion displayed on the altered version of the first avatar is changed to the emotion associated with the different portion of the emotion slide bar in which the user swipe ended.

In some embodiments, the altered version of the first avatar includes a pair of eyes, a pair of eyelids, a set of lips, and a pair of eyebrows, and each respective emotion in the discrete set of emotions specifies at least a first characteristic position for the set of lips of the first avatar and a second characteristic position for the pair of eyebrows of the first avatar.

In some embodiments, the altered version of the first avatar includes a pair of eyes, a pair of eyelids, a set of lips, and a pair of eyebrows, and the altered version of the first avatar is rendered dynamic within the sticker by relative movement of the pair of eyes, the pair of eyelids, the set of lips and the pair of eyebrows with respect to the altered version of the first avatar through a repeating pattern of expressions over time.

In some embodiments, the altered version of the first avatar is rendered dynamic within the sticker by any combination of: varying an amount of facial bone deformation, varying a pupil size, varying an eyelid position, varying an eye size, varying a pupil position, varying a mouth position, varying a nose position, varying an ear position, varying a mouth size, or varying a face perspective in the altered version of the first avatar over time.

In some embodiments, the altered version of the first avatar is rendered dynamic within the sticker by any combination of: varying a position of the avatar in the sticker over time, varying a scale of the altered version of the first avatar in the sticker over time, moving a body part of the altered version of the first avatar in the sticker over time.

In some embodiments, the first avatar is rendered dynamic within the sticker by at least moving one or more body parts of the altered version of the first avatar in the sticker over time, wherein the one or more body parts is selected from the group consisting of the arms, the feet, the legs, the hands, the neck, or the head of the altered version of the first avatar.

In some embodiments, the method further comprises providing, at a time after the selection of the first electronic communication, a first affordance, wherein selection of the first affordance by the first user displays a first tool for selection from a plurality of avatars other than the first avatar, wherein each avatar in the plurality of avatars is associated with a different user in a contact list of the first user within the application. Responsive to receiving a selection of one or more second avatars from the plurality of avatars, compiling the one or more second avatars into the sticker.

In some embodiments, the method further comprises providing, at a time after the selection of the first electronic communication, a second affordance, where selection of the second affordance by the first user displays a second tool for annotating the sticker with a user provided expression encapsulated in a bubble.

In some embodiments, the method further comprises providing, at a time after the selection of the first electronic communication, a first affordance and a second affordance. Selection of the first affordance by the first user displays a first tool for selection from a plurality of avatars other than the first avatar. Each avatar in the plurality of avatars is associated with a different user in a contact list of the first user within the application or an enumerated list of avatars provided by the application wherein each avatar in the enumerated list of avatars represents a different public figure. Responsive to receiving a selection of one or more second avatars from the plurality of avatars, the one or more second avatars from the plurality of avatars is compiled into the sticker. Selection of the second affordance by the first user displays a second tool for annotating the sticker with a first user provided expression encapsulated in a bubble.

In some embodiments, the method further comprises providing, at a time after the selection of the first electronic communication, a first affordance, where selection of the first affordance by the first user displays a first tool for selection from a plurality of second avatars other than the first avatar. Each second avatar in the plurality of avatars is associated with a different user in a contact list of the first user within the application or an enumerated list of avatars provided by the application wherein each avatar in the enumerated list of avatars represents a different public figure. Responsive to receiving a selection of one or more second avatars from the plurality of avatars by the first user, the one or more second avatars are compiled from the plurality of avatars into the sticker. In such embodiments, the forming further comprises concurrently displaying the altered version of the first avatar, the one or more selected second avatars, and an emotion slide bar on the display. First user selection of each different portion of the emotion slide bar provides a different emotion on the altered version of the first avatar and the one or more selected second avatars from a discrete set of emotions. Responsive to receiving a user swipe of the emotion slide bar, the emotion displayed on the altered version of the first avatar and the one or more selected second avatars is changed to the emotion associated with the different portion of the emotion slide bar in which the user swipe ended.

In some embodiments, the first electronic communication is a news article received from a remote publication source.

In some embodiments, the first avatar includes a pair of eyes, a nose, a set of lips, a pair of eyebrows, a pair of ears, and a body.

In some embodiments, the method further comprises providing, at a time after the selection of the first electronic communication, a first affordance, where selection of the first affordance by the first user displays a first tool for modifying the sticker, where the modifying the sticker comprises: adding a quote bubble, provided by the first user, to the sticker using the first affordance, adding the avatar of one or more friends of the first user, and designated by the first user through the first affordance, to the sticker, changing the expression on each avatar in the sticker using the first affordance, adding or removing a prop or background scene to the sticker using the affordance, changing an article of clothing worn by an avatar in the sticker using the affordance, repositioning or rescaling a layer that includes props/backgrounds/clothing using the affordance, changing the bone position of an avatar in the sticker using the first affordance, or changing a headline of the sticker using the first affordance.

Server Implementations and Bridge Tool.

Another aspect of the present disclosure provides a method of customizing avatars responsive to a plurality of events. The method comprises A) receiving a first event in the plurality of events, B) determining a first topical category for the first event from among a plurality of topical categories, C) obtaining a plurality of assets responsive to the first event, where the plurality of assets determines a position on a first avatar in a scene over time, and where the first avatar is associated with a first user that has designated an interest in the first topical category, D) obtaining the first avatar from a user profile associated with the first user, E) forming a sticker comprising an altered version of the first avatar, where the altered version of the first avatar comprises: (i) one or more visible layers that are present in the first avatar and (ii) one or more visible layers that are not present in the first avatar and that include all or a portion of the plurality of assets thereby forming a sticker, and F) providing the sticker to the first user along with a first electronic communication that describes the first event. In some embodiments, the user can use the bridge tool to add sprite sheet animations for props 262, background elements 266, body animations for the one or more altered avatars. In some embodiments, the user can use the bridge tool to add a sound construct 260 to the sticker 256. In some embodiments, the user can choose from among different versions of the background 266 to support different numbers of altered avatars in the sticker 256 (backgrounds 266 suitable for single altered avatars 258 in the sticker 256, backgrounds 266 suitable for two altered avatars 258 in the sticker, etc.). In some embodiments, the user can specify dynamic rules for how the background 266 is to adjust to support varying numbers of altered avatars 258 in the sticker 256.

In some such embodiments, one or more visible layers that are not present in the first avatar and that include all or a portion of the plurality of assets comprises a gender layer that customizes the altered version of the first avatar in accordance with a gender of the first user.

In some embodiments, one or more visible layers that are not present in the first avatar and that include all or a portion of the plurality of assets comprises one or more assets that are tinted to a skin color of the first avatar that is specified in the user profile associated with the first user.

In some embodiments, the forming specifies the Cartesian coordinates of a body part of the first avatar in a background scene over time.

In some embodiments, the body part is a torso, a hand, a finger, a thumb, a pelvis, a foot, a leg, or an arm of the first avatar.

In some embodiments, the method further comprises previewing the sticker prior to providing the sticker to the first user.

In some embodiments, the obtaining D), forming E), and providing F) is performed for each respective user in a plurality of users that has user that has designated an interest in the first topical category. In some such embodiments, more than 1000 users have designated an interest in the first topical category.

In some embodiments, the receiving A), determining B), obtaining C), obtaining D), forming E), and providing F) is performed for a second event in the plurality of events, wherein the second event has a different topical category than the first event.

In some embodiments, the first event is a news article received from a remote publication source.

In some embodiments, the altered version of the first avatar includes a pair of eyes, a pair of eyelids, a set of lips, and a pair of eyebrows, and the altered version of the first avatar is rendered dynamic within the sticker by relative movement of the pair of eyes, the pair of eyelids, the set of lips and the pair of eyebrows with respect to the altered version of the first avatar through a repeating pattern of expressions over time.

In some embodiments, the altered version of the first avatar is rendered dynamic within the sticker by any combination of: varying an amount of facial bone deformation, varying a pupil size, varying eyelid position, varying an eye size, varying pupil position, varying mouth position, varying nose position, varying ear position, varying a mouth size, or varying a face perspective in the altered version of the first avatar, thereby effecting a repeating pattern of expressions over time.

In some embodiments, the altered version of the first avatar is rendered dynamic within the sticker by any combination of: varying a position of the altered version of the first avatar in the sticker over time, varying a scale of the altered version of the first avatar in the sticker over time, or moving a body part of the altered version of the first avatar in the sticker over time. In some embodiments, the altered version of the first avatar is rendered dynamic within the sticker by at least moving one or more body parts of the altered version of the first avatar in the sticker over time, wherein the one or more body parts is selected from the group consisting of the arms, the feet, the legs, the hands, the neck, or the head of the altered version of the first avatar.

Use of Social Media Data.

Another aspect of the present disclosure provides a method of customizing a first avatar. In accordance with an application on a first electronic device associated with a first user, the application including a first avatar representing the first user, and where the first user has authenticated with a social networking application, the first electronic device comprising one or more processors, memory, and a display: there is acquired, from the social networking application, social media data pertaining to the first user, such as such as who in the user's friend group got the most likes. As such, the social media data comprises an event associated with the first user (such as such as who in the user's friend group got the most likes). A sticker is formed comprising an altered version of the first avatar responsive to the event. The altered version of the first avatar comprises one or more visible layers that are present in the first avatar and one or more visible layers that are not present in the first avatar. The sticker is provided to the first user. In some embodiments, the method further comprises enabling the first user to modify the sticker using any of the tools described in the present disclosure of the other embodiments. In some embodiments, the method further comprises enabling the first user to share the sticker with one or more other users, for example, through FACEBOOK MESSENGER, TWITTER, SNAPCHAT, and/or iMESSAGE, etc.

Electronic Device Embodiments.

In accordance with some embodiments, an electronic device includes a display, one or more processors, memory, and one or more programs. The one or more programs are stored in the memory and are configured to be executed by the one or more processors. The one or more programs include instructions for performing or causing performance of the operations of any of the methods described herein.

Non-Transitory Computer Readable Media Embodiments.

In accordance with some embodiments, a nontransitory computer readable storage medium has stored therein instructions which when executed by an electronic device with a display, a memory, and one or more processors to execute one or more programs stored in the memory, cause the device to perform or cause performance of the operations of any of the methods described herein.

In accordance with some embodiments, a graphical user interface on an electronic device with a display, a memory, and one or more processors to execute one or more programs stored in the memory, includes one or more of the elements displayed in any of the methods described herein, which are updated in response to inputs, as described in any of the methods described herein.

Thus, electronic devices with displays are provided with faster, more efficient methods and interfaces for customizing and distributing avatars.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A, 5B, 5C, 5D, 5E, and 5F are flow diagrams collectively illustrating a method of customizing an avatar in accordance with some embodiments.

FIGS. 6A, 6B, 6C, 6D, 6E, and 6F are flow diagrams collectively illustrating a method of customizing an avatar in accordance with some embodiments.

Figure 1:
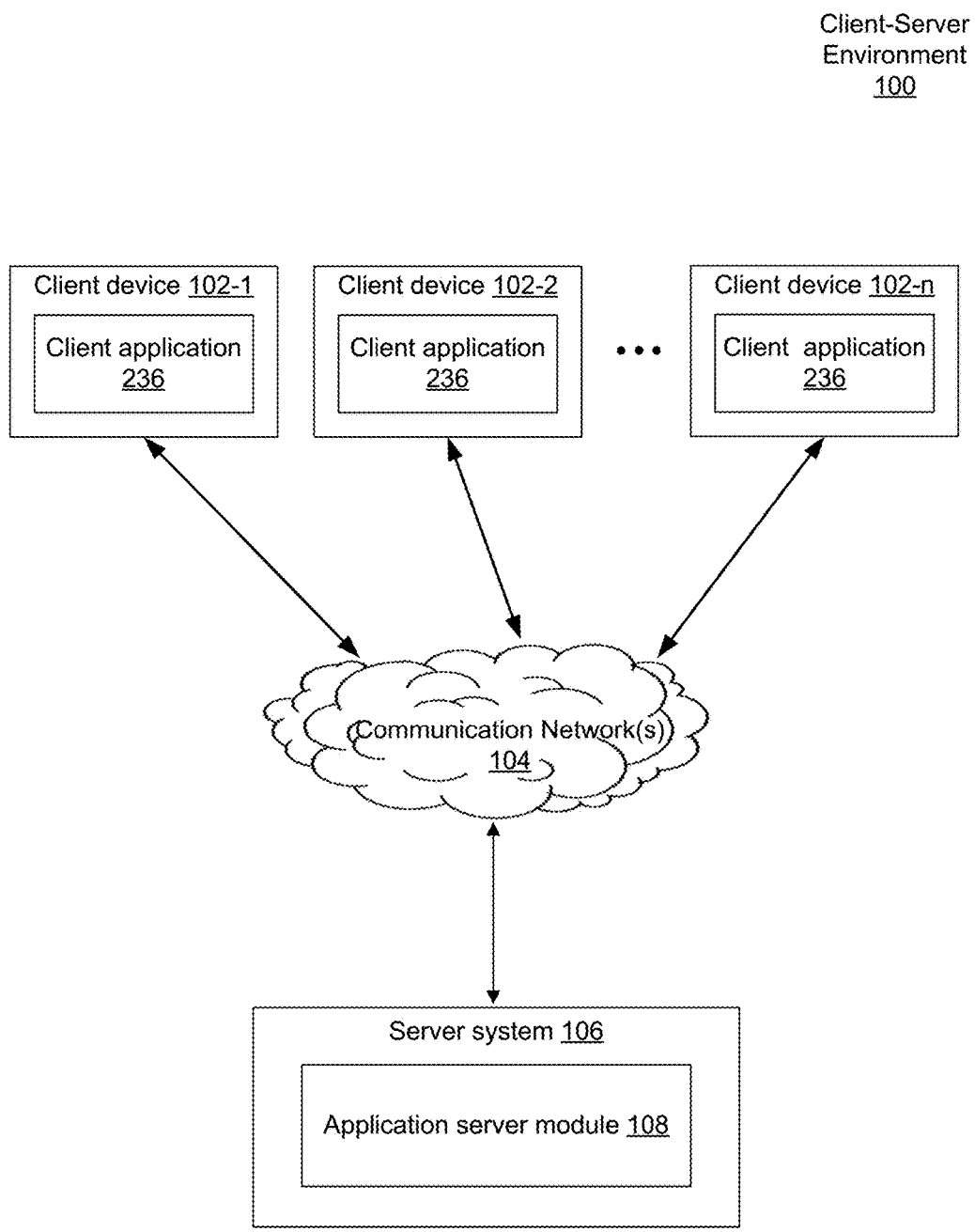
FIG. 1 illustrates a network architecture in accordance with some implementations.

In the Figures, dashed boxes represent optional embodiments.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first message could be termed a second message, and, similarly, a second message could be termed a first message, without departing from the scope of the present disclosure. The first message and the second message are both messages, but they are not the same message.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "exemplary" is used in the sense of "serving as an example, instance, or illustration" and not in the sense of "representing the best of its kind."

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers are, optionally, used. It should also be understood that, in some embodiments, the device is not a portable communications device, but is a desktop computer.

A detailed description of a system 100 for customizing a first avatar responsive to an event, in accordance with the present disclosure, is described in conjunction with FIGS. 1 through 19.

Figure 2:
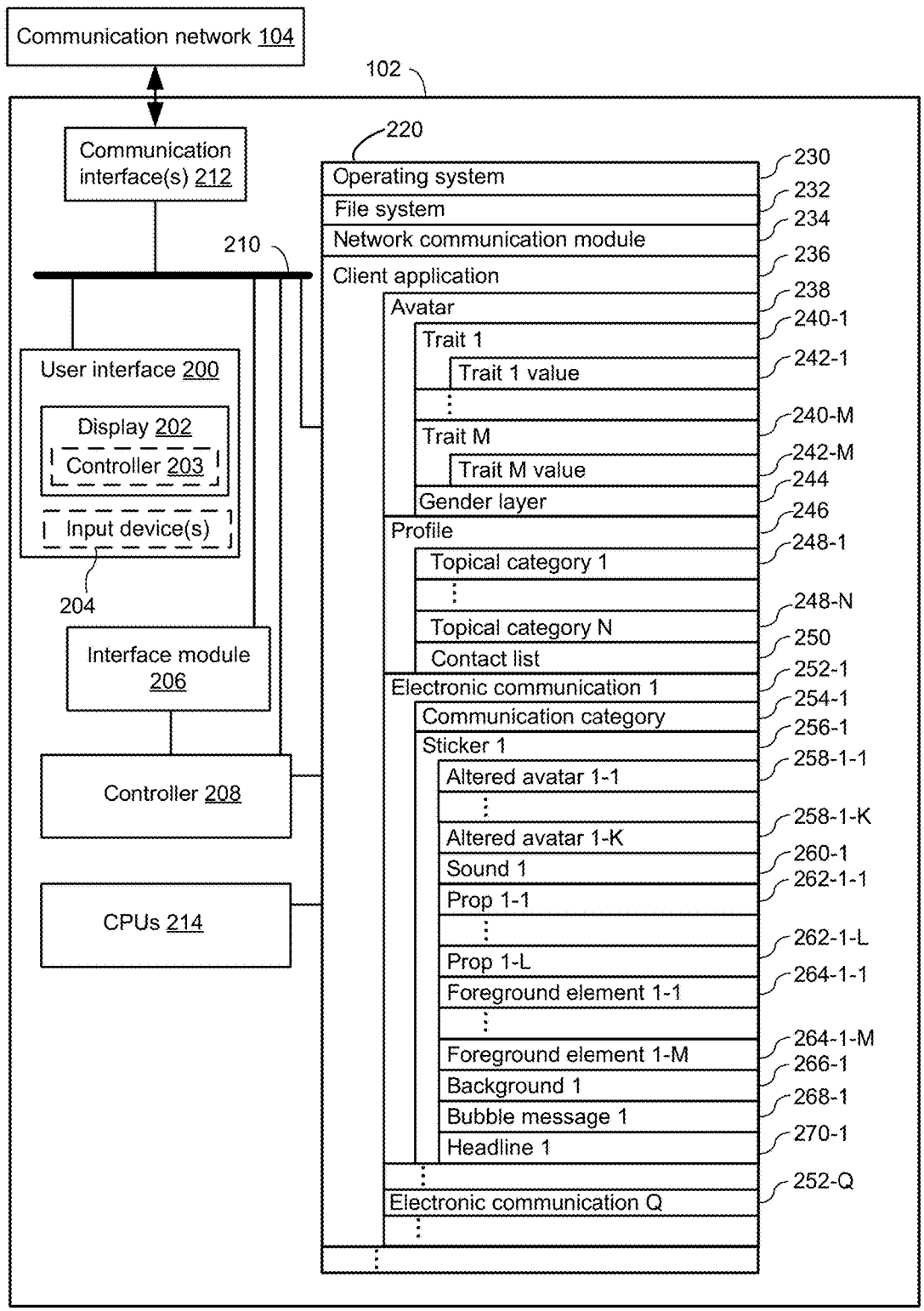
FIG. 2 is a block diagram illustrating an electronic client device in accordance with some embodiments.

In particular, FIG. 1 is a block diagram illustrating an exemplary network architecture of a client-server environment 100 in accordance with some embodiments. The client-server environment 100 includes a number of client devices (e.g., personal electronic devices) 102-1, 102-2, . . . 102-n, each storing instructions for a client application 236 in memory 220 (FIG. 2). The client devices 102 are connected to a server system 106, storing an application server module 108 associated with the client application 236 in memory 306 (FIG. 3), by one or more networks 104 (e.g., the Internet, cellular telephone networks, mobile data networks, other wide area networks, local area networks, metropolitan area networks, etc.). In some embodiments, the one or more networks 104 include a public communication network (e.g., the Internet and/or a cellular data network), a private communications network (e.g., a private LAN or leased lines), or a combination of such communication networks.

A respective client device 102 is any suitable computing device that, in some implementations, is capable of connecting to the communication network(s) 104, receiving from the server system 106 electronic communications and proposed altered versions of avatars from the server system 106, sending to the server system requests, and presenting, managing, and inputting/editing stickers or avatars. In some implementations, the client device 102 is a smart phone, a mobile phone, a tablet device, a computing device of a vehicle of a user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), a desktop computer, a laptop computer, a netbook computer, a gaming device, a multimedia player device, or any other device that is capable of receiving messages, as well as presenting (e.g., displaying), managing, and inputting/editing messages and/or stickers and/or avatars. In some implementations, the client device 102 includes an image capture device (e.g., a camera).

Messages from the server system 106 are sent to a respective client device 102 when there is a match between the topical categories of such messages and the topical categories that have been designated of interest by the user associated with the respective client device 102. In some implementations, the server system 106 includes an application server module 108. The application server module 108 sends each respective client device 102 messages when there is a match between the topical categories of such messages and the topical categories that have been designated of interest by the user of the respective client device 102. In some embodiments, the application server module 108 sends an altered version of the avatar of the user of the respective client device 102 for each such message. That is, each message sent to the user of a respective client device includes an altered version of the user's avatar, where the altered version of the avatar appears to be reacting to the message. For instance, if the message pertains to a news event, the altered version of the avatar appears to be reacting to the news event.

In some embodiments, the server system 106 is a single computing device such as a computer server, while in other embodiments, the server system 106 is implemented by multiple computing devices working together to perform the actions of a server system (e.g., cloud computing). Users employ the client devices 102 to access the application server module 108 at the server system 106 and to receive messages and altered versions of avatars. For example, a user of one of the client devices 102-1 executes application 236. A user first customizes their profile by making a selection of one or more topical categories from an enumerated plurality of topical categories. These one or more topical categories are associated with the user's avatar in the user's profile. The application server module 108 takes note of the one or more topical categories associated with the user's avatar in the user's profile and uses these one or more topical categories to determine which electronic communications to send to the user's application 236 for possible selection by the user by matching the category of such electronic communications to the one or more topical categories selected by the user of the application 236. Each of these respective electronic communications includes an altered version of the user's avatar reacting to the respective electronic communication. Moreover, each of the electronic communications describes a recent event (e.g., a newsworthy event that has happened in the past five minutes, the past half hour, the past hour, the past day, or the past week, and/or an event that have been trending on top charts of social medial applications such as TWITTER or FACEBOOK within the past half hour, the past hour, the past day, or the past week). The user, at application 236, makes a selection of one of the offered electronic communication within the application 236. The user uses the application 236 to select one such communication, and responsive to this selection, a sticker is formed comprising the altered version of the first avatar. The altered version of the first avatar comprises one or more visible layers that are present in the first avatar and one or more visible layers that are not present in the first avatar. The user provides the sticker to one or more other users using the application. For instance, the user may forward the sticker to contacts of the user within one or more social applications to which that the user subscribes. In some such embodiments, the application 236 makes use of application programming interface calls provided by such social media applications (e.g., FACEBOOK MESSENGER, TWITTER, SNAPCHAT, iMESSAGE, etc.) to forward the sticker to such contacts within the social media applications via application server module 108 at server system 106.

Referring to FIG. 2, an exemplary client device 102 typically includes one or more processing units (CPUs) 214, one or more network or other communications interfaces 212, memory 220 (e.g., random access memory and/or non-volatile memory) optionally accessed by one or more controllers 208, and one or more communication busses 210 for interconnecting the aforementioned components.

The client device 102 also includes a user interface 200. The user interface 200 typically includes a display device 202, which is optionally integrated within the device (e.g., housed in the same chassis as the CPU and memory, such as with a smart phone or an all-in-one desktop computer). In some embodiments, the client device 102 includes input device(s) 204, such as a keyboard, mouse, and/or other input buttons. Alternatively or in addition, in some embodiments, the display device 200 includes a touch-sensitive surface, e.g., where display 202 is a touch-sensitive display or client device 102 includes a touch pad.

In client devices in which display 202 is touch-sensitive, the touch-sensitive display provides an input interface and an output interface between the device and a user. The touch-sensitive display includes a touch-sensitive surface, sensor, or set of sensors that accepts input from the user based on haptic and/or tactile contact. The touch-sensitive display detects contact (and any movement or breaking of the contact) on touch-sensitive display and converts the detected contact into interaction with user-interface objects (e.g., one or more soft keys, icons, messages, message interfaces, videos, or images) that are displayed on touch-sensitive display system (e.g., that are displayed at a location on the display 202 corresponding to the location at which the contact was detected). In client devices that have a touch-sensitive display, a physical keyboard is optional (e.g., a soft keyboard may be displayed when keyboard entry is needed). In some embodiments, the touch-sensitive display detects contact by the finger of the user and/or a stylus. In such embodiments, the display controller 203 receives and/or sends electrical signals from/to touch-sensitive display. As such, the touch-sensitive display displays visual output to the user. The visual output optionally includes graphics, text, icons, video, and any combination thereof (collectively termed "graphics").

In some embodiments, client device 102 includes a touchpad (not shown) for activating or deactivating particular functions. In some embodiments, the touchpad is a touch-sensitive area of the device that, unlike a touch screen, does not display visual output. The touchpad is, optionally, a touch-sensitive surface that is separate from a touch-sensitive display system or an extension of the touch-sensitive surface formed by the touch screen.

In some embodiments, the user interface 200 also includes an audio output device, such as speakers or an audio output for connecting with speakers, earphones, or headphones. In some embodiments, the user interface 200 also includes an audio input device (e.g., a microphone), and optional voice recognition capabilities (e.g., to supplement or replace the keyboard). Optionally, the client device 104 includes an audio input device 210 (e.g., a microphone) to capture audio (e.g., speech from a user).

In some implementations, the client device 102 also includes one or more of: one or more sensors (e.g., accelerometer, magnetometer, proximity sensor, gyroscope) (not shown), an image capture device (e.g., a camera device or module and related components) (not shown), and/or a location module (e.g., a Global Positioning System (GPS) receiver or other navigation or geolocation device and related components).

Memory 220 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 220 may optionally include one or more storage devices remotely located from the CPU(s) 214. Memory 220, or alternatively the non-volatile memory device(s) within memory 220, comprises a non-transitory computer readable storage medium. Access to memory 220 by other components of client device 102, such as CPU(s) 214 and the peripherals interface 206, is, optionally, controlled by controller 208. In some embodiments, memory 220 can include mass storage that is remotely located with respect to the central processing unit(s) 214. In other words, some data stored in memory 220 may in fact be hosted on devices that are external to client device 102, but that can be electronically accessed by client device 102 over an Internet, intranet, or other form of network 104 or electronic cable using communication interface 212.

The memory 220 of client device 102 stores:
- an operating system 230 that includes procedures for handling various basic system services;
- a file system 232 for controlling access to the various files and data structures described herein;
- a network communication module 234 that is used for connecting the client device 102 to other computers via the one or more communication network interface(s) 212 (wired or wireless) and one or more communication networks 104, such as the Internet, cellular telephone networks, mobile data networks, other wide area networks, local area networks, metropolitan area networks, etc.;
- an application 236 for customizing avatars, indicating categories, receiving messages in such categories along with altered avatars responsive to such messages and for indicating who should receive such messages in conjunction with application server module 108 through communication network interface(s) 212, and related features/components such as:
  - the avatar 238 associated with a user, the avatar including one or more traits 240, and for each such respective trait 240 a trait value 242;
  - an avatar gender layer 244 that confers a visible gender to the avatar 238;
  - a user profile 246 which includes a plurality of topical categories 248 selected by the user and, optionally, a contact list 250 associated with the user;
  - one or more electronic communications 252 provided by the application server module 108, each respective electronic communication including:
    - a designation of a communication category 254 that matches one of the topical categories 248 in the profile 246 of the user;
    - a sticker 256 which includes the altered avatar 258 of a first user and, optionally, the altered avatar 258 of additional users selected by the first user, one or more sounds 260, one or more props 262, one or more foreground elements 264, a background 266, a bubble message 268 and/or a headline 270.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 220 optionally stores a subset of the modules and data structures identified above. Furthermore, memory 220 optionally stores additional modules and data structures not described above.

It should be appreciated that device 102 is only one example of a client device, and that device 102 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

Figure 3:
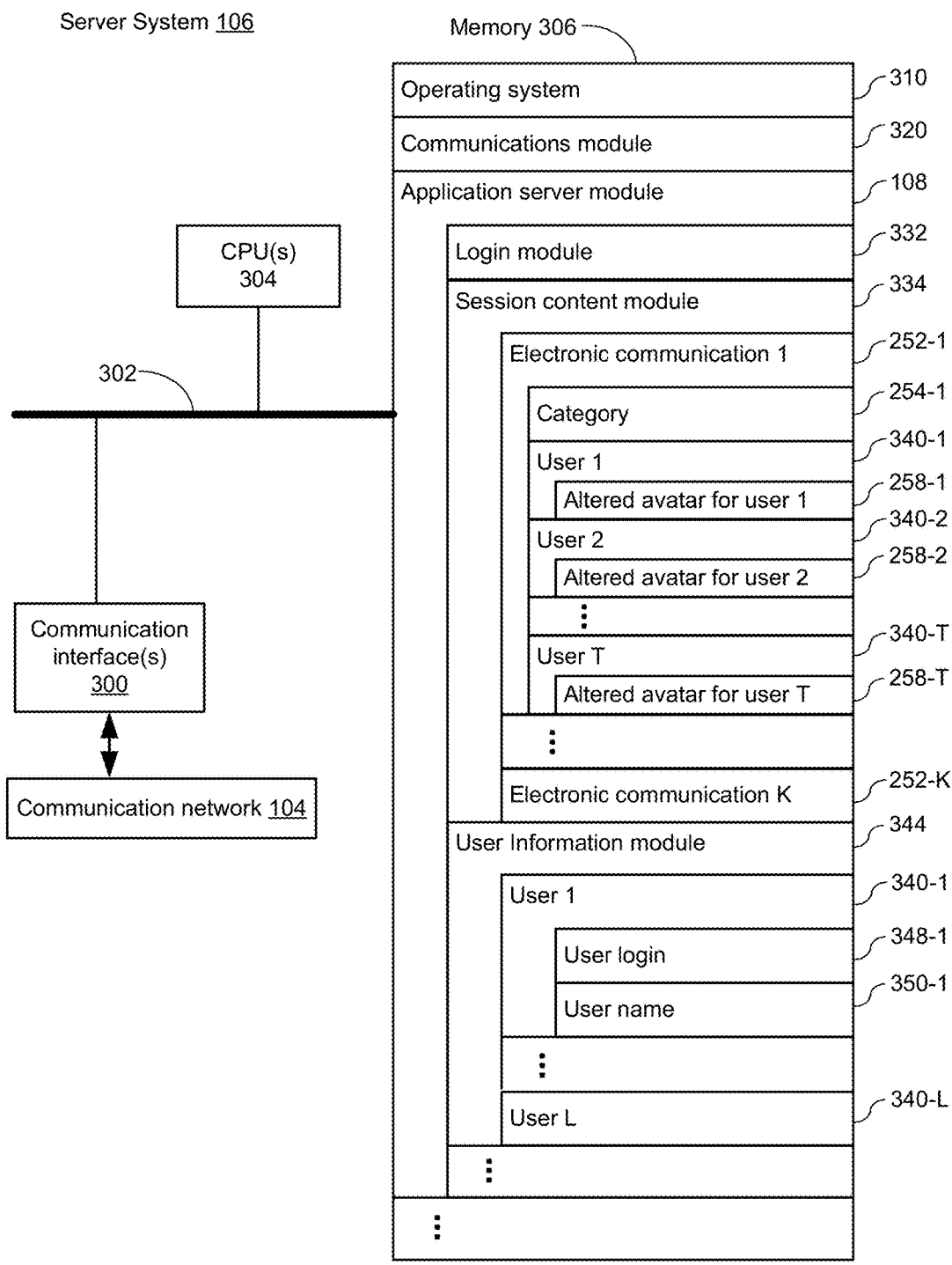
FIG. 3 is a block diagram illustrating a server system in accordance with some embodiments.

FIG. 3 is a block diagram illustrating an exemplary server system 106 in accordance with some embodiments. The server system typically includes one or more processing units (CPU's) 304, one or more network or other communications interfaces 300, memory 306 (e.g., random access memory and/or non-volatile memory), and one or more communication busses 302 for interconnecting the aforementioned components.

Memory 306 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 306 may optionally include one or more storage devices remotely located from the CPU(s) 214. Memory 306, or alternatively the non-volatile memory device(s) within memory 306, comprises a non-transitory computer readable storage medium. In some embodiments, memory 306 can include mass storage that is remotely located with respect to the central processing unit(s) 304. In other words, some data stored in memory 306 may in fact be hosted on devices that are external to server system 106, but that can be electronically accessed by server system 106 over an Internet, intranet, or other form of network or electronic cable using communication interface(s) 300.

The memory 306 of server system 106 stores:
- an operating system 310 that includes procedures for handling various basic system services;
- a network communications module 320 for connecting to client devices 102 and other server systems via the communication network interface(s) 300 (wired or wireless) and one or more communication networks (e.g., the one or more networks 104);
- an application server module 108, associated with client applications 236 stored in respective memory 220 of client devices 202, with instructions for executing protocols and storing data associated with application 236, such as:
  - a login module 332 for authenticating users of client application 236, and for providing authenticated users access to data associated with respective sessions;
  - a session content module 334 that provides a plurality of electronic communications 252, each such electronic communication describing an event and comprising:
    - a category 254; and
    - a designation of one or more users 340 and for each respective user of the one or more users, an altered avatar 248 for the respective user; and
  - a user information module 344 for storing information associated with respective users 340-1 . . . 340-L of client application 236, including:
    - user login information 348 (e.g., names and passwords for logging into the server system 106) and user names 350 (e.g., names displayed in conjunction with messages uploaded to a respective messaging session).

In some embodiments, information for users 340 stored in the user information module 344 includes user profiles, login information, privacy and other preferences, and/or biographical data. In some embodiments, a login name associated with a respective user is the same as the user name displayed for the user. In other embodiments, a login name associated with a respective user is different than the user name displayed for the user. In some embodiments, server 106 stores the avatar 238 information, including traits 240 and trait values 242 and gender layer 244 for each user, as well as their profile 246 of subscribed topical categories 248 and/or contact list 250.

Now that devices and servers in accordance with the present disclosure have been described, methods for using these devices and servers will be described.

Use of a Contemporary Event to Customize an Avatar.

Figure 8:
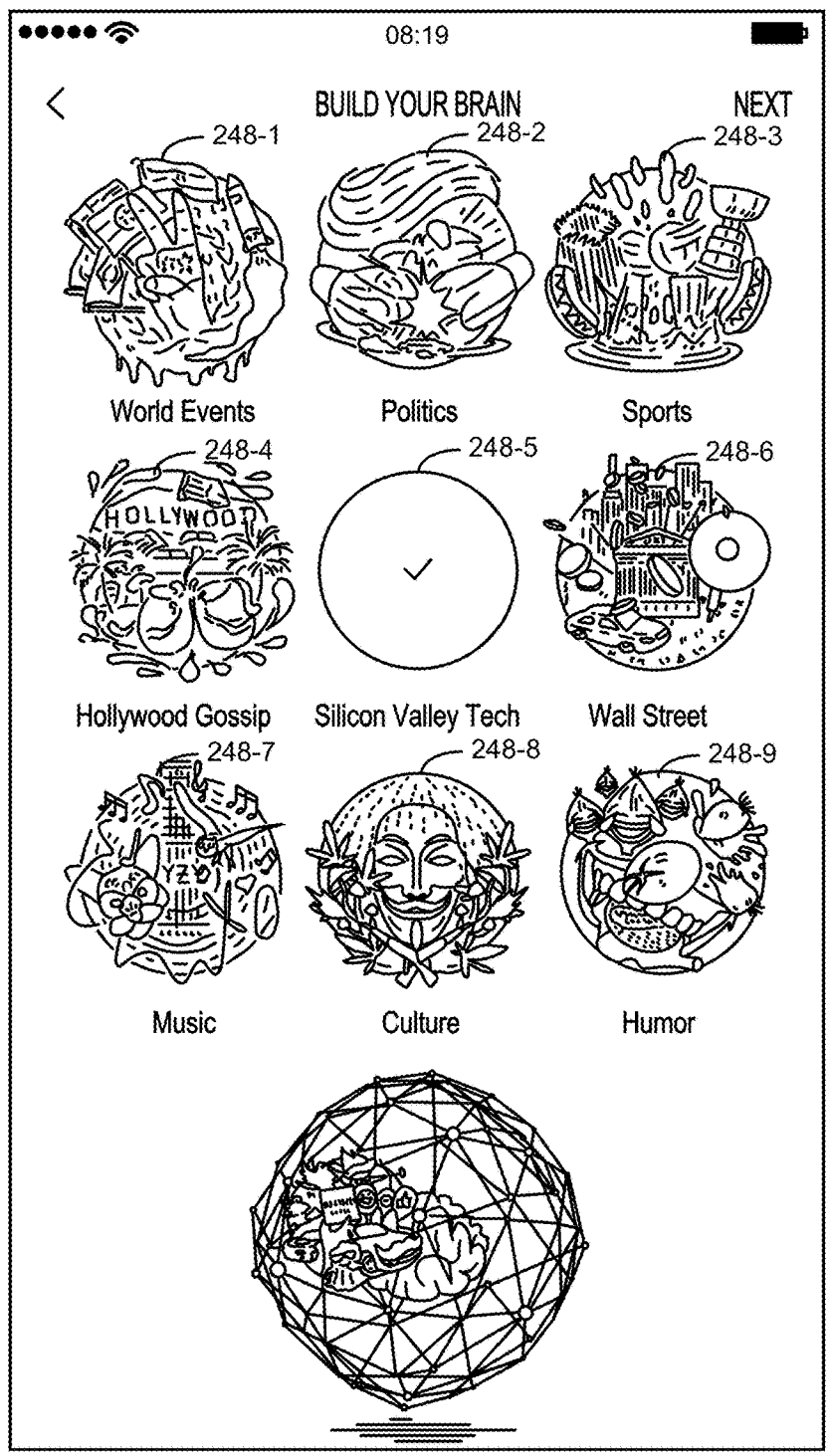
FIG. 8 illustrates receiving a selection of one or more topical categories from an enumerated plurality of topical categories and associating the one or more topical categories with a first avatar in accordance with some embodiments.

FIGS. 4A-4G illustrate a flow diagram of a method of customizing a first avatar 238 responsive to an event. Referring to block 402 of FIG. 4A, the method comprises, in accordance with a client application 236 on a first electronic device 102 associated with a first user 340, where the client application 236 includes a first avatar 238 representing the first user, the first electronic device 102 comprises one or more processors 214, memory 220, and a display 202: receiving a selection of one or more topical categories 248 from an enumerated plurality of topical categories (e.g., technology, politics, celebrities, culture, etc.). The one or more topical categories selections by the user are associated with the first avatar 238 that is, in turn associated with the user. Stated another way, the user selects topical categories 248 that interest the first user and these selected categories are stored in the user profile 246 of the user as illustrated in FIG. 2. In some embodiments, the user selects one category 248. In some embodiments, the user selects two or more categories, three or more categories or four or more categories. FIG. 8 illustrates an example user interface 802 used in some embodiments of client application to select from among the topical categories 248 "world events," "politics," "sports," Hollywood gossip," "Silicon Valley Tech," "Wall Street," "Music," "Culture," and "Humor."

With the selected categories in mind, if anything breaking happens within any of the categories 248 selected by the user, the user's avatar 238 will react to it as disclosed herein. To this end, referring to block 406, the user receives a number of communications 252, each of which is classified into one or more topical categories 248. For instance, if the user has indicated an interest in the category 248 "politics," each time a political event occurs, the user receives an electronic communication regarding the political event. The user selects one such electronic communication 252.

In some embodiments, application server module 108 polls for such events on a recurring basis and, when such events are discovered, assigns a category to the topics 248 and, if the category matches those selected by the user, sends an electronic communication 252 to the client application 236 associated with a user across network 104. In some embodiments, the category of an electronic communication is assigned by the application server module 108 based upon the Internet source of the document. In some embodiments, pattern classification techniques are used to categorize the electronic communication (e.g., trained neural networks, support vector machines, cosine distance metrics, etc.).

In some embodiments, an event is any one or more of topical news, human interest stories, social news, cultural news, and blend news. Non-limiting examples of topical news types include sports, politics, business, and cultural, etc. Non-limiting examples of topical news includes the announcement of President Trump firing the FBI director, the announcement of the Golden Gate Warriors winning a championship, the announcement of APPLE launching new IPHONE, the announcement of the winner of America's Got Talent shoe, the announcement of a song going platinum, etc. Non-limiting examples of human interest stories includes things to do over Labor Day weekend, the best food to eat on a weekend, and things to do when it rains. In typical embodiments, social news requires a user needs to authenticate with a participating social networking application such as FACEBOOK, INSTRAGRAM, etc. to get this type of news) and non-limiting examples of such news includes friend's birthdays, friend's relationship status changes, the user's relationship status changes, announcements when you have gotten more than X likes on a post, announcements regarding a friend that got a lot of FACEBOOK "likes" on a FACEBOOK post, announcements regarding which contact of the user got the most FACEBOOK "likes" in the past week etc. Non-limiting examples of cultural news includes announcements regarding "Taco Tuesday", "Hungover," etc. Blend news signifies stickers that are not based on topical news. In some embodiments, an event comprises a requested product placement. In some embodiments, an event comprises a sponsored or otherwise paid for posts.

At some point, a selection of a first electronic communication 252 within the client application 236 is made by the user 340. The first electronic communication 252 is received by the first user in the client application. The first electronic communication is classified into a topical category 248 in the one or more topical categories, and describes the event.

Figure 4A:
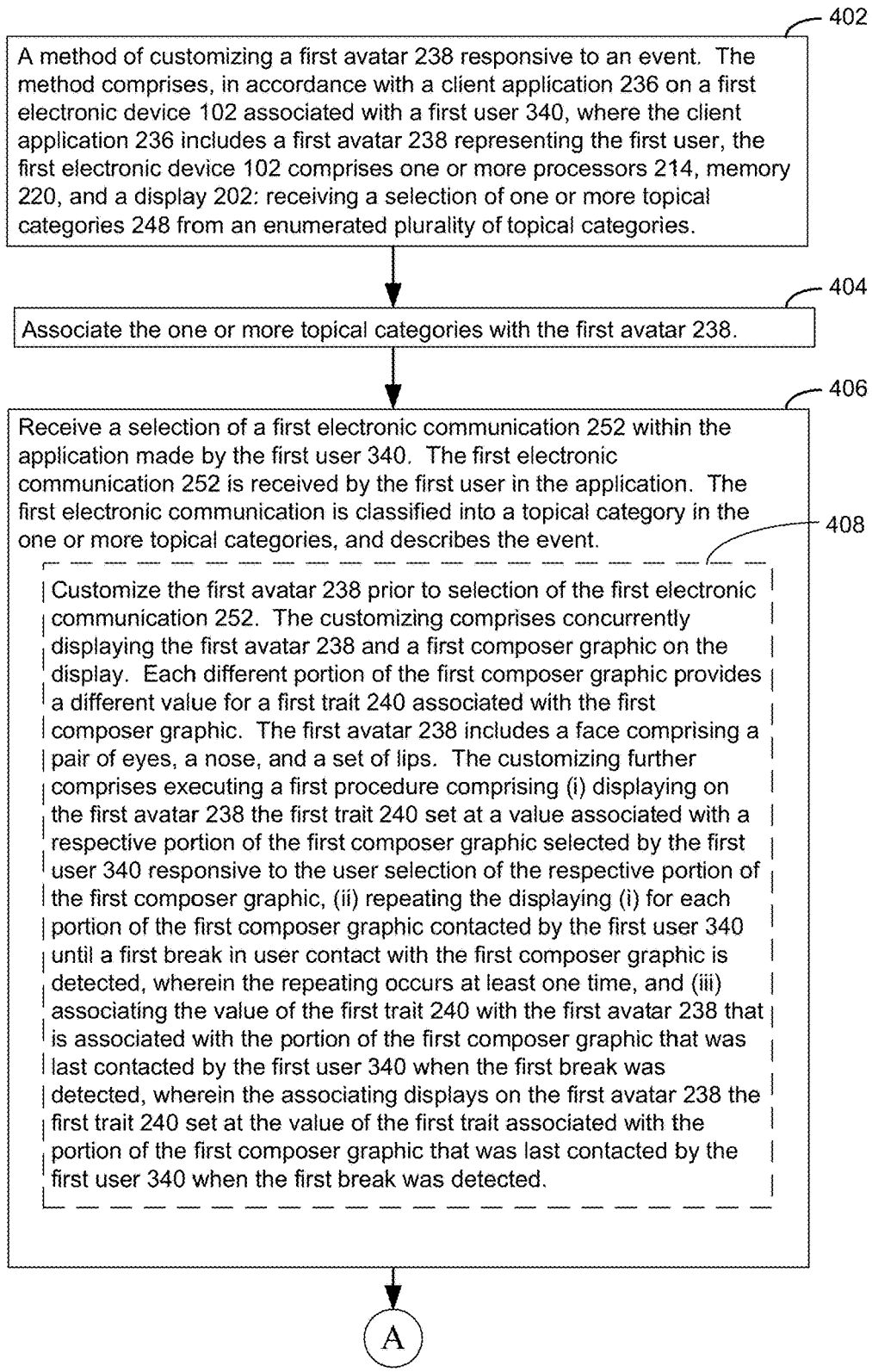
FIGS. 4A, 4B, 4C, 4D, 4E, 4F, and 4G are flow diagrams collectively illustrating a method of customizing one or more avatars responsive to an event in accordance with some embodiments.

In typical embodiments, referring to block 408 of FIG. 4A, the user's avatar 238 is customized prior to selection of one of the electronic communications 252 the user has received. In such embodiments, one of the first things that is done by a user after they have installed the client application 236 on their device 102 is to customize their avatar 238. In some such embodiments, referring to FIG. 9, the customizing comprises concurrently displaying the first avatar 238 and a first composer graphic 902 on the display. Each different portion of the first composer graphic provides a different trait value 242 for a first trait 240 associated with the first composer graphic 902. For instance, referring to FIG. 9, portion 904-1 represents a different trait value 242 for the first trait "facial hair" than portion 904-1 of the first composer graphic wheel 902. The user can select the desired trait value 242 for the first trait associated with the first composer graphic 902 by selecting the portion 904 of the first composer graphic 902 that represents the desired trait value 242. In some embodiments, trait values 242 are an enumerated list of trait values that arranged on different portions of the first composer graphic 902 (e.g., different hair colors). In some embodiments, trait values 242 constitute a numeric range (e.g., average hair length as measured in centimeters, e.g., 0.01 cm to 15 cm). In some embodiments the trait values for a given trait associated with the first composer graphic is simply illustrated on different portions of the first composer graphic 902. For instance, as illustrated in FIG. 9, the trait value 242 ranges from clean shaven (1 o'clock) all the way through a very full beard (11 o'clock).

Figure 9:
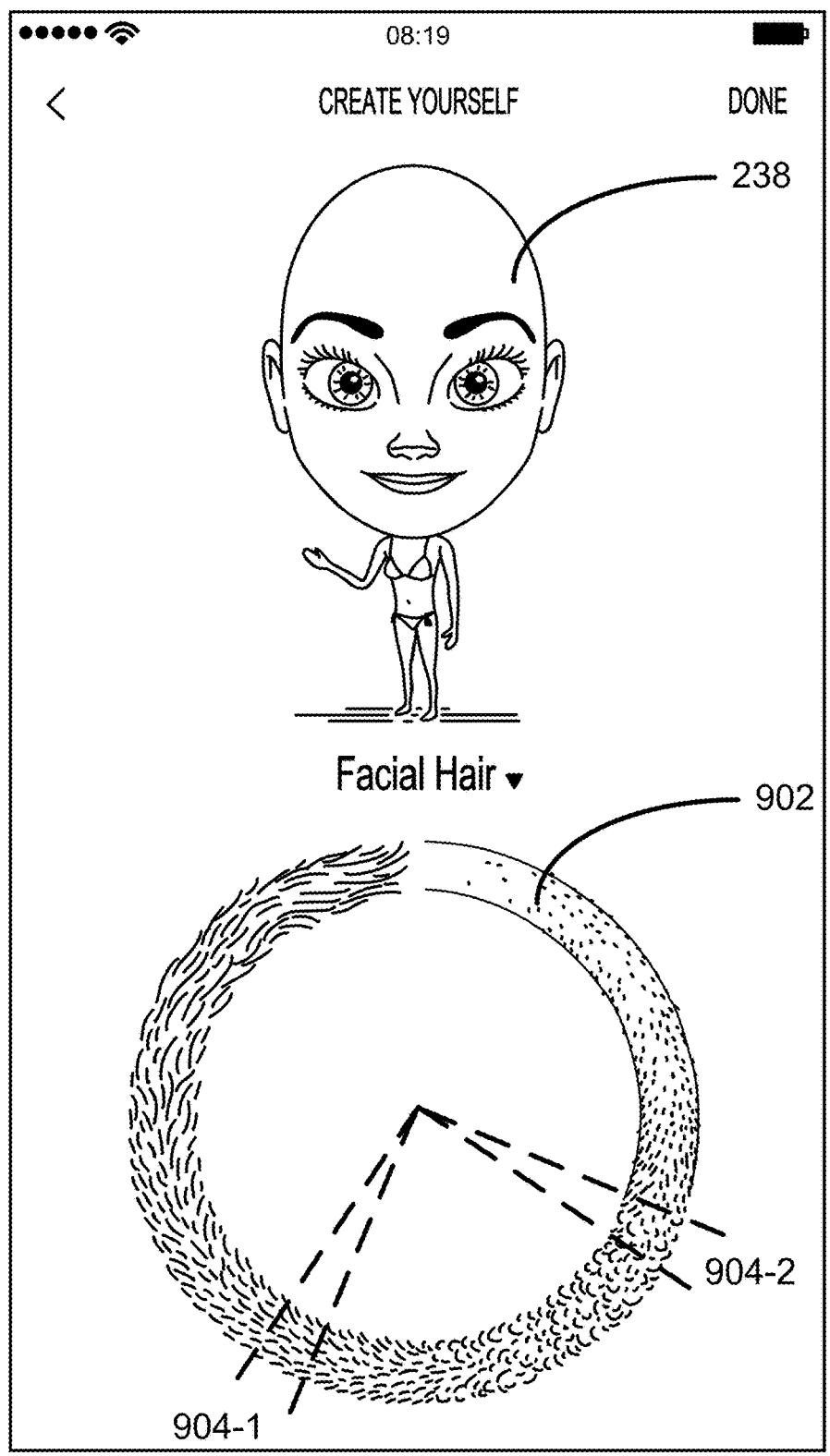
FIG. 9 illustrates concurrently a first avatar and a first composer graphic on a display, where each different portion of the first composer graphic provides a different value for a first trait associated with the first composer graphic, and where the first avatar includes a face comprising a pair of eyes, a nose, and a set of lips in accordance with some embodiments.

As illustrated in FIG. 9, in some embodiments, the first avatar 238 includes a face comprising a pair of eyes, a nose, and a set of lips. Further, the customizing of the avatar comprises executing a first procedure comprising (i) displaying on the first avatar 238 the first trait 240 set at a value associated with a respective portion of the first composer graphic selected by the first user 340 responsive to the user selection of the respective portion of the first composer graphic. For instance, if the user selects portion 904 of the first composer graphic 902, the facial hair of the first avatar 238 is altered to look like the selected facial hair from the selected portion 904 of the first composer graphic 902. This process of displaying is for each portion 904 of the first composer graphic 902 contacted by the first user 340 until a first break in user contact with the first composer graphic is detected. Thus, in some embodiments the user drags a finger along the first composer graphic 902 (e.g., in a clockwise or counterclockwise fashion) and as they do the facial hair on the avatar 238 is changed to match the portion 904 of the first composer graphic 902 they are touching. Once the user stops touching the first composer graphic the value 242 of the first trait 240 that is at the portion 904 of the first composer graphic 902 last touched by the user before the break is associated with the first avatar 238. In other words, the trait value 242 that is associated with the portion of the first composer graphic 902 that was last contacted by the first user 340 when the first break was detected is associated with the first avatar 238. Further, this association includes displaying on the first avatar 238 the first trait 240 set at the trait value 242 of the first trait associated with the portion 904 of the first composer graphic 902 that was last contacted by the first user 340 when the first break was detected.

Figure 4B:
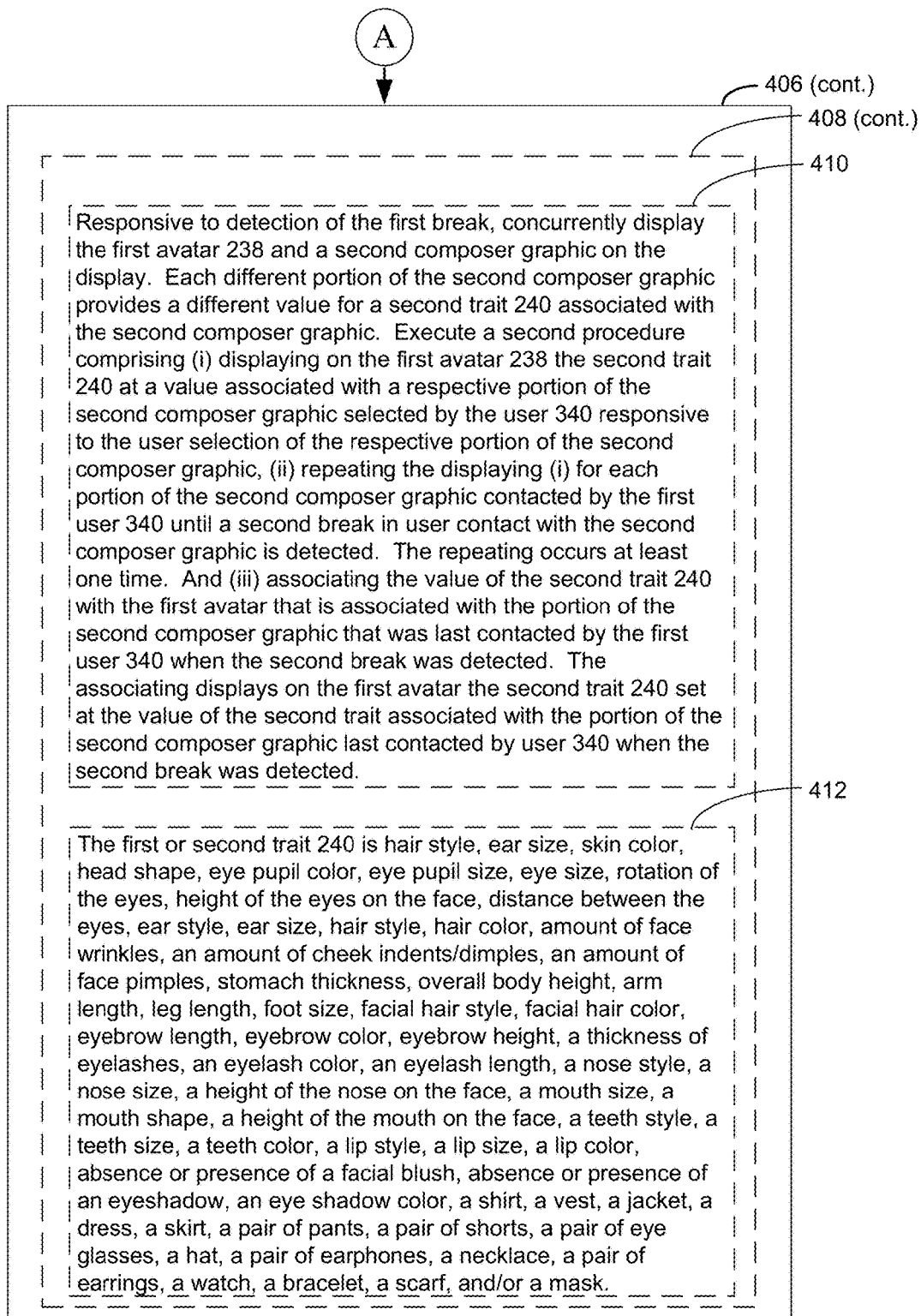
Figure 10:
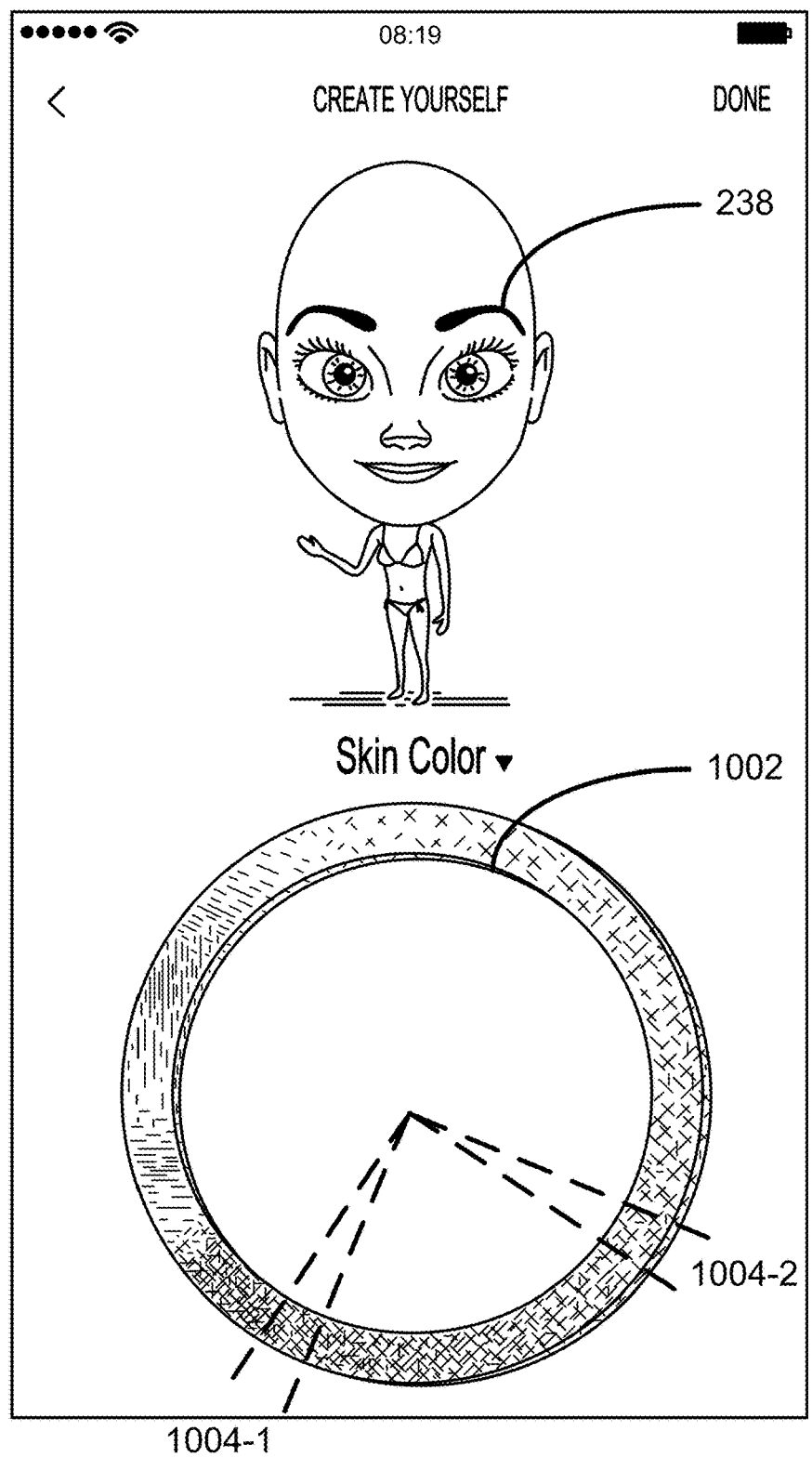
FIG. 10 illustrates concurrently displaying a first avatar and a second composer graphic on a display, where each different portion of the second composer graphic provides a different value for skin color in accordance with some embodiments.

Referring to block 410 of FIG. 4B and FIG. 10, in some embodiments, responsive to detection of the first break, the first avatar 238 and a second composer graphic 1002 are concurrently displayed on the display. Each different portion of the second composer graphic 1002 provides a different value 242 for a second trait 240 (e.g., "skin color") associated with the second composer graphic 1002. In accordance with such embodiments, a second procedure is executed that comprises (i) displaying on the first avatar 238 the second trait 240 set at a value 242 associated with a respective portion 1004 of the second composer graphic 1002 selected by the user 340 responsive to the user selection of the respective portion 1004 of the second composer graphic, (ii) repeating the displaying (i) for each portion 1004 of the second composer graphic 1002 contacted by the first user 340 until a second break in user contact with the second composer graphic 1002 is detected, where the repeating occurs at least one time, and (iii) associating the value 242 of the second trait 240 with the first avatar 238 that is associated with the portion 1004 of the second composer graphic 1002 that was last contacted by the first user 340 when the second break was detected. Thus, in some embodiments, the user drags a finger along the second composer graphic 1002 (e.g., in a clockwise or counterclockwise fashion) and as they do the skin color on the avatar 238 is changed to match the portion 1004 of the second composer graphic 1004 they are touching. Once the user stops touching the second composer graphic the value 242 of the second trait 240 that is at the portion 1004 of the second composer graphic 1002 last touched by the user before the second break is associated with the first avatar 238. This associating results in the display on the first avatar 238 of the second trait 240 set at the value 242 of the second trait 240 associated with the portion 1004 of the second composer graphic 1002 that was last contacted by the first user 340 when the second break was detected.

Figure 11:
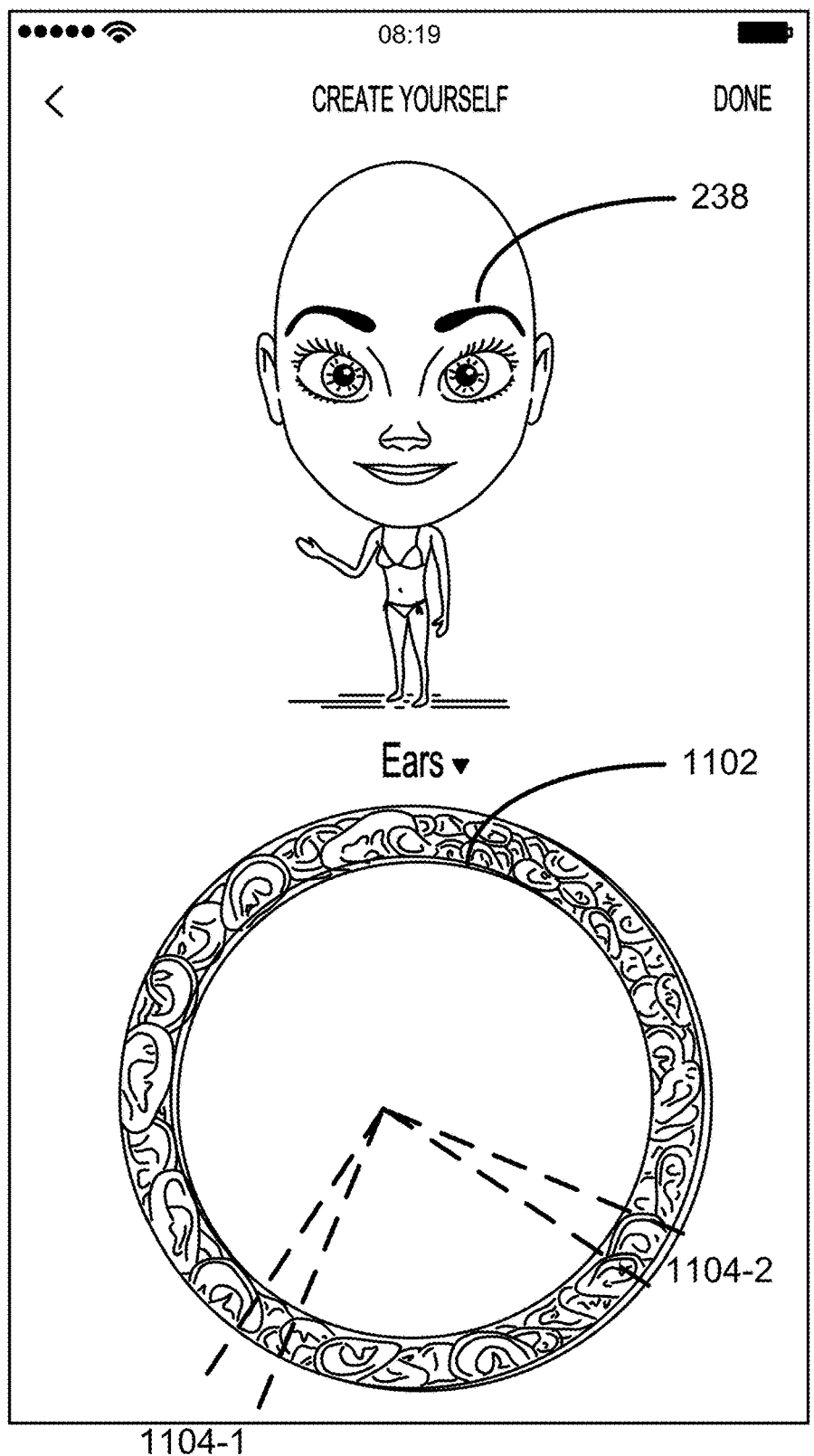
FIG. 11 illustrates concurrently displaying a first avatar and a second composer graphic on a display, where each different portion of the second composer graphic provides a different value for ear style in accordance with some embodiments.

Referring to FIG. 11, in some embodiments, responsive to detection of the second break, the first avatar 238 and a third composer graphic 1102 are concurrently displayed on the display. Each different portion of the third composer graphic 1102 provides a different value 242 for a third trait 240 (e.g., "ear size") associated with the third composer graphic 1102. In accordance with such embodiments, a third procedure is executed that comprises (i) displaying on the first avatar 238 the third trait 240 set at a value 242 associated with a respective portion 1104 of the third composer graphic 1102 selected by the user 340 responsive to the user selection of the respective portion 1104 of the third composer graphic, (ii) repeating the displaying (i) for each portion 1104 of the third composer graphic 1102 contacted by the first user 340 until a third break in user contact with the third composer graphic 1102 is detected, where the repeating occurs at least one time, and (iii) associating the value 242 of the third trait 240 with the first avatar 238 that is associated with the portion 1104 of the third composer graphic 1102 that was last contacted by the first user 340 when the third break was detected. Thus, in some embodiments, the user drags a finger along the third composer graphic 1102 (e.g., in a clockwise or counterclockwise fashion) and as they do the ear size on the avatar 238 is changed to match the portion 1104 of the third composer graphic 1104 they are touching. Once the user stops touching the third composer graphic the value 242 of the third trait 240 that is at the portion 1104 of the third composer graphic 1102 last touched by the user before the third break is associated with the first avatar 238. This associating results in the display on the first avatar 238 of the third trait 240 set at the value 242 of the third trait 240 associated with the portion 1104 of the third composer graphic 1102 that was last contacted by the first user 340 when the third break was detected.

Figure 12:
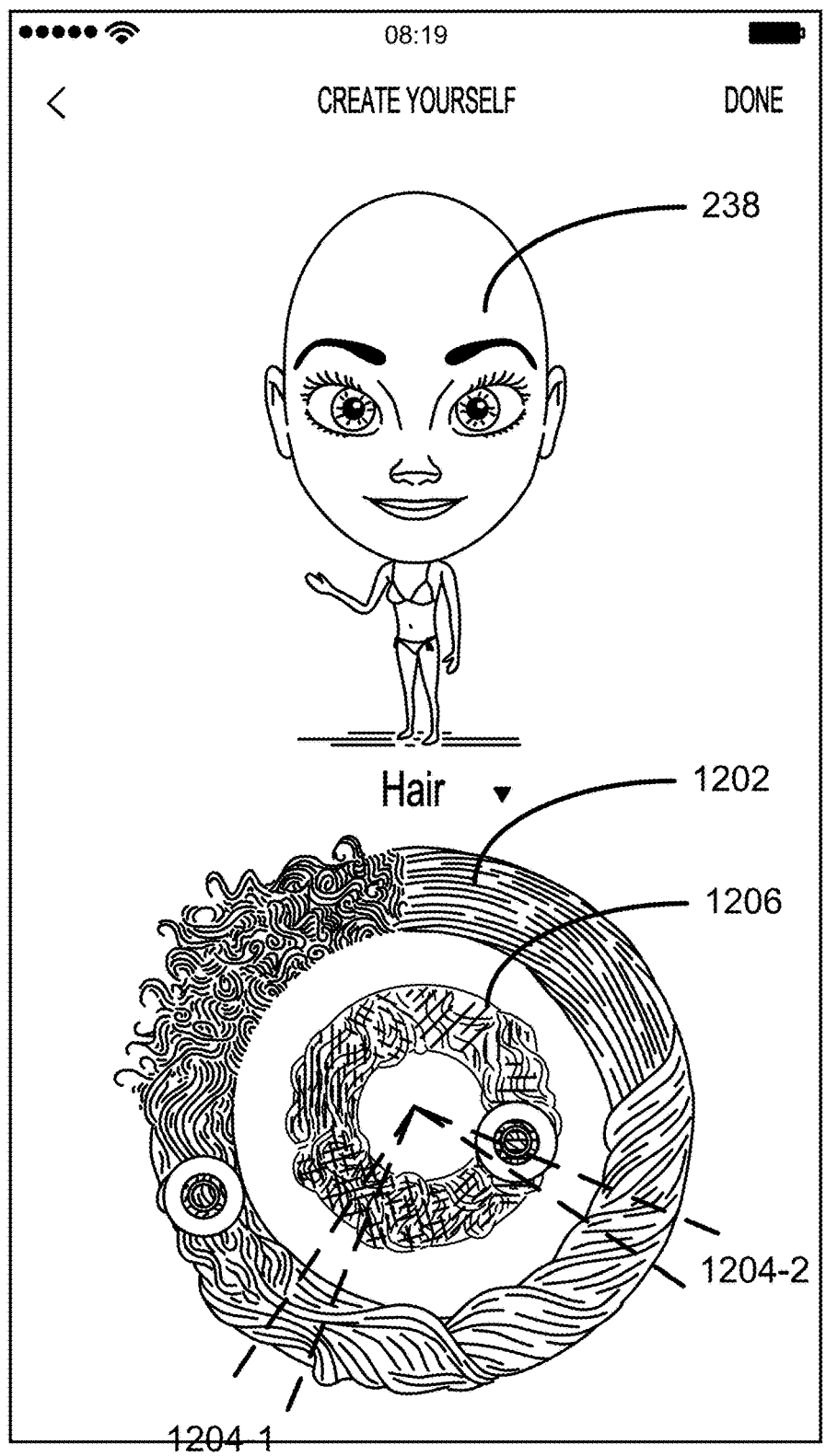
FIG. 12 illustrates concurrently displaying a first avatar and a first (outer) and second (inner) composer graphic anon a display, where each different portion of the outer composer graphic provides a different value for hair style and each different portion of the inner composer graphic selects hair color in accordance with some embodiments.
Figure 13:
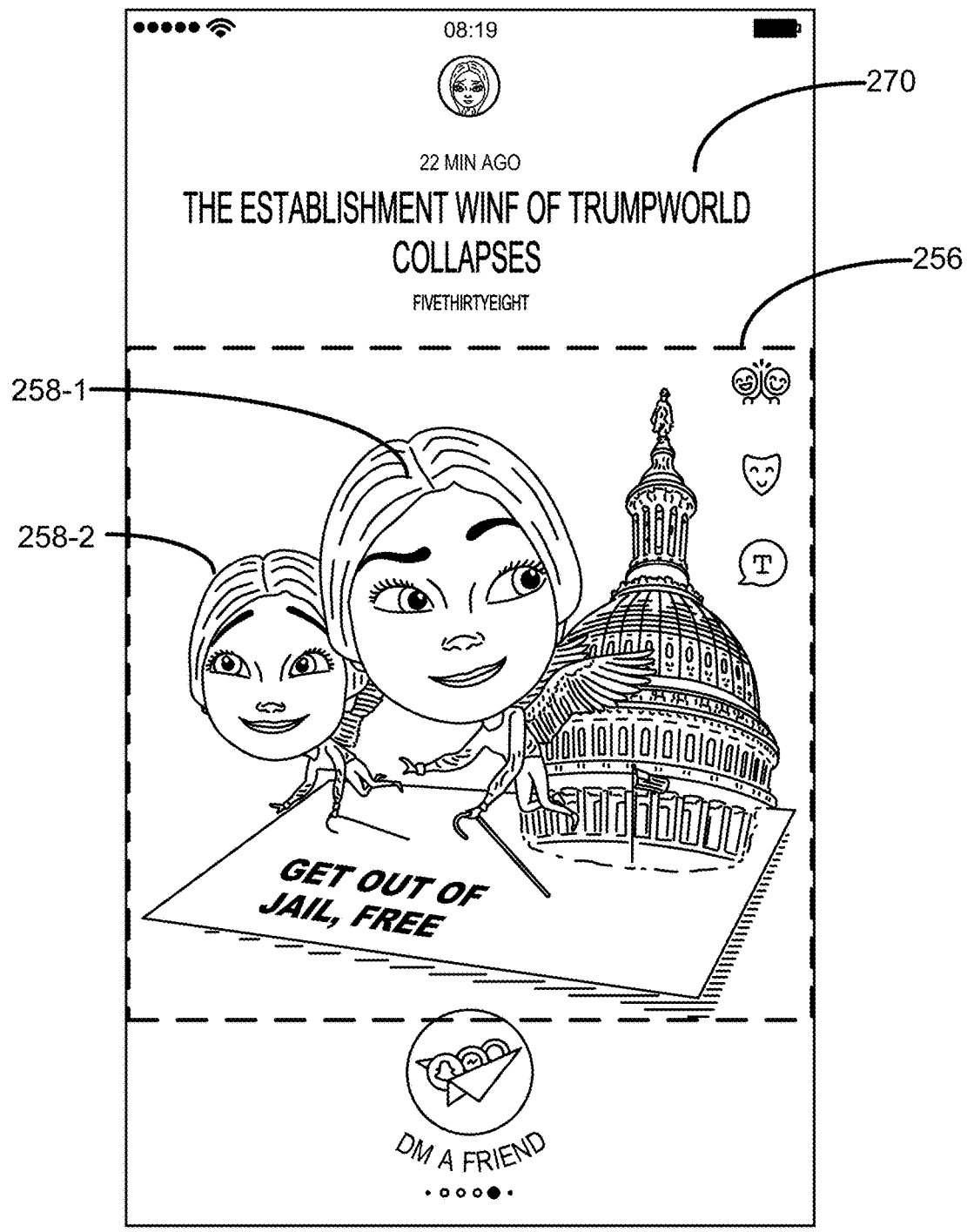
FIG. 13 illustrates a sticker comprising (i) an altered version of a first avatar of a first user responsive to the selection by the first user of an electronic communication, where the altered version of the first avatar comprises one or more visible layers that are present in the first avatar and one or more visible layers that are not present in the first avatar and (ii) a second avatar associated with a different user in a contact list of the first user or an enumerated list of avatars where each avatar in the enumerated list of avatars represents a different public figure in accordance with some embodiments.

Referring to FIG. 12, in some embodiments, responsive to detection of the third break, the first avatar 238 and a fourth composer graphic 1202 are concurrently displayed on the display. Each different portion of the fourth composer graphic 1202 provides a different value 242 for a fourth trait 240 (e.g., "hair style") associated with the fourth composer graphic 1202. In accordance with such embodiments, a fourth procedure is executed that comprises (i) displaying on the first avatar 238 the fourth trait 240 set at a value 242 associated with a respective portion 1204 of the fourth composer graphic 1102 selected by the user 340 responsive to the user selection of the respective portion 1204 of the fourth composer graphic, (ii) repeating the displaying (i) for each portion 1204 of the fourth composer graphic 1102 contacted by the first user 340 until a fourth break in user contact with the fourth composer graphic 1202 is detected, where the repeating occurs at least one time, and (iii) associating the value 242 of the fourth trait 240 with the first avatar 238 that is associated with the portion 1204 of the fourth composer graphic 1202 that was last contacted by the first user 340 when the fourth break was detected. Thus, in some embodiments, the user drags a finger along the fourth composer graphic 1202 (e.g., in a clockwise or counterclockwise fashion) and as they do the hair style on the avatar 238 is changed to match the portion 1204 of the fourth composer graphic 1204 they are touching. Once the user stops touching the fourth composer graphic the value 242 of the fourth trait 240 that is at the portion 1204 of the fourth composer graphic 1202 last touched by the user before the fourth break is associated with the first avatar 238. This associating results in the display on the first avatar 238 of the fourth trait 240 set at the value 242 of the fourth trait 240 associated with the portion 1204 of the fourth composer graphic 1202 that was last contacted by the first user 340 when the fourth break was detected.

In some embodiments, referring to block 412 of FIG. 4B, in non-limiting embodiments, the first or second trait 240 (and in fact, with further reference to FIGS. 11 and 12, the third and fourth trait) is hair style, ear size, skin color, head shape, eye pupil color, eye pupil size, eye size, rotation of the eyes, height of the eyes on the face, distance between the eyes, ear style, ear size, hair style, hair color, amount of face wrinkles, an amount of cheek indents/dimples, an amount of face pimples, stomach thickness, overall body height, arm length, leg length, foot size, facial hair style, facial hair color, eyebrow length, eyebrow color, eyebrow height, a thickness of eyelashes, an eyelash color, an eyelash length, a nose style, a nose size, a height of the nose on the face, a mouth size, a mouth shape, a height of the mouth on the face, a teeth style, a teeth size, a teeth color, a lip style, a lip size, a lip color, absence or presence of a facial blush, absence or presence of an eyeshadow, an eye shadow color, a shirt, a vest, a jacket, a dress, a skirt, a pair of pants, a pair of shorts, a pair of eye glasses, a hat, a pair of earphones, a necklace, a pair of earrings, a watch, a bracelet, a scarf, and/or a mask.

Figure 4C:
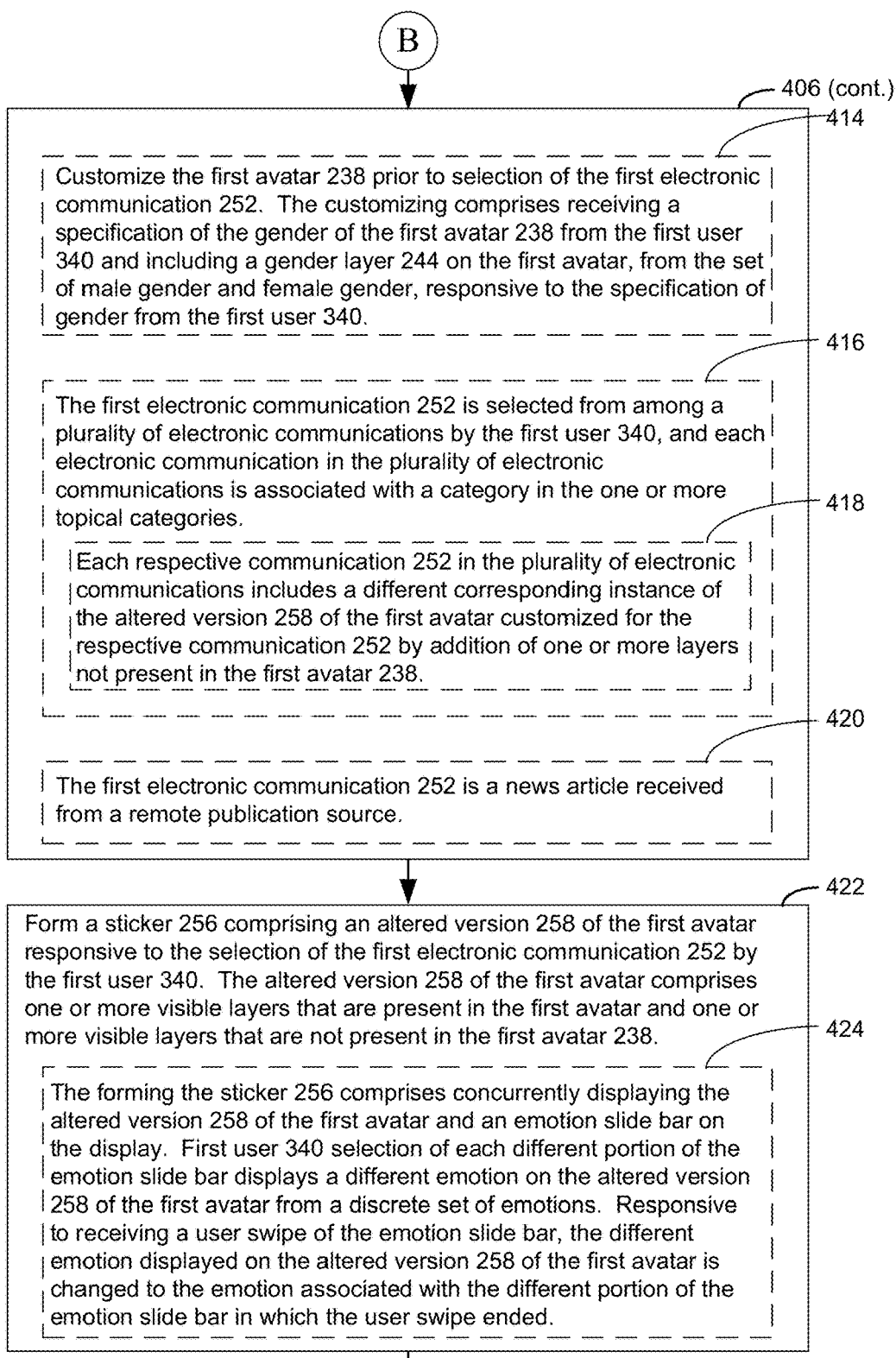

Referring to block 414 of FIG. 4C, in some embodiments, the first avatar 238 is customized prior to selection of the first electronic communication 252. Some techniques for customizing the avatar 238 have been described above with reference to blocks 408 through 412. In some embodiments, the customizing comprises receiving a specification of the gender of the first avatar 238 from the first user 340 and including a gender layer 244 responsive to the specification of gender from the first user 340 on the first avatar. Suitable choices for gender include male gender and female gender. The male gender layer 244 adds elements to the avatar 238 that make the avatar appear as a male, such as certain types of clothing, facial hair, hair style, etc. The female gender layer 244 adds elements to the avatar 238 that make the avatar appear as a female, such as certain types of clothing, absence of facial hair, jewelry, hair style, etc.

Referring to block 416 of FIG. 4C, in some embodiments the first electronic communication 252 is selected from among a plurality of electronic communications by the first user 340, and each electronic communication in the plurality of electronic communications is associated with a category 254 in the one or more topical categories. In some embodiments, each such electronic communication 252 describes an event in accordance with its associated category, the event occurring in the past five minutes, past half hour, past hour, past day or past week. In some embodiments, each such electronic communication 252 describes an event in accordance with its associated category, the event trending in the past five minutes, past half hour, past hour, past day or past week on a social network application such as GOOGLE, TWITTER, etc. In some embodiments, at any given the time, the plurality of electronic communications 252 available for the user to select from at a client application 236 is two or more electronic communications 252, five or more electronic communications 252, or 100 or more electronic communications 252. In some embodiments, each electronic communication 252 is associated with a single communication category 254 and the plurality of electronic communications collectively includes communications across two or more categories, three or more categories, or ten or more categories 254. In some embodiments, each electronic communication 252 is associated with two or more communication categories 254.

Embodiments in which an altered form (altered version 258) of a user's base avatar 238 responsive to the sentiment of an electronic communication 252 have been described. Referring to block 418 of FIG. 4C, in some embodiments, each respective communication 252 in the plurality of electronic communications 252 includes a different corresponding instance of the altered version 258 of the first avatar customized for the respective communication 252 by addition of one or more layers not present in the first avatar 238. These additional layers can modify the expression of the base avatar. For instance, the one or more additional layers may overlay enlarge anatomical features over the base avatar 238, such as enlarged ears to convey a listening posture.

Referring to block 420 of FIG. 4C, in some embodiments, the first electronic communication 252 is a news article received from a remote publication source. For instance, in some embodiments the remote publication source is CABLE NEWS NETWORK (CNN), FOX NEWS, REUTERS, or the ASSOCIATED PRESS and the news article is published by one of these remote publication sources over communication network 104.

Referring to block 422 of FIG. 4C, the method continues with the formation of a sticker 256 comprising the altered version 258 of the first avatar responsive to the selection of the first electronic communication 252 by the first user 340. In some such embodiments, the sticker 256 is formed in response to the selection of the first electronic communication 252. In some such embodiments, the sticker 256 existed prior to the selection of the first electronic communication. In accordance with block 422, the altered version 258 of the first avatar comprises one or more visible layers that are present in the first avatar and one or more visible layers that are not present in the first avatar 238. In some embodiments, the sticker is in JPEG format. In some embodiments, the sticker is in MP4 format, or some other format that allows for animation.

Figure 16:
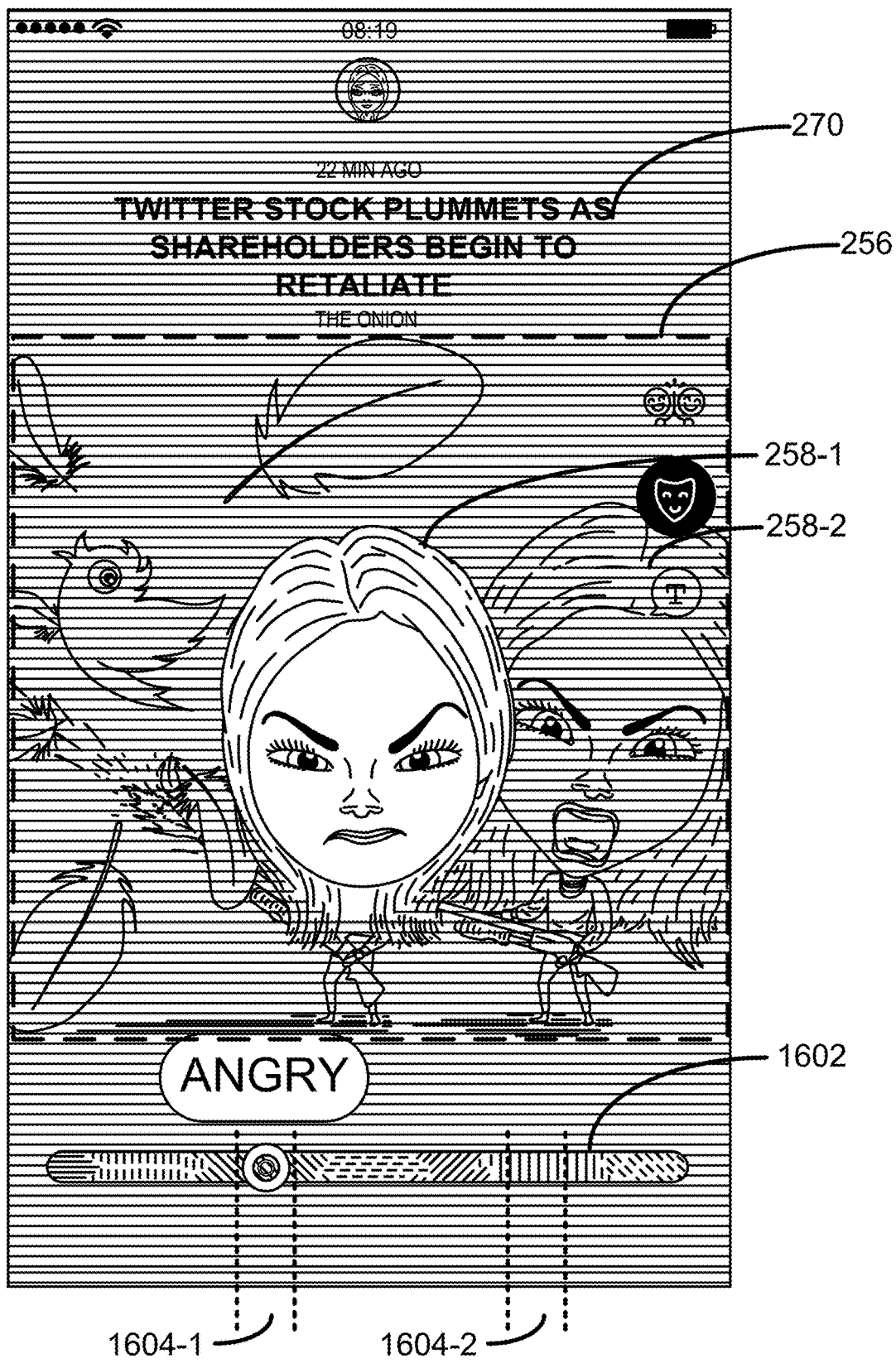
FIG. 16 illustrates providing, at a time after a selection of a first electronic communication, a first affordance, where selection of the first affordance by the first user displays a first tool for modifying a sticker, where the sticker comprises: (i) an altered version of a first avatar of a first user responsive to the selection by the first user of an electronic communication, where the altered version of the first avatar comprises one or more visible layers that are present in the first avatar and one or more visible layers that are not present in the first avatar and (ii) a second avatar associated with a different user in a contact list of the first user or an enumerated list of avatars where each avatar in the enumerated list of avatars represents a different public figure in accordance with some embodiments, and where the modifying the sticker comprises changing an expression on the first avatar in the sticker using the first affordance in accordance with some embodiments.

Referring to block 424 of FIG. 4C, and with reference to FIG. 16, in some embodiments the forming the sticker 256 comprises concurrently displaying the altered version 258 of the first avatar and an emotion slide bar 1602 on the display. First user 340 selection of each different portion of the emotion slide bar 1602 displays a different emotion on the altered version 258 of the first avatar from a discrete set of emotions. Responsive to receiving a user swipe of the emotion slide bar, the different emotion displayed on the altered version 258 of the first avatar is changed to the emotion associated with the different portion of the emotion slide bar in which the user swipe ended. For instance, referring to FIG. 16, portion 1604-1 of the emotion slide bar 1602 is associated with the emotion "angry" while portion 1604-2 of the emotion slide bar 1602 is associated with some other emotion other than angry. Referring to block 426 of FIG. 4C, in some such embodiments, and as illustrated in FIG. 16, the avatar 238 includes a pair of eyes, a nose, and a set of lips, a pair of eyebrows, a pair of ears, and a body, and each respective emotion in the discrete set of emotions associated with the emotion slide bar 1602 specifies at least a first characteristic position for the set of lips of the first avatar and a second characteristic position for the pair of eyebrows of the first avatar to convey the associated emotion in the altered avatar 258. For example, as illustrated in FIG. 16, to convey the emotion "angry," the default (base) avatar 238 of the user is taken and the lips and eyebrows positions are changed to form an altered avatar 258 (of the default avatar 238) that conveys anger. In some embodiments, the lips and eyebrows positions are changed by overlaying layers onto the base avatar 238 with lips and eyebrows in altered positions to thereby form the altered avatar.

In some such embodiments, and as illustrated in FIG. 16, the avatar 238 includes a pair of eyes, a nose, and a set of lips, a pair of eyebrows, a pair of ears, and a body, and each respective emotion in the discrete set of emotions associated with the emotion slide bar 1602 specifies at least a first characteristic position for one of the pair of eyes, a nose, and a set of lips, a pair of eyebrows, a pair of ears, and a body of the first avatar and a second characteristic position for another of the pair of eyes, a nose, and a set of lips, a pair of eyebrows, a pair of ears, and a body of the first avatar to convey the associated emotion in the altered avatar 258. In some embodiments, these components of the avatar are changed by overlaying layers onto the base avatar 238 with the components in altered positions to thereby form the altered avatar.

Figure 4D:
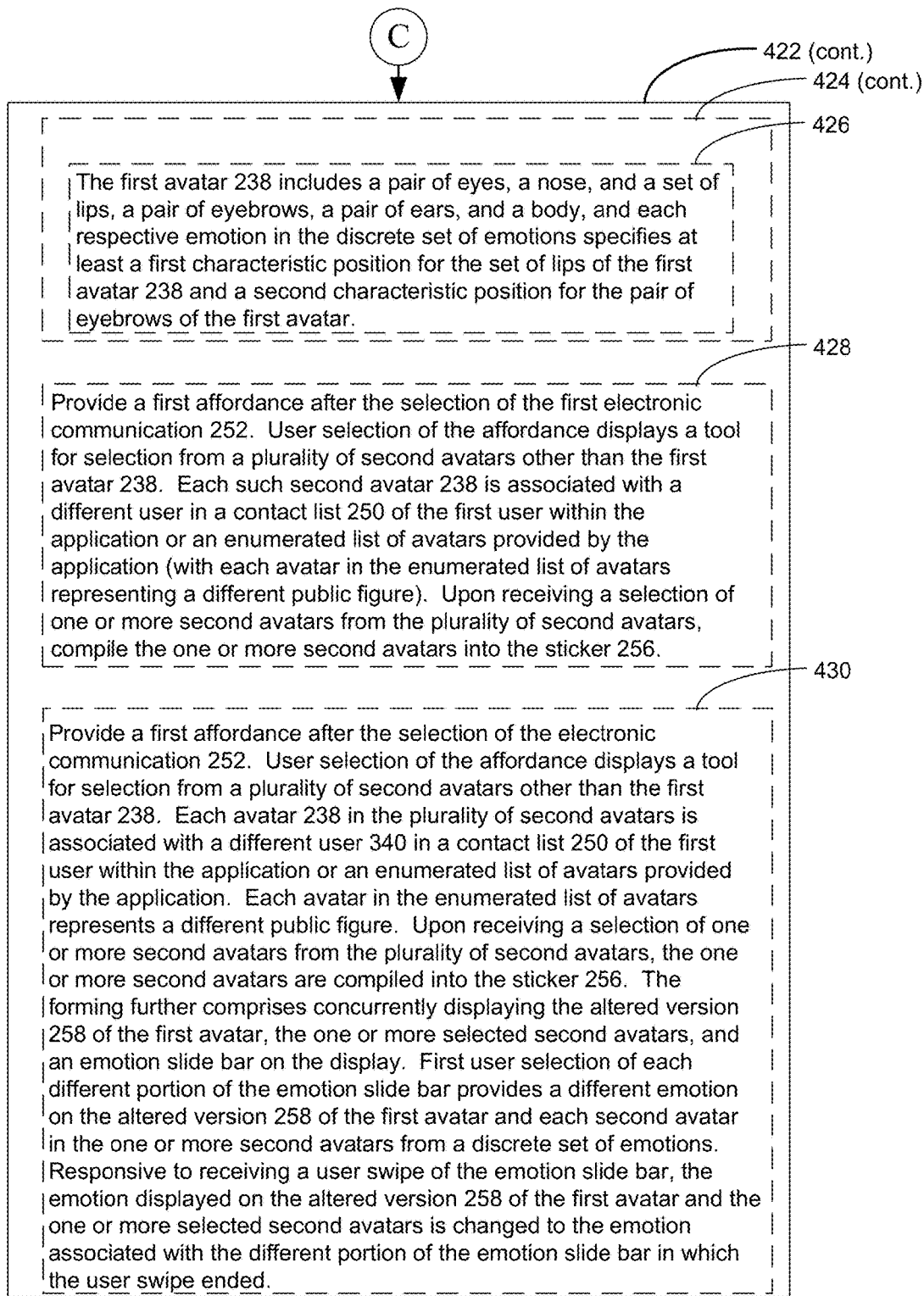
Figure 15:
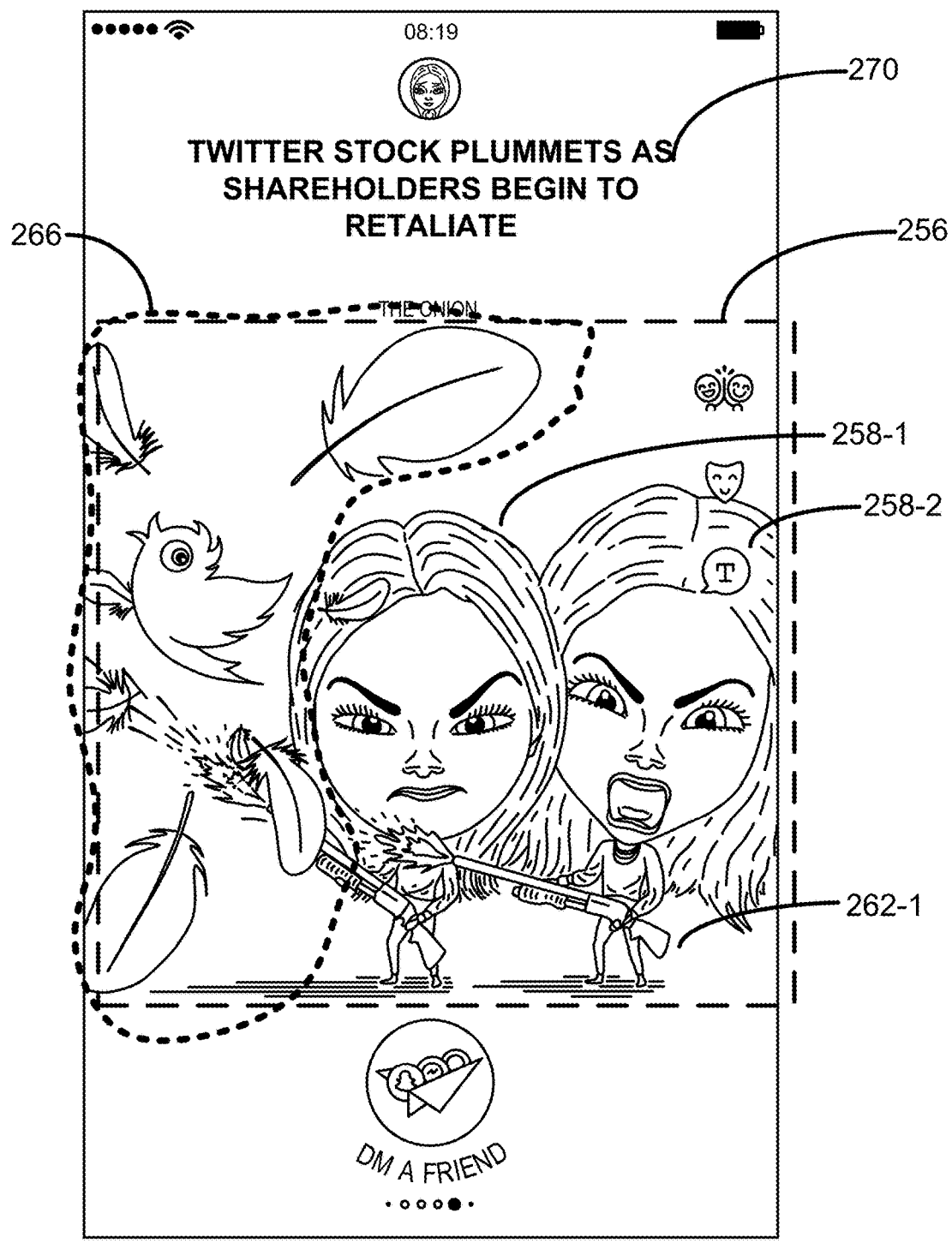
FIG. 15 illustrates providing a sticker to one or more other users using an application, where the sticker comprises: (i) an altered version of a first avatar of a first user responsive to the selection by the first user of an electronic communication, where the altered version of the first avatar comprises one or more visible layers that are present in the first avatar and one or more visible layers that are not present in the first avatar and (ii) a second avatar associated with a different user in a contact list of the first user or an enumerated list of avatars where each avatar in the enumerated list of avatars represents a different public figure in accordance with some embodiments, and (iii) a prop or background scene in accordance with some embodiments.
Figure 17:
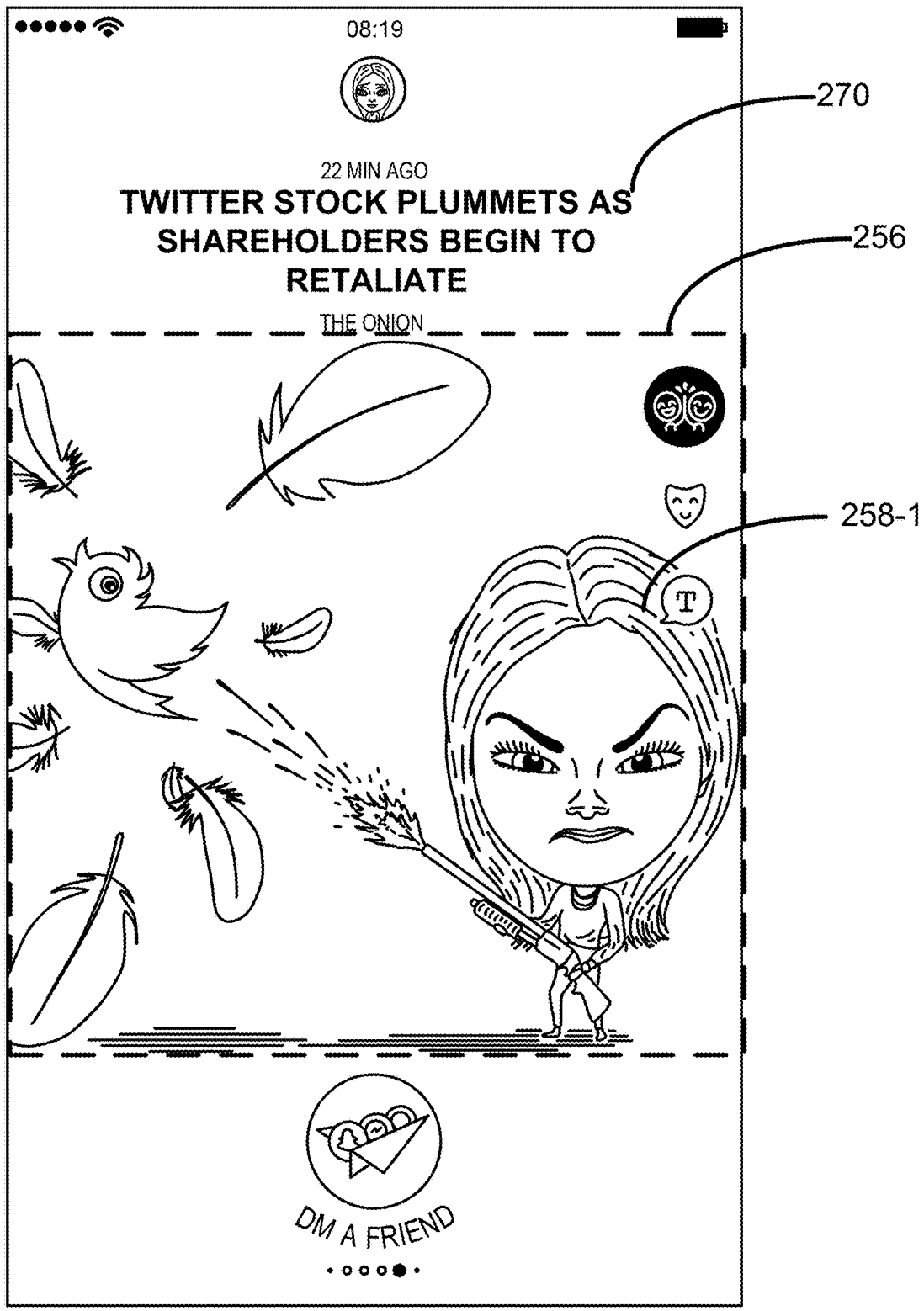
FIG. 17 illustrates providing a sticker to one or more other users using an application, where the comprises: (i) an altered version of a first avatar of a first user responsive to the selection by the first user of an electronic communication, where the altered version of the first avatar comprises one or more visible layers that are present in the first avatar and one or more visible layers that are not present in the first avatar and (ii) a second avatar associated with a different user in a contact list of the first user or an enumerated list of avatars where each avatar in the enumerated list of avatars represents a different public figure in accordance with some embodiments, and (iii) a prop or background scene in accordance with some embodiments.
Figure 18:
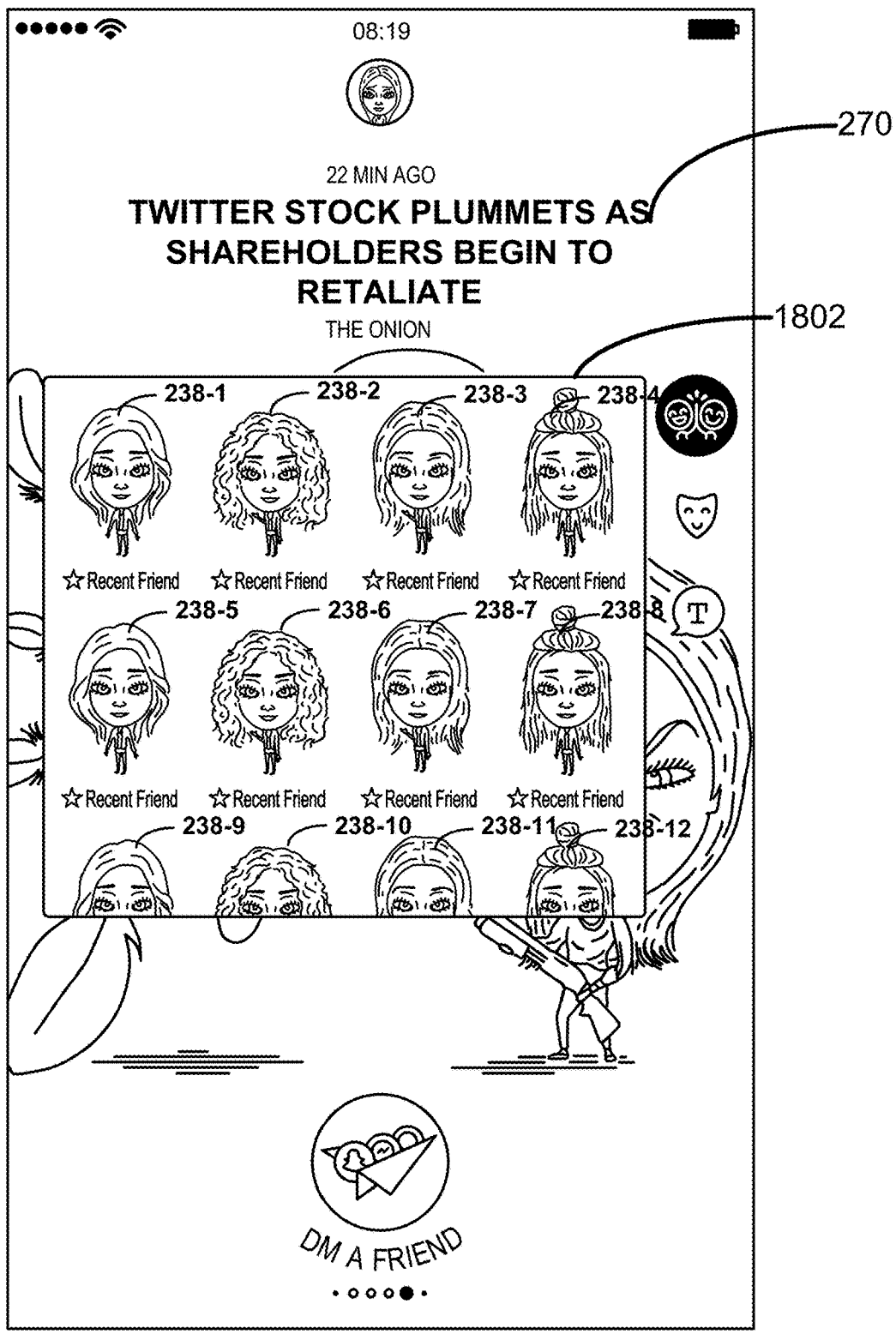
FIG. 18 illustrates providing, at a time after a selection of a first electronic communication, a first affordance, where selection of the first affordance by the first user displays a first tool for selection from a plurality of second avatars other than a first avatar, where each second avatar in the plurality of second avatars is associated with a different user in a contact list of the first user within the application in accordance with some embodiments.
Figure 19:
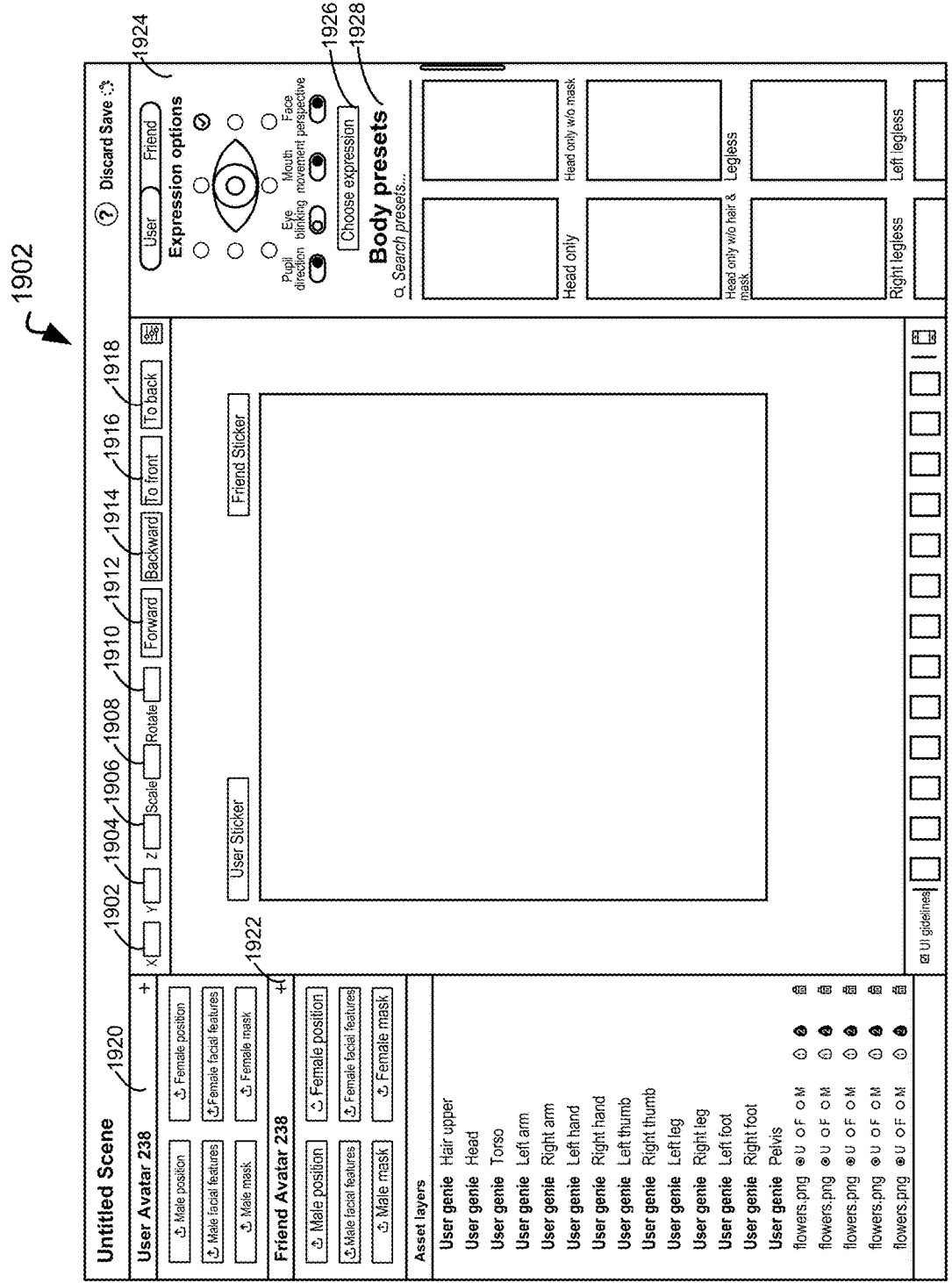
FIG. 19 illustrates a graphical user interface for obtaining a plurality of assets responsive to an event, where the plurality of assets determines a position of a portion of a first avatar in a scene over time (e.g., leg up, leg down, arm up, arm down, head to right, head to left, etc.), where the first avatar is associated with a first user that has designated an interest in a first topical category associated with the event, obtaining the first avatar from a user profile associated with the first user, and forming a sticker comprising an altered version of the first avatar, where the altered version of the first avatar comprises: (i) one or more visible layers that are present in the first avatar and (ii) one or more visible layers that are not present in the first avatar and that include all or a portion of the plurality of assets thereby forming a sticker in accordance with some embodiments.
Figure 20A:
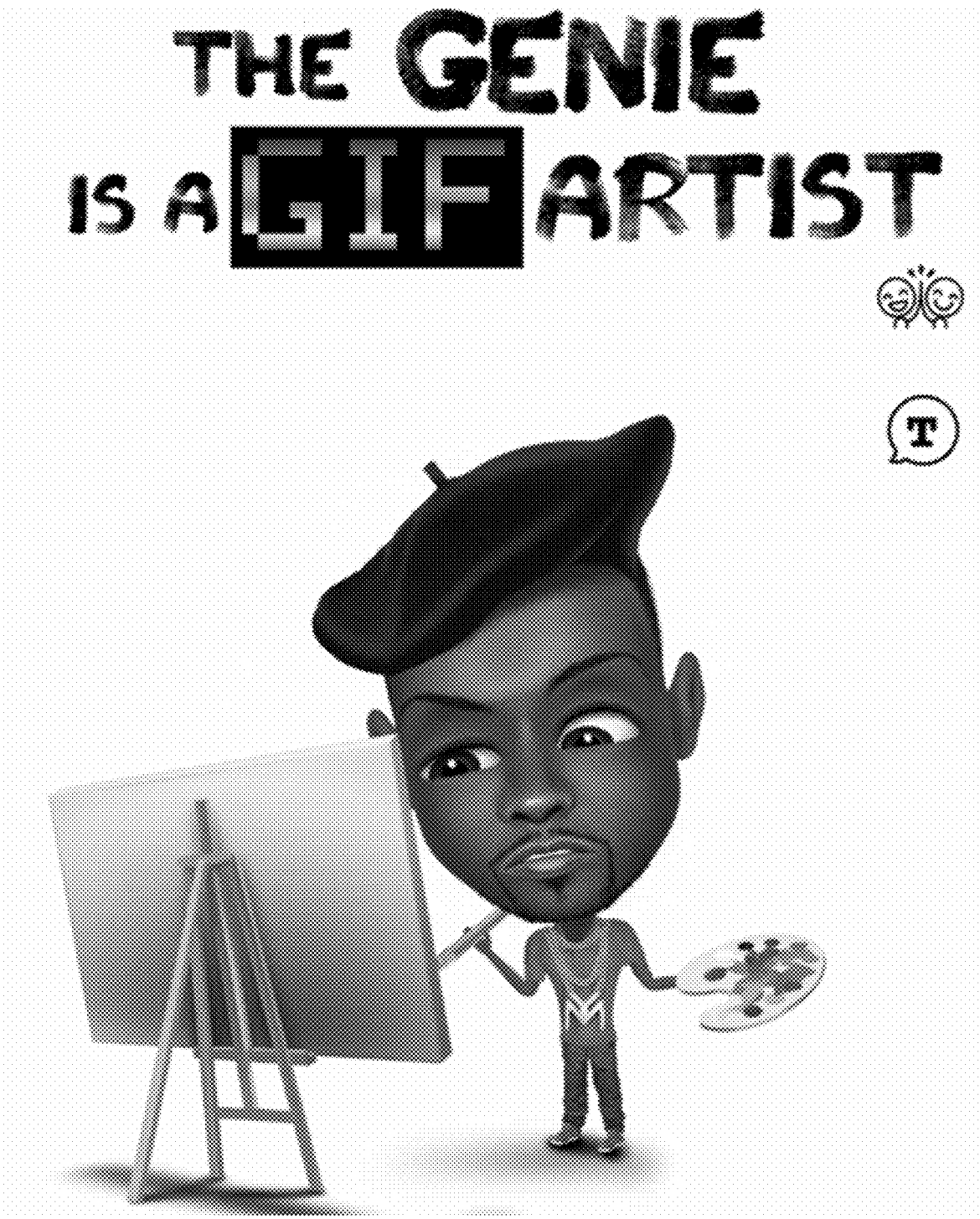
FIGS. 20A, 20B, 20C, and 20D collectively illustrate a sticker in which components within the sticker are animated in accordance with an embodiment of the present disclosure.
Figure 20B:
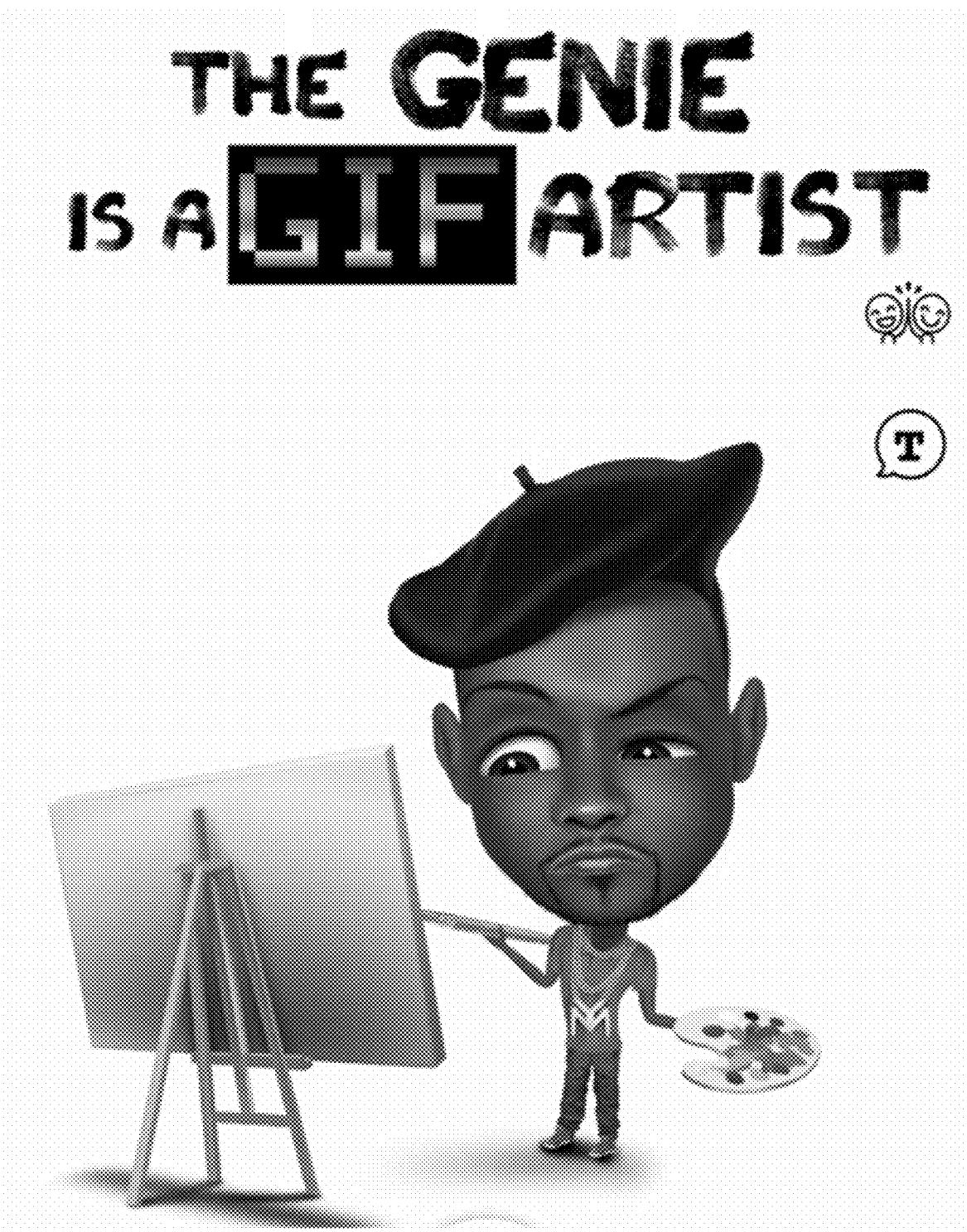
Figure 20C:
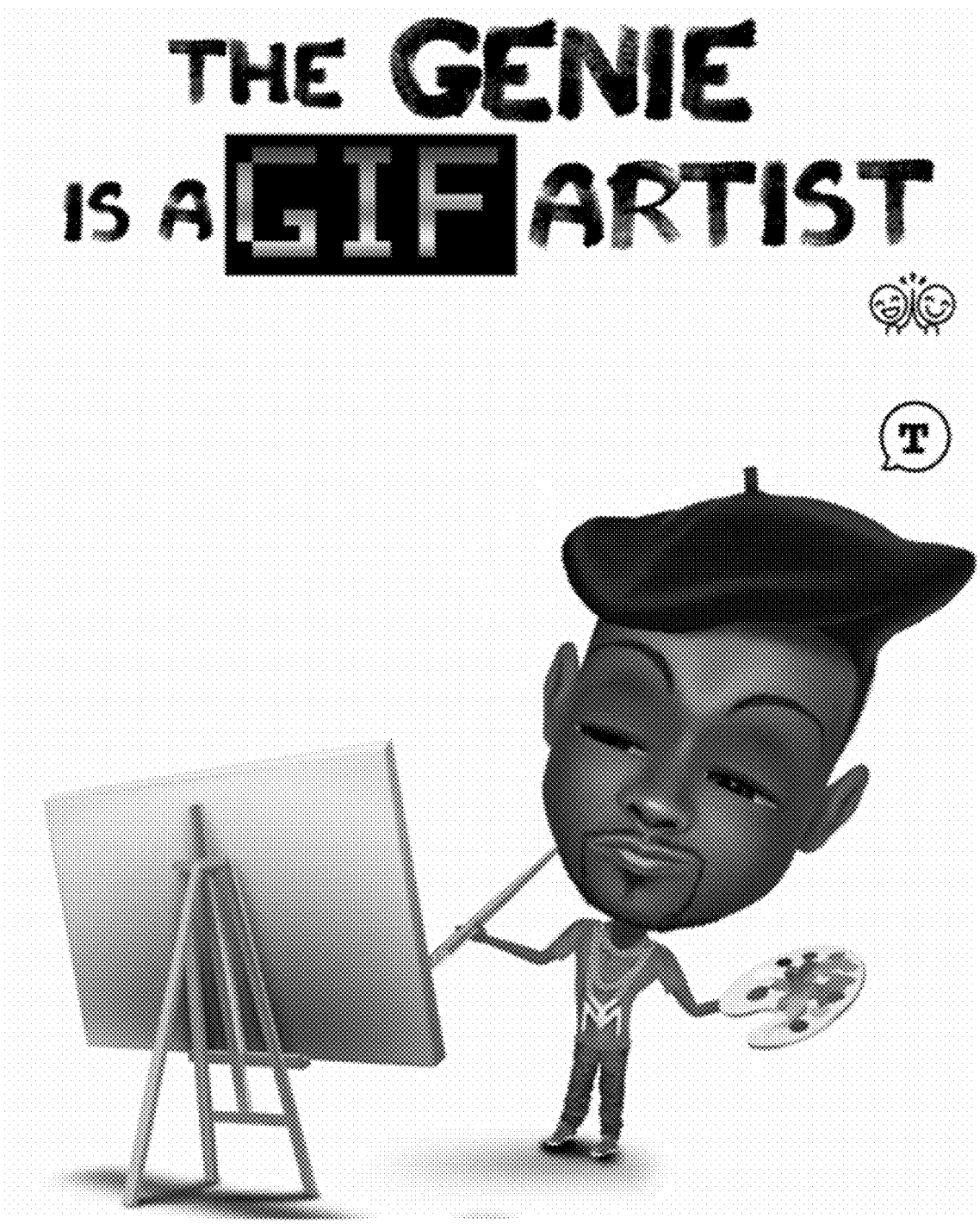
Figure 20D:
Figure 21A:
FIGS. 21A, 21B, 21C, 21D, 21E, 21F, and 21G collectively illustrate a sticker in which components within the sticker are animated in accordance with another embodiment of the present disclosure.
Figure 21B:
Figure 21C:
Figure 21D:
Figure 21E:
Figure 21F:
Figure 21G:

Referring to block 428 of FIG. 4D, in some embodiments, a first affordance (e.g., a check box, a radio button, a slide bar, an input field, a radio button, a drop-down menu, a shopping cart, etc.) is provided by the client application 236 at a time after the selection of the first electronic communication 252. Selection of the first affordance by the first user displays a first tool for selection from a plurality of second avatars other than the first avatar 238. FIG. 18 illustrates an example first tool 1802 for selection from a plurality of second avatars 238 other than the first avatar 238. As illustrated in FIG. 18, each such second avatar 238 is associated with a different user in a contact list 250 of the first user within the client application 236. In some embodiments, additionally or instead of the contact list, an enumerated list of avatars is provided by the client application 236, where each avatar in the enumerated list of avatars represents a different public figure (e.g., figures that are generally known to substantial portions of the public, such as Barrack Obama, Donald Trump, etc.). In some embodiments, the enumerated list of avatars consists of two or more avatars each representing a different public figure. In some embodiments, the enumerated list of avatars consists of five or more avatars each representing a different public figure. In some embodiments, the enumerated list of avatars consists of ten or more avatars each representing a different public figure. Responsive to receiving a selection of one or more second avatars from the plurality of second avatars, the one or more second avatars are compiled into the sticker 256. The dashed box in FIG. 17 illustrates the sticker 256 prior to inclusion of one or more second avatars. In some embodiments, the user uses first tool 1802 illustrated in FIG. 18 to select one or more avatars from the user's contact list 250 and/or an enumerated list of public figures. FIG. 15 then illustrates the inclusion of one such additional avatar from the user's contact list 250 and/or an enumerated list of public figures in the sticker 256.

Referring to block 430 of FIG. 4D, in a similar embodiment, a first affordance is provided within the client application 236 after the selection of the electronic communication 252. User selection of the first affordance displays a first tool for selection from a plurality of second avatars other than the first avatar 238 (e.g., tool 1802 of FIG. 18). Each avatar 238 in the plurality of second avatars is associated with a different user 340 in a contact list 250 of the first user within the application or an enumerated list of avatars provided by the application, where each avatar in the enumerated list of avatars represents a different public figure. Responsive to receiving a selection of one or more second avatars from the plurality of second avatars, the one or more second avatars are compiled from the plurality of avatars into the sticker 256. The forming further comprises concurrently displaying the altered version 258 of the first avatar, the one or more selected second avatars, and an emotion slide bar on the display. An example of this emotion slide bar is emotion slide bar 1602 of FIG. 16. First user selection of each different portion 1604 of the emotion slide bar 1602 provides a different emotion on both (i) the altered version 258 of the first avatar 258-1 and (ii) each second avatar (e.g., avatar 258-2 of FIG. 16) in the one or more second avatars from a discrete set of emotions. That is to say, in such embodiments, the emotion slide bar changes the emotion of each avatar 258 in the sticker 256 to the emotion associated with the different portion 1604 of the emotion slide bar 1602 last contacted by the user. In alternative embodiments, the user can use the emotion slide bar 1602 to change the emotion of a subset of the displayed avatars. For instance, referring to FIG. 16, in some embodiments, the user can use the emotion slide bar 1602 to change avatar 258-1 to a first emotion (a first portion of the emotion slide bar) and then use the emotion slide bar 1602 to change avatar 258-2 to a second emotion (a second portion of the emotion slide bar). Such embodiment require an avatar selection tool not shown in FIG. 16. Furthermore, it will be appreciated that there is no requirement that the emotion slide bar 1602 have a linear shape. In some embodiments, the emotion slide bar 1602 has a closed-form shape (e.g., polygon, elliptical or circular shape) and each different portion 1604 of the slide bar 1062 is associated with a different emotion that can be expressed on the altered avatar 258. Responsive to receiving a user swipe of the emotion slide bar, the emotion displayed on the altered version 258 of the first avatar, and in some embodiments the one or more selected second avatars, is changed to the emotion associated with the different portion 1604 of the emotion slide bar 1602 in which the user swipe ended.

Figure 4E:
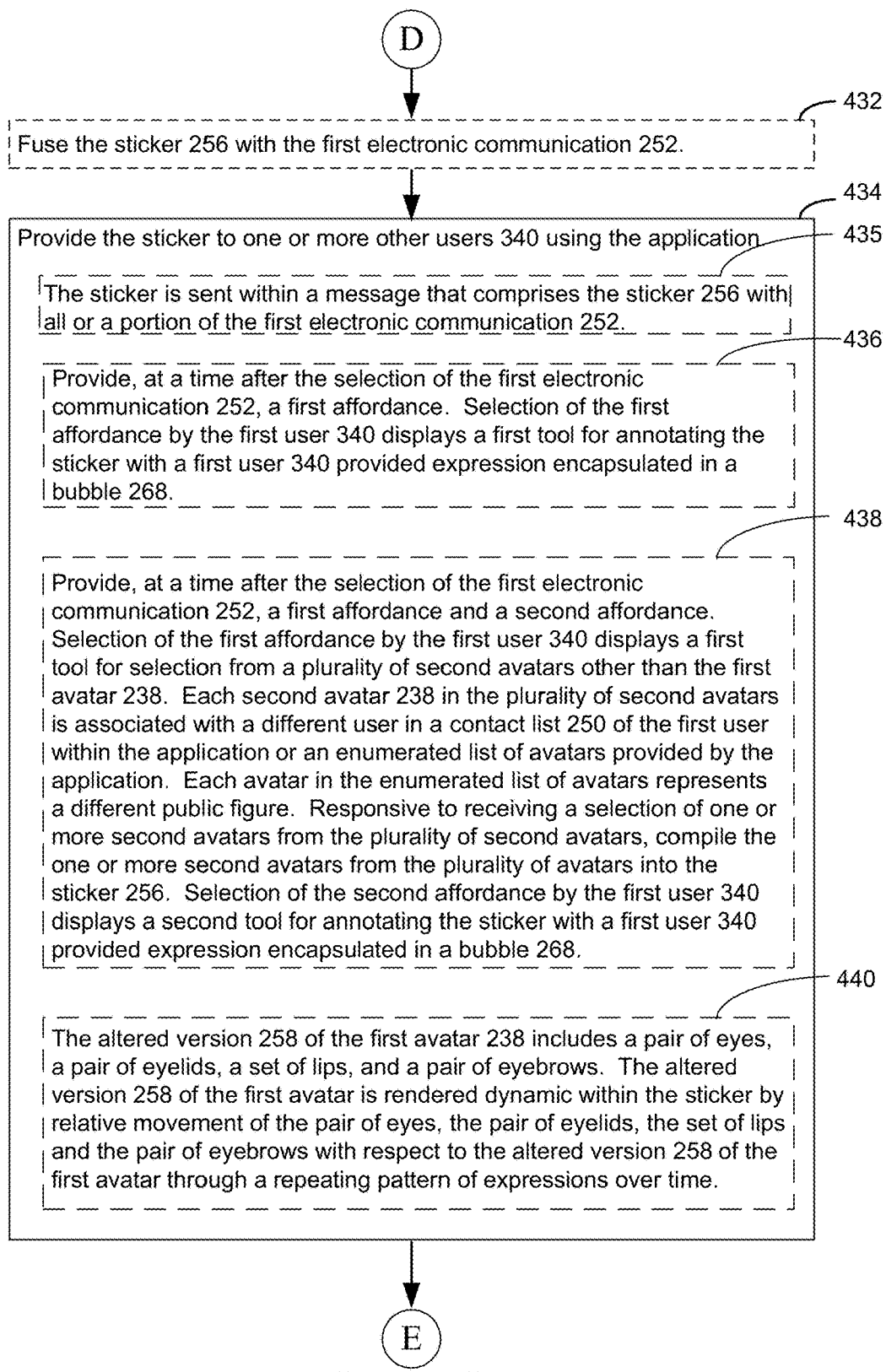

Referring to block 432 of FIG. 4E, in some optional embodiments the sticker 256 that includes the altered avatars is fused with the first electronic communication 252. In some such embodiments this constitutes combining a headline that represents the first electronic communication 252 with the sticker 256. In alternative embodiments, this constitutes altogether replacing the first electronic communication 252 with a sticker 256 that includes a headline 270 that represents the first electronic communication 252. That is to say, in such embodiments, the sticker 256 encompasses the entirety of the displayed message in FIG. 13, not just the dashed box region. In still other embodiments, block 532 constitutes combining a snippet from the original electronic communication 252 with the sticker 256. In still other embodiments, block 532 constitutes combining the entirety of the original electronic communication 252 with the sticker 256, with the sticker 256 overlaying a portion of the original electronic communication 252. In still other embodiments, block 532 constitutes combining the entirety of the original electronic communication 252 with the sticker 256, with the sticker 256 being appended to the original electronic communication 252 so that it does not overlay any part of the original electronic communication 252.

Figure 4F:
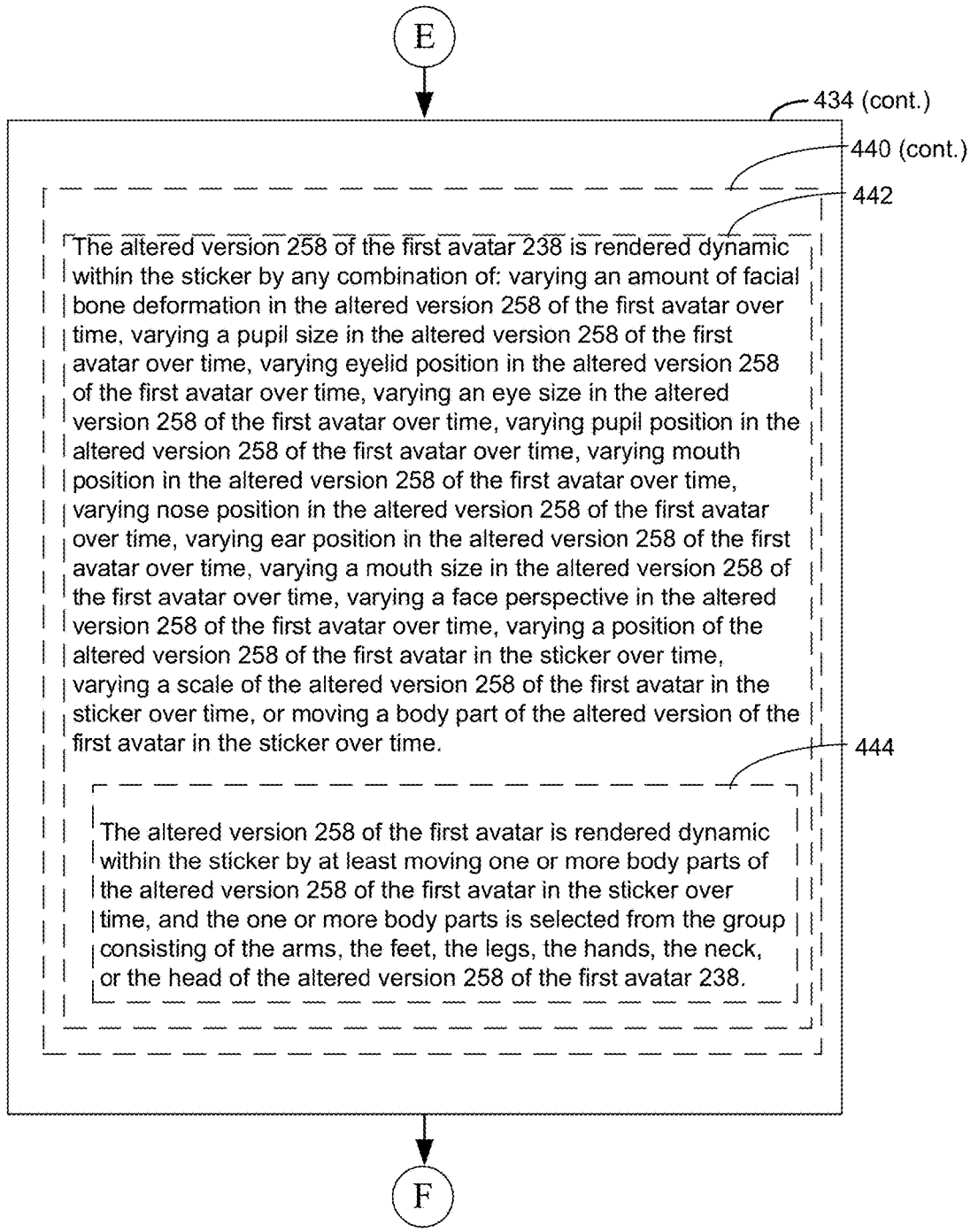

Referring to block 434 of FIG. 4F, after the first user has optionally customized or modified the sticker, using the client application 236, the first user provides the sticker to one or more other users 340. In some embodiments, the client application 236 accomplishes the distribution of the sticker to one or more other users using application programming interface (API) calls that are supported by one or more social networking applications that are installed on the user's client device 102. For instance, if the user has FACEBOOK MESSENGER, TWITTER, SNAPCHAT, iMESSAGE, etc. (or other social networking applications) installed on the client application, API calls supported by these applications can be used by the client application 236 to distribute the sticker to one or more other users that are among the first user's FACEBOOK MESSENGER, TWITTER, SNAPCHAT, iMESSAGE, etc. (or other social networking applications) contacts. As such, the other users do not need to be using an instance of the client application 236 in order to receive a sticker 256 from the first user.

In some embodiments, a headline 270 is synthesized from the original electronic communication 252 and included in the sticker. In some embodiments, the sticker 256 has a headline 270 which conveys a snippet or general synopsis of the original electronic communication 252. In some embodiments, the one or more altered avatars 258 are reacting to the headline 270 in a way that is characteristic of the users represented by the avatars. For instance, if the user is politically conservative, the altered avatar 258 in a given sticker 256 would be reacting negatively to events that would generally be regarded as advancements in liberal policy and would be reacting positively to events that would generally be regarded as advancements in conservative policy. The user then distributes the sticker 252, in accordance with block 434 of FIG. 4F.

Referring to block 435, in some optional embodiments, the sticker 256 is distributed with all or a portion of the first electronic communication 252. The original communication does not have a sticker 256 attached to it. In such optional embodiments, the sticker is added 256 (e.g. in accordance with optional block 432) to the electronic communication 252 using the systems and methods disclosed herein. In such embodiments, the sticker 256 makes the original write up of the event in the original electronic communication 252 more eye catching and entertaining to read. In this way, the client application 236 advances the goal of making write ups of events more interesting to read than conventional online news and event sources.

Figure 14:
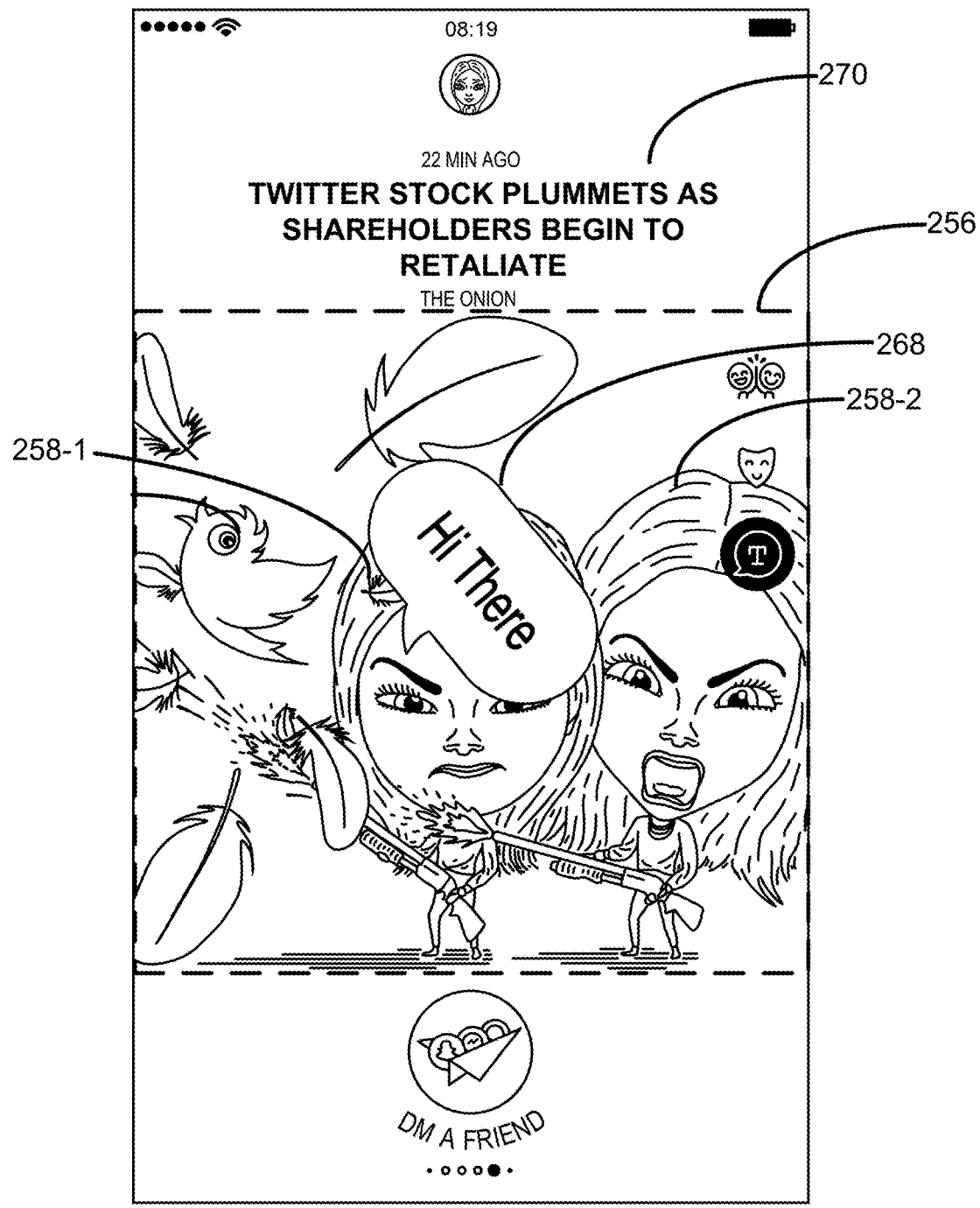
FIG. 14 illustrates providing a sticker to one or more other users using an application, where the sticker comprises: (i) an altered version of a first avatar of a first user responsive to the selection by the first user of an electronic communication, where the altered version of the first avatar comprises one or more visible layers that are present in the first avatar and one or more visible layers that are not present in the first avatar and (ii) a second avatar associated with a different user in a contact list of the first user or an enumerated list of avatars where each avatar in the enumerated list of avatars represents a different public figure in accordance with some embodiments, and (iii) a first user provided expression encapsulated in a bubble in accordance with some embodiments.

Details for systems and methods for customizing an avatar 238 in response to events have been disclosed with reference to blocks 402 through block 434 of FIGS. 4A through 4E. FIG. 4 further discloses variations or additions to such systems and methods. For instance, referring to block 436 of FIG. 4E, in some embodiments, client application 236 provides, at a time after the selection of the first electronic communication 252, a first affordance. Selection of the first affordance by the first user 340 displays a first tool for annotating the sticker with a first user 340 provided expression encapsulated in a bubble 268. FIG. 14 illustrates this result. The user has annotated the sticker with bubble 268 containing the message "Hi There."

Referring to block 438 of FIG. 4F, in some embodiments, client application 236 provides, at a time after the selection of the first electronic communication 252, a first affordance and a second affordance (e.g., a check box, a radio button, a slide bar, an input field, a radio button, a drop-down menu, a shopping cart, etc.). Selection of the first affordance by the first user 340 displays a first tool for selection from a plurality of second avatars other than the first avatar 238. Each second avatar 238 in the plurality of second avatars is associated with a different user in a contact list 250 of the first user within the client application 236 or an enumerated list of avatars provided by the application. Each avatar in the enumerated list of avatars represents a different public figure. Responsive to receiving a selection of one or more second avatars from the plurality of second avatars, the one or more selected second avatars from the plurality of avatars is compiled into the sticker 256. Selection of the second affordance by the first user 340 displays a second tool for annotating the sticker with a first user 340 provided expression encapsulated in a bubble 268. Sticker 256 of FIG. 14 illustrates one such embodiment of the type of sticker 256 produced in accordance with block 438.

Referring to block 440 of FIG. 4F, in some embodiments, the altered version 258 of the first avatar 238 includes a pair of eyes, a pair of eyelids, a set of lips, and a pair of eyebrows as illustrated in FIG. 17. Further, the altered version 258 of the first avatar is rendered dynamic within the sticker by relative movement of the pair of eyes, the pair of eyelids, the set of lips and the pair of eyebrows with respect to the altered version 258 of the first avatar through a repeating pattern of expressions over time. For instance, referring to FIG. 17, in some embodiments, the altered version 258 of the first avatar is rendered dynamic (e.g., within the sticker) by moving the eyebrows of the depicted avatar 258-1 within the sticker 256 through a repeating pattern over time. For example, the eyebrows of the depicted avatar 258-1 within the sticker 256 are posed within the sticker in a first position (e.g., lowered) for few milliseconds, then posed within the sticker in a second position (e.g., straight) for a few milliseconds, and then posed within the sticker in a third position (e.g., raised) for a few milliseconds. This sequence is then repeated with the eyebrows returning to the first position, and then cycling through the second and third position over and over again. In some embodiments, the repeating pattern has three discrete independent positions that are cycled through as outlined above. More typically, the repeating pattern has ten or more discrete independent positions that are cycled through, or one hundred or more discrete independent positions that are cycled through. In some embodiments, each position is depicted for at least one millisecond, at least 10 milliseconds, at least 100 milliseconds, or at least 250 milliseconds before moving on to the next position.

As another example, referring to FIG. 17, in some embodiments, the altered version 258 of the first avatar is rendered dynamic (e.g., within the sticker) by changing the size of the eyes of the depicted avatar 258-1 within the sticker 256 over time, moving the eyelids of the depicted avatar 258-1 within the sticker 256 through a first repeating pattern over time, and moving the lips of the depicted avatar 258-1 within the sticker 256 through a second repeating pattern over time, and/or moving the eyebrows of the depicted avatar 258-1 within the sticker 256 through a third repeating pattern over time where the first, second, and third repeating pattern is the same or different. That is, they may have different numbers of independent positions that are cycled through, and on different timing schedules (e.g., each independent position of the first repeating pattern may be rendered in the sticker 256 for a different amount of time than each independent position of the second repeating patter).

Referring to block 442 of FIG. 4F, in some embodiments, the altered version 258 of the first avatar 238 is rendered dynamic within the sticker by any combination of: varying an amount of facial bone deformation in the altered version 258 of the first avatar over time, varying a pupil size in the altered version 258 of the first avatar over time, varying eyelid position in the altered version 258 of the first avatar over time, varying an eye size in the altered version 258 of the first avatar over time, varying pupil position in the altered version 258 of the first avatar over time, varying mouth position in the altered version 258 of the first avatar over time, varying nose position in the altered version 258 of the first avatar over time, varying ear position in the altered version 258 of the first avatar over time, varying a mouth size in the altered version 258 of the first avatar over time, varying a face perspective in the altered version 258 of the first avatar over time, varying a position of the altered version 258 of the first avatar in the sticker over time, varying a scale of the altered version 258 of the first avatar in the sticker over time, and/or moving a body part of the altered version 258 of the first avatar in the sticker over time. In such embodiments, typically, this variation of the altered version 258 component (e.g., pupil size, eyelid position, eye size, etc.) is in a repeating pattern where eventually each independent position in the pattern is revisited over time.

Referring to block 444 of FIG. 4F, in some embodiments, the altered version 258 of the first avatar is rendered dynamic within the sticker by at least moving one or more body parts of the altered version 258 of the first avatar in the sticker over time, and the one or more body parts is selected from the group consisting of the arms, the feet, the legs, the hands, the neck, or the head of the altered version 258 of the first avatar 238.

Figure 4G:
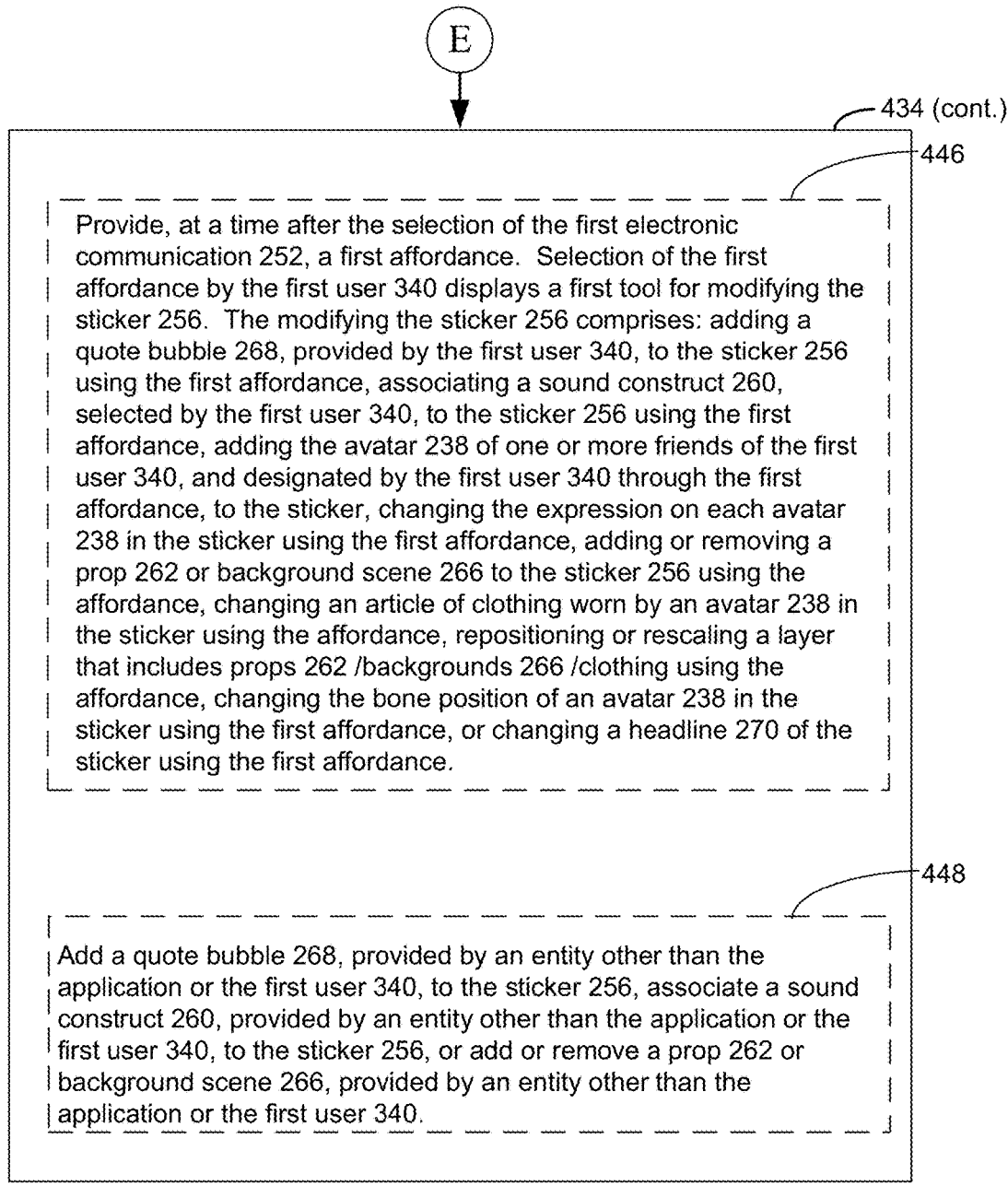

Referring to block 446 of FIG. 4G, in some embodiments, client application 236 provides, at a time after the selection of the first electronic communication 252, a first affordance (e.g., a check box, a radio button, a slide bar, an input field, a radio button, a drop-down menu, a shopping cart, etc.). Selection of the first affordance by the first user 340 displays a first tool for modifying the sticker 256. The modifying the sticker 256 in accordance with block 446 comprises: adding a quote bubble 268, provided by the first user 340, to the sticker 256 using the first affordance, associating a sound construct 260, selected by the first user 340, to the sticker 256 using the first affordance, adding the avatar 238 of one or more friends of the first user 340, and designated by the first user 340 through the first affordance, to the sticker, changing the expression on each avatar 238 in the sticker using the first affordance, adding or removing a prop 262 or background scene 266 to the sticker 256 using the affordance, changing an article of clothing worn by an avatar 238 in the sticker using the affordance, repositioning or rescaling a layer that includes props 262/backgrounds 266/clothing using the affordance, changing the bone position of an avatar 238 in the sticker using the first affordance, and/or changing a headline 270 of the sticker using the first affordance.

In some embodiments, the modifying the sticker 256 in accordance with block 446 comprises associating a sound construct 260, selected by the first user, to the sticker 256. In some embodiments, the sound construct 260 is sound recorded by the first user, such as a recorded message made by the first user. In some embodiments, the sound construct 260 is less than three seconds, less than 10 seconds, less than 30 seconds, less than one minute or less than 5 minutes of sound recorded in an uncompressed audio format, pulse-code modulation (PCM) format, waveform audio file (WAV) format, audio interchange file format (AIFF), MPEG-Audio Layer 3 (MP3) format, advanced audio coding (AAC) format, OGG (Vorbis) format, WINDOWS media audio (WMA) format, free lossless audio (FLAC) format, APPLE lossless audio codec (ALAC) format, WINDOWS media audio (WMA) format, or some other format. In some embodiments, the sound construct is a song or a part of a song. In some embodiments, the sound construct 260 comprises a sound effect, such as horns blowing, a crowd cheering, a crowd booing, or person crying, or a person laughing, etc.

In some embodiments, the modifying the sticker 256 in accordance with block 446 comprises adding or removing a prop 262 to the sticker using the affordance. For instance, FIG. 15 illustrates a prop 262 in the sticker 256. Non-limiting examples of props 262 a user can use to modify the sticker in accordance with block 446 includes furniture, tools, flags, balloons, signs, crosses, weapons, garbage cans, animals, cages, or other objects. In some embodiments, the user selects the prop 262 for inclusion in the sticker 256 from a stock panel of props offered by client application 236. In some embodiments, the user is able to add their own props 262 the stock panel of props offered by client application 236 for inclusion in the sticker 256 in accordance with block 446.

In some embodiments, the modifying the sticker 256 in accordance with block 446 comprises adding a background scene 266 to the sticker 256 using the affordance. FIG. 15 illustrates one such background scene 266, which is highlighted with a dotted line (which is not part of the sticker 256). The background scene 266 of FIG. 15, by way of illustration, includes birds being targeted with guns.

In some embodiments, the modifying the sticker 256 in accordance with block 446 comprises adding and/or changing a headline 270 of the sticker using the first affordance. FIG. 15 illustrates a headline 270. If the user does not edit the headline 270, the headline 270 is the message provided in the original default electronic communication 252 that the user selected at the outset.

Referring to block 448 of FIG. 4F, in some embodiments, the client application 236 adds a quote bubble 268, provided by an entity other than the application or the first user 340, to the sticker 256, associates a sound construct 260, provided by an entity other than the application or the first user 340, to the sticker 256, or adds or removes a prop 262 or background scene 266, provided by an entity other than the application or the first user 340. By way of example, this other entity is a retailer, or other form of business organization that pays to have the quote bubble, sound construct, prop or background scene added to the sticker.

It should be understood that the particular order in which the operations described above and illustrated in FIGS. 4A-4G have been described is merely exemplary and is not intended to indicate that the described order is the only order in which the operations could be performed. One of ordinary skill in the art would recognize various ways to reorder the operations described herein.

Thus FIG. 4 illustrates how client application 236 can be used to take pre-designed assets that will look just like the user. Moreover, by paying attention to the topical categories 248 in the user's profile, when the client application 236 presents the avatar, in the form of an altered avatar 258 to the user, the avatar not only looks like the user, but it also seems to thinks like the user to in that the expressions on altered avatar 258 mimic those that the user would have when reacting to an event. As disclosed in conjunction with FIG. 4, client application 236 enables this by helping the user to create a base avatar 238 that looks just like the user, but then adds different interests (categories 248) to its brain (user profile 246) as discussed above in conjunction with FIG. 8. So the user of client application 236 can add interests (categories 248) such as world events, politics, sports, Hollywood gossip, Silicon Valley technology, Wall Street, Music, Culture, and/or humor. Depending on those interests that the user adds to their brain, if any breaking events within those interests occur during a given epic (e.g., that day, the past hour, the past five minutes) the user will see their avatar 238, now altered in response to the event and in the form of an altered avatar 258 in "real time" (within an hour or two), where the altered avatar 258 appears to be reacting to the event. As an example, consider the case where the user has made an avatar 238 of themselves. The avatar 238 looks just like the user. Moreover, the user has added politics and sports to their brain (e.g., included topical categories 248 "politics" and "sports" to their user profile 246. Consider further that at 12 o'clock that day the Warriors win the championship. When the user opens up the client application 236 at 1 o'clock that day, the user will see their avatar 238, now in the form of an altered avatar 258 jumping on the court with Jeff Curry and Dray Mongreen wearing quick and long shirts. If the user likes this depiction, they can send it to other users.

In this way, client application 236 serves to present news and other events in an entertaining format where the user is watching a mini-clone of themselves, almost a mini-robot of themselves (in the form of altered avatar 258) reenact everything that happened in the world that day. This provides a more interesting way to consume news than traditional methods such as reading *The New York Times* or reading ESPN and so forth, and it is all based on entertainment and allowing the user to subconsciously retain the information that comes along with it and also share it with others.

Building an Avatar Using Minimal Human Intervention.

Turning to FIG. 5, another aspect of the present disclosure is building an avatar using minimal human intervention. For instance, block 502 of FIG. 5A provides a method of customizing an avatar 238, comprising, in accordance with an application on a first electronic device 102 associated with a first user 340, the first electronic device comprising one or more processors, memory, and a touchscreen display: concurrently displaying a first avatar 238, representing the first user 340, and a first composer graphic on the display. Each different portion of the first composer graphic provides a different value 242 for a first trait 240 associated with the first composer graphic. For instance, referring to FIG. 9, each different portion 904 of the first composer graphic 902 provides a different value 242 for the trait 240 "facial hair" that is associated with the first composer graphic 902.

Figure 5A:
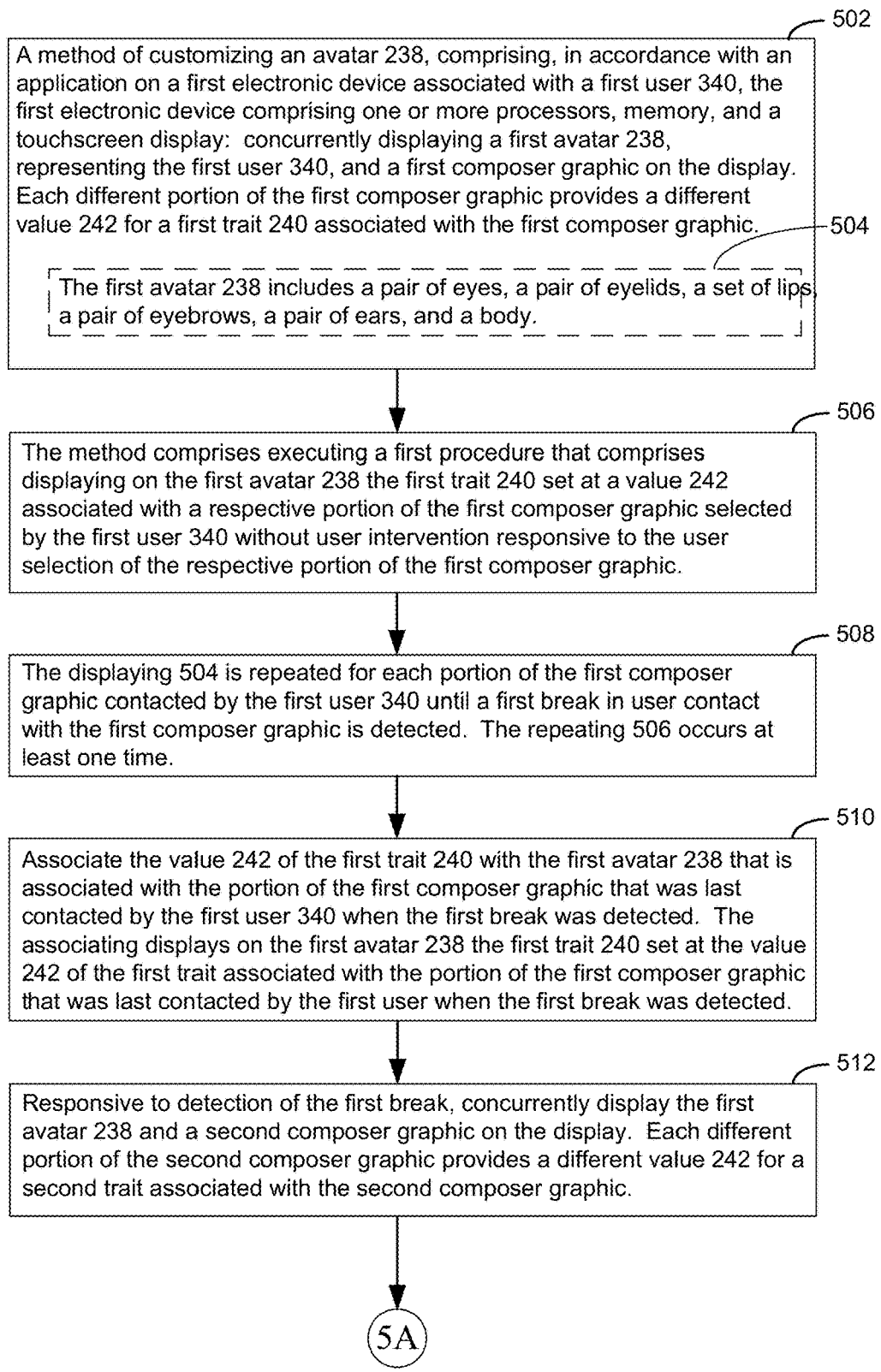

Referring to block 504 of FIG. 5A, and as further illustrated in FIG. 9, in some embodiments the first avatar 238 includes a pair of eyes, a pair of eyelids, a set of lips, a pair of eyebrows, a pair of ears, and a body. Further, referring to block 506 of FIG. 5A, the disclosed method in accordance with FIG. 5 comprises executing a first procedure that comprises displaying on the first avatar 238 the first trait 240 (e.g., facial hair) set at a value 242 associated with a respective portion 904 of the first composer graphic 902 selected by the first user 340 without user intervention (e.g., automatically) responsive to the user selection of the respective portion of the first composer graphic.

Referring to block 506 of FIG. 5A, the displaying of block 504 is repeated for each portion 904 of the first composer graphic 902 contacted by the first user 340 until a first break in user contact with the first composer graphic 902 is detected. The repeating 506 occurs at least one time.

Referring to block 510 of FIG. 5A, the value 242 of the first trait 240 is associated with the first avatar 238 that is associated with the portion 904 of the first composer graphic 902 that was last contacted by the first user 340 when the first break was detected. The associating displays on the first avatar 238 the first trait 240 set at the value 242 of the first trait associated with the portion of the first composer graphic that was last contacted by the first user when the first break was detected.

Then, at block 512 of FIG. 5A, responsive to detection of the first break, the client application 236 concurrently displays the first avatar 238 and a second composer graphic on the display. Each different portion of the second composer graphic provides a different value 242 for a second trait associated with the second composer graphic. FIG. 10 illustrates. In some embodiments the panel illustrated in FIG. 10 is immediately displayed after a user break in the panel displayed in FIG. 9 is detected. Each different portion 1004 of the second composer graphic 1002 provides a different value 242 for the trait "skin color" that is associated with the second composer graphic 1002. As such, the second composer graphic 1002 takes on properties that the user is applying to their avatar. So, if the user opens up the second composer graphic 1002, the user can pick their skin color. In the embodiment illustrated in FIG. 10, the first 75% of the wheel has various shades of human colors. And the second composer graphic 1002 provides more fun colors on the left top. So, if the user slides their finger around the second composer graphic 1002, the avatar 238 will be updated to instantly change to the skin color corresponding to the portion 1004 of the second composer graphic 1002 currently being touched by the user.

Figure 5B:
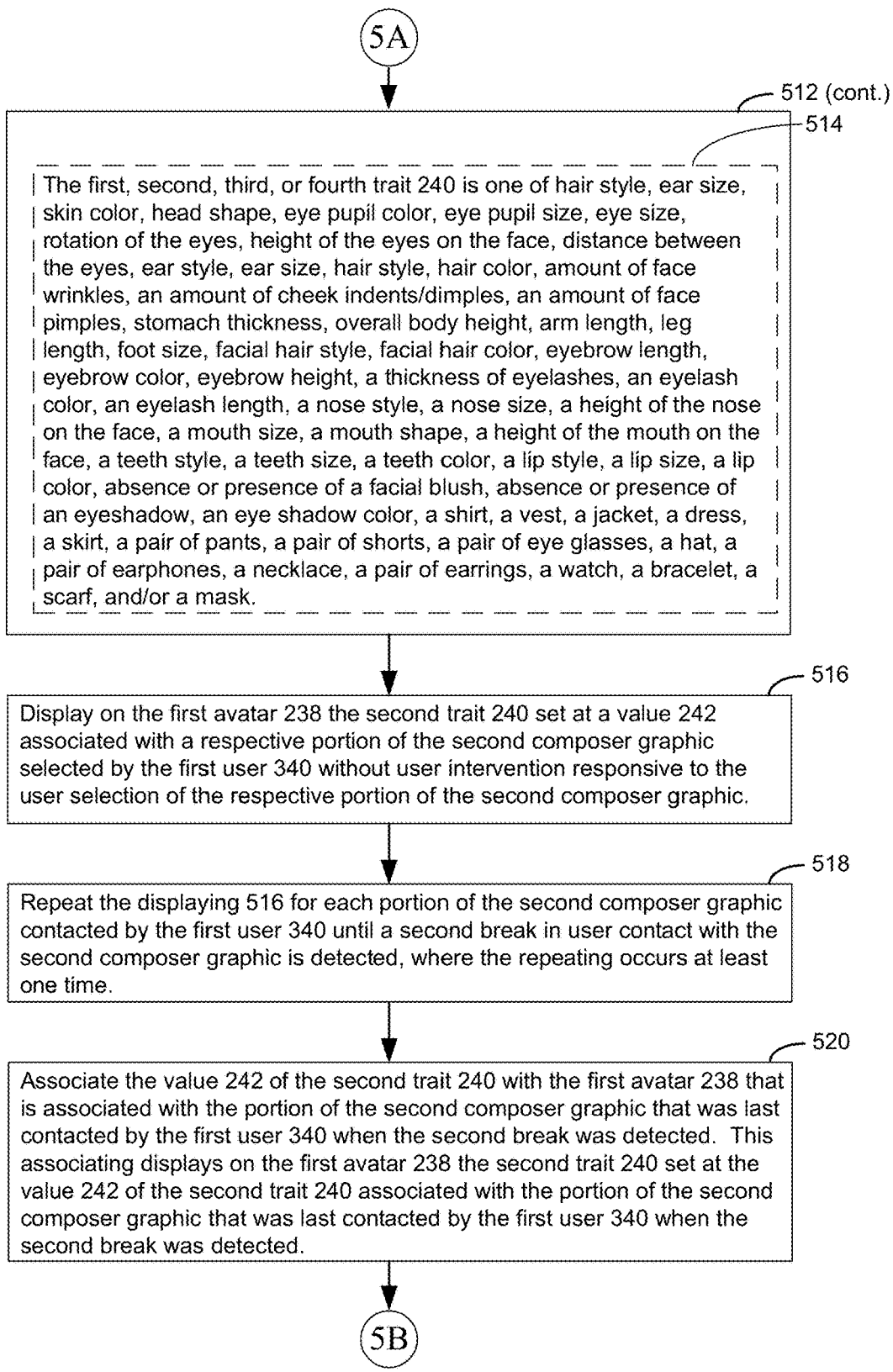

Thus, referring to block 516 of FIG. 5B, the client application 236 displays on the first avatar 238 the second trait 240 set at a value 242 associated with a respective portion 1004 of the second composer graphic 1002 selected by the first user 340 without user intervention (e.g., automatically) responsive to the user selection of the respective portion 1004 of the second composer graphic 1002. Referring to block 518 of FIG. 5B, the client application 236 repeats the displaying 516 for each portion 1004 of the second composer graphic 1004 contacted by the first user 340 until the second break in user contact with the second composer graphic 1002 is detected, where the repeating occurs at least one time. Referring to block 520 of FIG. 5B, the value 242 of the second trait 240 that is associated with the first avatar 238 is the value 242 corresponding to that portion 1004 of the second composer graphic 1002 that was last contacted by the first user 340 when the second break was detected. The associating of block 520 displays on the first avatar 238 the second trait 240 set at the value 242 of the second trait 240 associated with the portion 1004 of the second composer graphic 1002 that was last contacted by the first user 340 when the second break was detected.

In the example illustrated in FIG. 10, when the second break is detected while the panel illustrated in FIG. 10 is being displayed, the avatar 238 is assigned the skin color that corresponds to the last portion of the second composer graphic 1002 that was being touched and, then, the panel illustrated in FIG. 11 is displayed. The panel of FIG. 11 includes a third composer graphic 1102 that lets the user pick their ear size/style. As the user movers their finger around the third composer graphic 1102, the avatar 238 ears grow larger.

When a break is detected while the panel illustrated in FIG. 11 is being displayed, the avatar 238 is assigned the ear size/style that corresponds to the last portion of the third composer graphic 1102 that was being touched and the panel illustrated in FIG. 12 is displayed. The panel of FIG. 12 includes a fourth composer graphic 1202 that lets the user pick their hair style. As the user movers their finger around the fourth composer graphic 1202, the avatar 238 hair grows longer. In this way, the user is able to pick their hair style. If the user is female, they may pick longer hair. If the user is male, they may pick shorter hair (e.g., something more at the beginning of the fourth composer graphic 1202). As illustrated, in FIG. 12, the hair style gets more curly on the upper left hand portions of the fourth composer graphic 1202. Further, to select hair color, the user can select a hair color on the inner composer graphic 1206. Thus, in FIG. 12, a double composer graphic 1202/1206 is concurrently displayed where the outer composer graphic 1202 selects hair style and the inner composer graphic 1206 selects hair color.

The avatar 238 composer illustrated in FIGS. 8 through 12 allows the user to quickly move from one trait 240 to the next in order to set trait values 242 to thereby customize the avatar 238 to look like the user within using the client application 236.

Referring to block 514 of FIG. 5B, in some embodiments, the first, second, third, or fourth trait 240 is one of hair style, ear size, skin color, head shape, eye pupil color, eye pupil size, eye size, rotation of the eyes, height of the eyes on the face, distance between the eyes, ear style, ear size, hair style, hair color, amount of face wrinkles, an amount of cheek indents/dimples, an amount of face pimples, stomach thickness, overall body height, arm length, leg length, foot size, facial hair style, facial hair color, eyebrow length, eyebrow color, eyebrow height, a thickness of eyelashes, an eyelash color, an eyelash length, a nose style, a nose size, a height of the nose on the face, a mouth size, a mouth shape, a height of the mouth on the face, a teeth style, a teeth size, a teeth color, a lip style, a lip size, a lip color, absence or presence of a facial blush, absence or presence of an eyeshadow, an eye shadow color, a shirt, a vest, a jacket, a dress, a skirt, a pair of pants, a pair of shorts, a pair of eye glasses, a hat, a pair of earphones, a necklace, a pair of earrings, a watch, a bracelet, a scarf, and/or a mask.

Figure 5C:
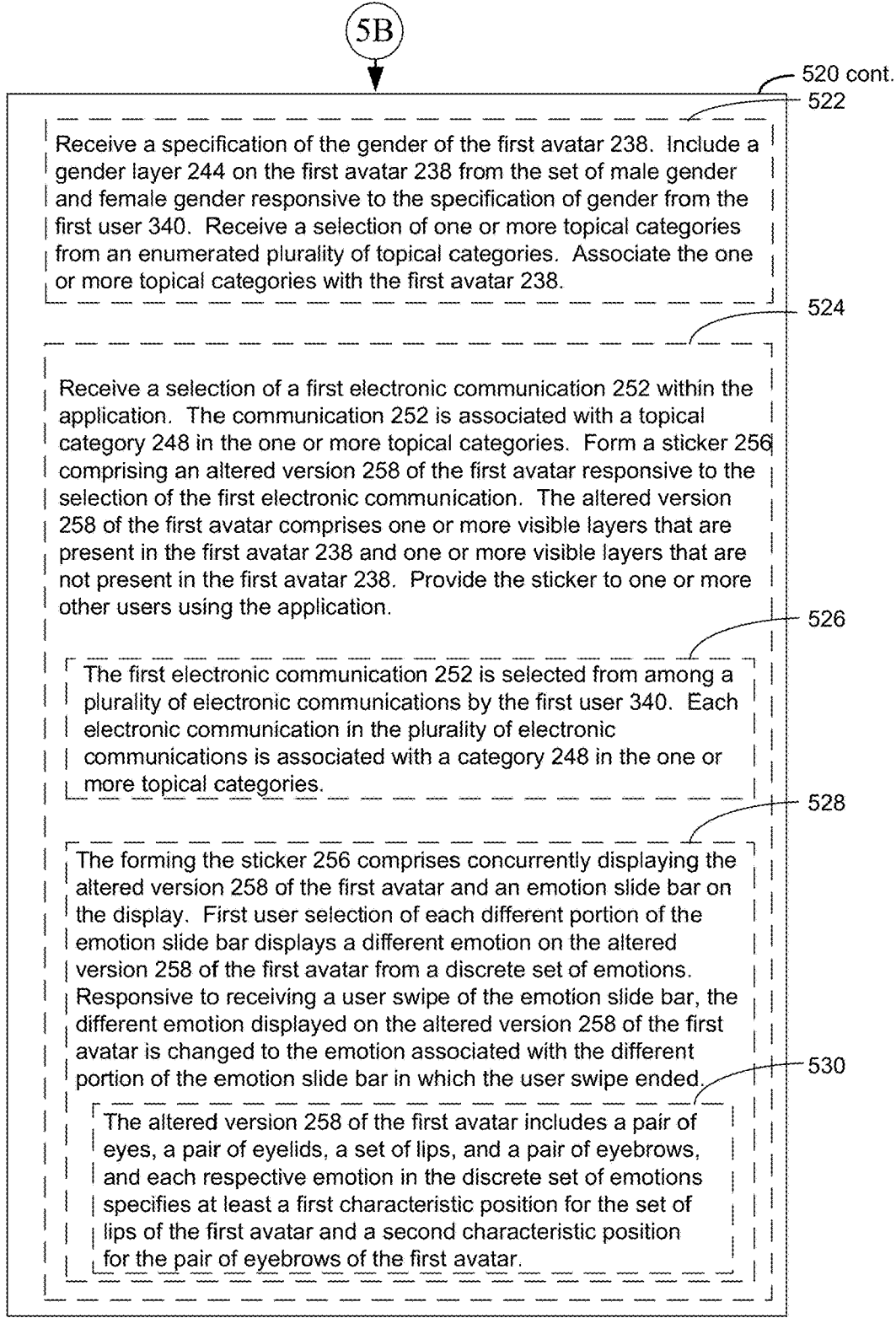

Referring to block 522 of FIG. 5C, in some embodiments, a specification of a gender is received for the first avatar 238 using the client application 236. In such embodiments, a gender layer 244 is included on the first avatar 238 that is selected from the set of "male gender" and "female gender" responsive to the specification of gender from the first user 340. Further, a selection of one or more topical categories 248 from an enumerated plurality of topical categories is obtained, e.g., using the interface illustrated in FIG. 8. The selected one or more topical categories are associated with the first avatar 238 (e.g., by inclusion in the user's profile 246 illustrated in FIG. 2).

Referring to block 524 of FIG. 5C, in some embodiments, a selection of a first electronic communication 252 is received within the client application 236. The electronic communication 252 is associated with a topical category 248 in the one or more topical categories. The method continues by forming a sticker 256 comprising an altered version 258 of the first avatar responsive to the selection of the first electronic communication. The altered version 258 of the first avatar comprises one or more visible layers that are present in the first avatar 238 and one or more visible layers that are not present in the first avatar 238. The purpose of the one or more visible layers that are not present in the first avatar 238 is to alter the expression of the first avatar 238 so that it is seen as "reacting" the information conveyed in the first electronic communication.

In some embodiments, the sticker 256, which may be for example in JPEG or MP4 format, is fused with the first electronic communication. That is, the sticker can be superimposed on the first electronic communication, appended to the first electronic communication, or in any way electronically combined with the first electronic communication.

In some embodiments, the sticker is not fused with the first electronic communication. In some optional embodiments, the sticker is communicated to one or more other users using the client application 236. In some such embodiments, the sticker is in MP4 format or some other format that support animation. In some embodiments, the client application 236 accomplishes the distribution of the sticker to one or more other users using application programming interface (API) calls that are supported by one or more social networking applications that are installed on the user's client device 102. For instance, if the user has FACEBOOK MESSENGER, TWITTER, SNAPCHAT, iMESSAGE, etc. (or other social networking applications) installed on the client application, API calls supported by these applications can be used by the client application 236 to distribute the sticker to one or more other users that are among the first user's FACEBOOK MESSENGER, TWITTER, SNAPCHAT, iMESSAGE, etc. (or other social networking applications) contacts.

Referring to block 526 of FIG. 5C, in some embodiments, the first electronic communication 252 is selected from among a plurality of electronic communications by the first user 340 (e.g., from among at least three electronic communications, from among at least five electronic communications, from among at least 10 electronic communications, etc.). Each electronic communication in the plurality of electronic communications is associated with a category 248 in the one or more topical categories.

Referring to block 528 of FIG. 5C, in some embodiments the forming the sticker 256 comprises concurrently displaying the altered version 258 of the first avatar and an emotion slide bar on the display. An example of this is illustrated in FIG. 16. First user selection of each different portion 1604 of the emotion slide bar 1602 displays a different emotion on the altered version 258 of the first avatar from a discrete set of emotions. In some embodiments, the slide bar includes five or more portions each representing a different emotion, ten or more portions each representing a different emotion, or 25 or more portions each representing a different emotion. Responsive to receiving a user swipe of the emotion slide bar, the different emotion displayed on the altered version 258 of the first avatar is changed to the emotion associated with the different portion of the emotion slide bar in which the user swipe ended. Referring to block 530 of FIG. 5C, in some embodiments the altered version 258 of the first avatar includes a pair of eyes, a pair of eyelids, a set of lips, and a pair of eyebrows, and each respective emotion in the discrete set of emotions specifies at least a first characteristic position for the set of lips of the first avatar and a second characteristic position for the pair of eyebrows of the first avatar.

Figure 5D:
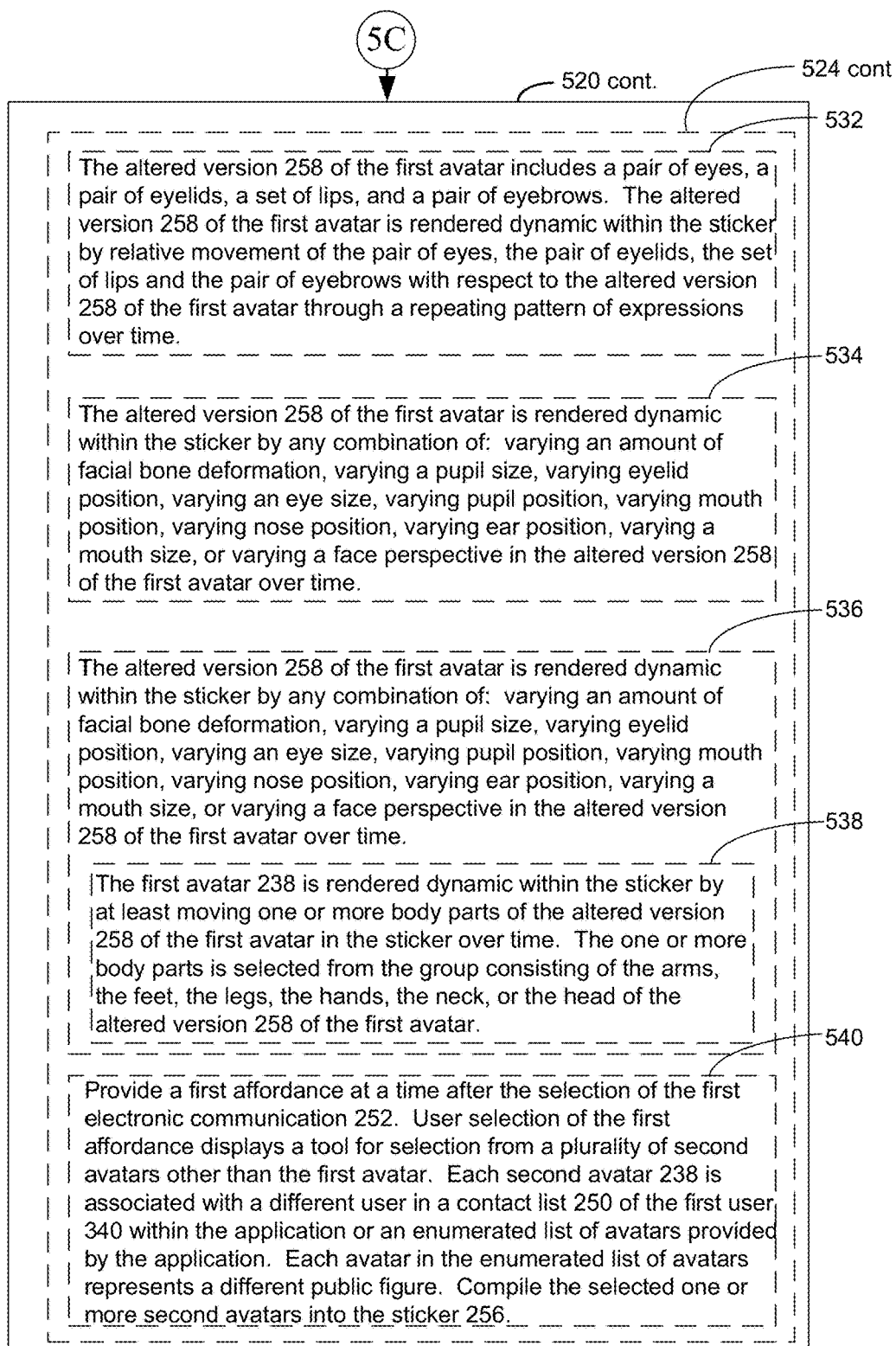

Referring to block 532 of FIG. 5D, in some embodiments, the altered version 258 of the first avatar includes a pair of eyes, a pair of eyelids, a set of lips, and a pair of eyebrows. The altered version 258 of the first avatar is rendered dynamic within the sticker by relative movement of the pair of eyes, the pair of eyelids, the set of lips and the pair of eyebrows with respect to the altered version 258 of the first avatar through a repeating pattern of expressions over time. For instance, referring to FIG. 17, in some embodiments, the altered version 258 of the first avatar is rendered dynamic by moving the eyebrows of the depicted avatar 258-1 within the sticker 256 through a repeating pattern over time. For example, the eyebrows of the depicted avatar 258-1 within the sticker 256 are posed within the sticker in a first position (e.g., lowered) for few milliseconds, then posed within the sticker in a second position (e.g., straight) for a few milliseconds, and then posed within the sticker in a third position (e.g., raised) for a few milliseconds. This sequence is then repeated with the eyebrows returning to the first position, and then cycling through the second and third position over and over again. In some embodiments, the repeating pattern has three discrete independent positions that are cycled through as outlined above. More typically, the repeating pattern has ten or more discrete independent positions that are cycled through, or one hundred or more discrete independent positions that are cycled through. In some embodiments, each position is depicted for at least one millisecond, at least 10 milliseconds, at least 100 milliseconds, or at least 250 milliseconds before moving on to the next position.

Referring to block 534 of FIG. 5D, in some embodiments the altered version 258 of the first avatar is rendered dynamic within the sticker by any combination of: varying an amount of facial bone deformation, varying a pupil size, varying eyelid position, varying an eye size, varying pupil position, varying mouth position, varying nose position, varying ear position, varying a mouth size, or varying a face perspective in the altered version 258 of the first avatar over time.

As another example, referring to FIG. 17, in some embodiments, the altered version 258 of the first avatar is rendered dynamic (e.g., within the sticker) by changing the size of the eyes of the depicted avatar 258-1 within the sticker 256 over time, moving the eyelids of the depicted avatar 258-1 within the sticker 256 through a first repeating pattern over time, and moving the lips of the depicted avatar 258-1 within the sticker 256 through a second repeating pattern over time, and/or moving the eyebrows of the depicted avatar 258-1 within the sticker 256 through a third repeating pattern over time where the first, second, and third repeating pattern is the same or different. That is, they may have different numbers of independent positions that are cycled through, and on different timing schedules (e.g., each independent position of the first repeating pattern may be rendered in the sticker 256 for a different amount of time than each independent position of the second repeating pattern).

Referring to block 536 of FIG. 5D, in some embodiments the altered version 258 of the first avatar is rendered dynamic within the sticker by any combination of: varying an amount of facial bone deformation in the altered version 258 of the first avatar over time, varying a pupil size in the altered version 258 of the first avatar over time, varying eyelid position in the altered version 258 of the first avatar over time, varying an eye size in the altered version 258 of the first avatar over time, varying pupil position in the altered version 258 of the first avatar over time, varying mouth position in the altered version 258 of the first avatar over time, varying nose position in the altered version 258 of the first avatar over time, varying ear position in the altered version 258 of the first avatar over time, varying a mouth size in the altered version 258 of the first avatar over time, or varying a face perspective in the altered version 258 of the first avatar over time.

Referring to block 536 of FIG. 5D, in some embodiments, the first avatar 238 is rendered dynamic within the sticker by at least moving one or more body parts of the altered version 258 of the first avatar in the sticker over time. The one or more body parts is selected from the group consisting of the arms, the feet, the legs, the hands, the neck, or the head of the altered version 258 of the first avatar.

Referring to block 540 of FIG. 5D, in some embodiments the client application 236 provides a first affordance (e.g., a check box, a radio button, a slide bar, an input field, a radio button, a drop-down menu, a shopping cart, etc.) at a time after the selection of the first electronic communication 252. User selection of the first affordance displays a tool for selection from among a plurality of second avatars other than the first avatar. Each second avatar 238 is associated with a different user in a contact list 250 of the first user 340 within the application or an enumerated list of avatars provided by the application. Each avatar in the enumerated list of avatars represents a different public figure. Further, the selected one or more second avatars are compiled into the sticker 256.

Figure 5E:
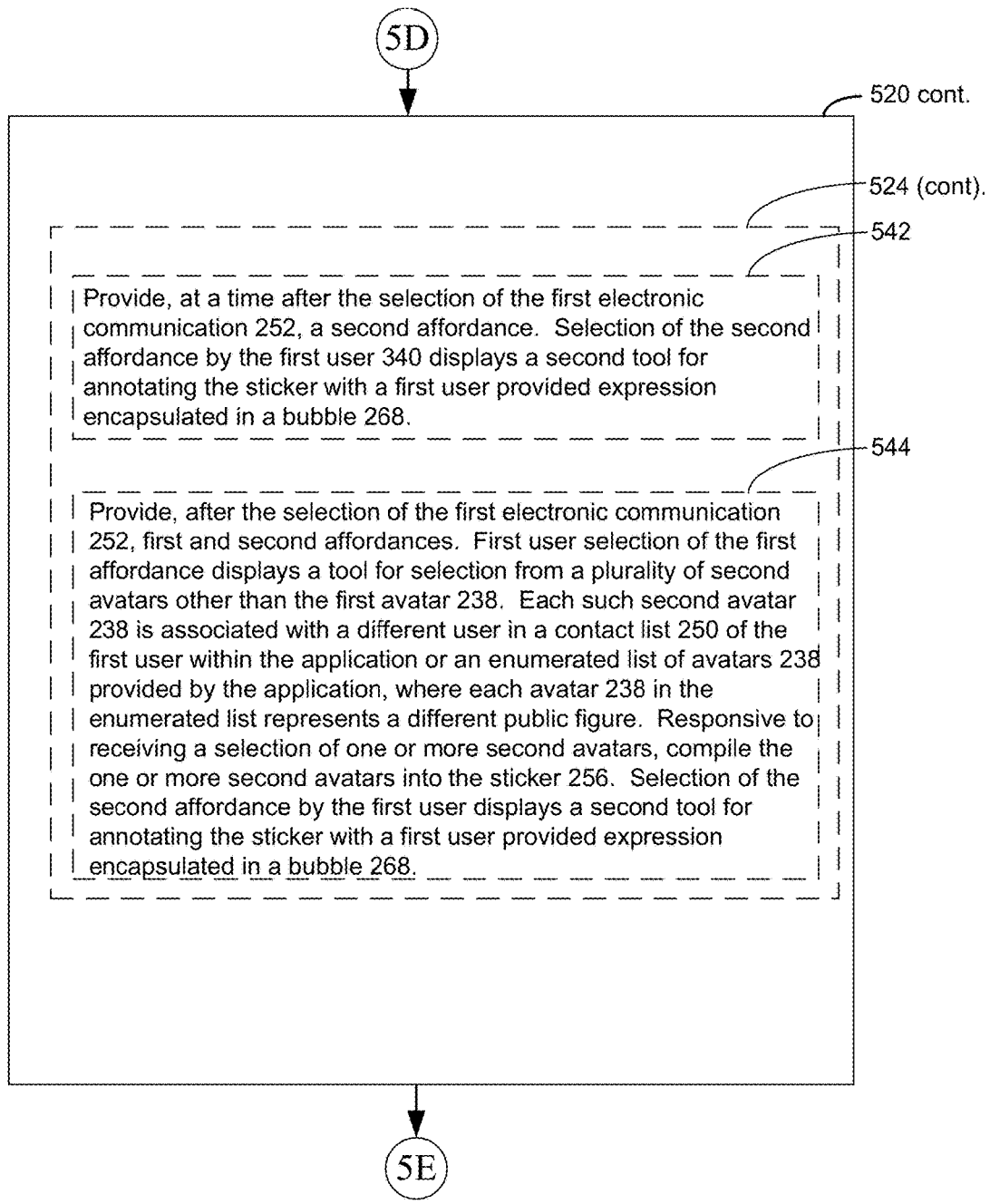

Referring to block 542 of FIG. 5E, in some embodiments, the client application 236 provides, at a time after the selection of the first electronic communication 252, a second affordance (e.g., a check box, a radio button, a slide bar, an input field, a radio button, a drop-down menu, a shopping cart, etc.). Selection of the second affordance by the first user 340 displays a second tool for annotating the sticker with a first user provided expression encapsulated in a bubble 268. FIG. 14 illustrates this result. The user has annotated the sticker with bubble 268 containing the message "Hi There."

Referring to block 544 of FIG. 5E, in some embodiments, the client application 236 provides, after the selection of the first electronic communication 252, first and second affordances (e.g., a check box, a radio button, a slide bar, an input field, a radio button, a drop-down menu, a shopping cart, etc.). First user selection of the first affordance displays a tool for selection from a plurality of second avatars other than the first avatar 238. Each such second avatar 238 is associated with a different user in a contact list 250 of the first user within the application or an enumerated list of avatars 238 provided by the application, where each avatar 238 in the enumerated list represents a different public figure. Responsive to receiving a selection of one or more second avatars, the client application 236 compiles the one or more second avatars into the sticker 256. Selection of the second affordance by the first user causes the client application 236 to display a second tool for annotating the sticker with a first user provided expression encapsulated in a bubble 268.

Referring to block 546 of FIG. 5F, in some embodiments, the client application 236 provides, at a time after the selection of the first electronic communication 252, a first affordance (e.g., a check box, a radio button, a slide bar, an input field, a radio button, a drop-down menu, a shopping cart, etc.). First user 340 selection of the first affordance displays a tool for selection from a plurality of second avatars 238 other than the first avatar 238. Each such second avatar is associated with a different user 340 in a contact list 250 of the first user 340 within the application or an enumerated list of avatars provided by the application, each avatar in the enumerated list of avatars representing a different public figure. Responsive to receiving a selection of one or more second avatars from the plurality of avatars, the client application 236 compiles the one or more second avatars from the plurality of avatars into the sticker 256. The forming further comprises concurrently displaying the altered version 258 of the first avatar, the one or more selected second avatars, and an emotion slide bar on the display. First user 340 selection of each different portion of the emotion slide bar provides a different emotion on the altered version 258 of the first avatar and each second avatar in the one or more second avatars from a discrete set of emotions. An example of this is illustrated in FIG. 16. First user selection of each different portion 1602 of the emotion slide bar 1602 displays a different emotion on the altered version 258 of the first avatar and each second avatar in the one or more second avatars from a discrete set of emotions. Responsive to receiving a user swipe of the emotion slide bar 1602, the emotion displayed on the altered version 258 of the first avatar and the one or more selected second avatars is changed to the emotion associated with the different portion 1604 of the emotion slide bar 1602 in which the user swipe ended.

Referring to block 548 of FIG. 5F, in some embodiments, the first electronic communication 252 is a news article received from a remote publication source. For instance, in some embodiments the remote publication source is CABLE NEWS NETWORK (CNN), FOX NEWS, REUTERS, or the ASSOCIATED PRESS and the news article is published by one of these remote publication sources over communication network 104.

Referring to block 550 of FIG. 5F, in some embodiments the client application 236 provides, at a time after the selection of the first electronic communication 252, a first affordance (e.g., a check box, a radio button, a slide bar, an input field, a radio button, a drop-down menu, a shopping cart, etc.). Selection of the first affordance by the first user displays a first tool for modifying the sticker 256. The modifying the sticker in accordance with block 550 comprises adding a quote bubble 268, provided by the first user, to the sticker 256 using the first affordance, associating a sound construct 260, selected by the first user, to the sticker 256 using the first affordance, adding the avatar 238 of one or more friends of the first user, and designated by the first user through the first affordance, to the sticker, changing the expression on each avatar 238 in the sticker 256 using the first affordance, adding or removing a prop 262 or background scene 266 to the sticker using the affordance, changing an article of clothing worn by an avatar 238 in the sticker using the affordance, repositioning or rescaling a layer that includes props 262/backgrounds 266/clothing using the affordance, changing the bone position of an avatar 238 in the sticker 256 using the first affordance, and/or changing a headline 270 of the sticker using the first affordance.

In some embodiments, the modifying the sticker 256 in accordance with block 550 comprises associating a sound construct 260, selected by the first user, to the sticker 256. In some embodiments, the sound construct 260 is sound recorded by the first user, such as a recorded message made by the first user. In some embodiments, the sound construct 260 is less than three seconds, less than 10 seconds, less than 30 seconds, less than one minute or less than 5 minutes of sound recorded in an uncompressed audio format, pulse-code modulation (PCM) format, waveform audio file (WAV) format, audio interchange file format (AIFF), MPEG-Audio Layer 3 (MP3) format, advanced audio coding (AAC) format, OGG (Vorbis) format, WINDOWS media audio (WMA) format, free lossless audio (FLAC) format, APPLE lossless audio codec (ALAC) format, WINDOWS media audio (WMA) format, or some other format. In some embodiments, the sound construct is a song or a part of a song. In some embodiments, the sound construct 260 comprises a sound effect, such as horns blowing, a crowd cheering, a crowd booing, or person crying, or a person laughing, etc.

In some embodiments, the modifying the sticker 256 in accordance with block 550 comprises adding or removing a prop 262 to the sticker using the affordance. For instance, FIG. 15 illustrates a prop 262 in the sticker 256. Non-limiting examples of props 262 a user can use to modify the sticker in accordance with block 446 includes furniture, tools, flags, balloons, signs, crosses, weapons, garbage cans, animals, cages, or other objects. In some embodiments, the user selects the prop 262 for inclusion in the sticker 256 from a stock panel of props offered by client application 236. In some embodiments, the user is able to add their own props 262 the stock panel of props offered by client application 236 for inclusion in the sticker 256 in accordance with block 446.

In some embodiments, the modifying the sticker 256 in accordance with block 550 comprises adding a background scene 266 to the sticker 256 using the affordance. FIG. 15 illustrates one such background scene 266, which is highlighted with a dotted line (which is not part of the sticker 256). The background scene 266 of FIG. 15, by way of illustration, includes birds being targeted with guns.

In some embodiments, the modifying the sticker 256 in accordance with block 550 comprises adding and/or changing a headline 270 of the sticker using the first affordance. FIG. 15 illustrates a headline 270. If the user does not edit the headline 270, the headline 270 is the message provided in the original default electronic communication 252 that the user selected at the outset.

Using an Elliptical First Composer Graphic to Customize an Avatar.

FIGS. 6A-6F detail systems and methods for using an elliptical first composer graphic to customize an avatar. Referring to block 602, a method of customizing a first avatar 238, comprising, in accordance with a client application 236 on a first electronic device 102 associated with a first user 340, the first electronic device comprising one or more processors, memory, and a display: concurrently displaying the first avatar 238, representing the first user 340, and a first elliptical composer graphic on the display. Each different portion of the first elliptical composer graphic provides a different value 242 for a first trait 240 associated with the first elliptical composer graphic. For instance, referring to FIG. 9, each different portion 904 of the first elliptical composer graphic 902 provides a different value 242 for the trait 240 "facial hair" that is associated with the first composer graphic 902.

Figure 6A:
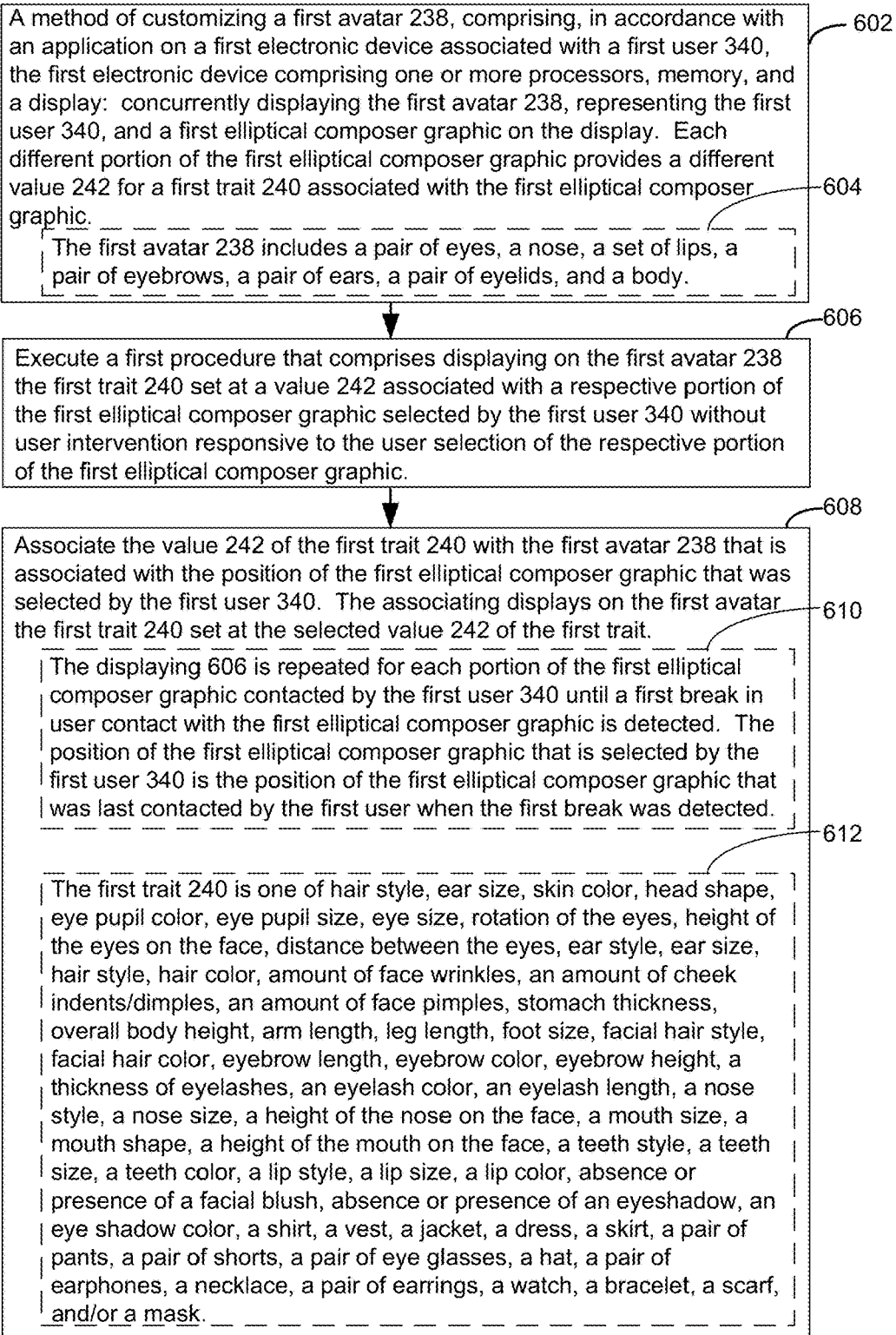

Referring to 604 of FIG. 6A, and as further illustrated in FIG. 9, in some embodiments the first avatar 238 includes a pair of eyes, a nose, a set of lips, a pair of eyebrows, a pair of ears, a pair of eyelids, and a body. Further, referring to block 606 of FIG. 6A, the disclosed method in accordance with FIG. 6 comprises executing a first procedure that comprises displaying on the first avatar 238 the first trait 240 set at a value 242 associated with a respective portion of the first elliptical composer graphic selected by the first user 340 without user intervention (e.g., automatically) responsive to the user selection of the respective portion of the first elliptical composer graphic.

Referring to block 608 of FIG. 6A, the client application 236 associates the value 242 of the first trait 240 with the first avatar 238 that is associated with the position of the first elliptical composer graphic that was selected by the first user 340. The associating displays on the first avatar the first trait 240 set at the selected value 242 of the first trait. As referenced by block 610 of FIG. 6A, the displaying 606 is repeated for each portion of the first elliptical composer graphic contacted by the first user 340 until a first break in user contact with the first elliptical composer graphic is detected. The position of the first elliptical composer graphic that is selected by the first user 340 is the position of the first elliptical composer graphic that was last contacted by the first user when the first break was detected.

Referring to block 612 of FIG. 6A, in some embodiments the first trait 240 is one of hair style, ear size, skin color, head shape, eye pupil color, eye pupil size, eye size, rotation of the eyes, height of the eyes on the face, distance between the eyes, ear style, ear size, hair style, hair color, amount of face wrinkles, an amount of cheek indents/dimples, an amount of face pimples, stomach thickness, overall body height, arm length, leg length, foot size, facial hair style, facial hair color, eyebrow length, eyebrow color, eyebrow height, a thickness of eyelashes, an eyelash color, an eyelash length, a nose style, a nose size, a height of the nose on the face, a mouth size, a mouth shape, a height of the mouth on the face, a teeth style, a teeth size, a teeth color, a lip style, a lip size, a lip color, absence or presence of a facial blush, absence or presence of an eyeshadow, an eye shadow color, a shirt, a vest, a jacket, a dress, a skirt, a pair of pants, a pair of shorts, a pair of eye glasses, a hat, a pair of earphones, a necklace, a pair of earrings, a watch, a bracelet, a scarf, and/or a mask.

Referring to block 614 of FIG. 6B, the client application 236 concurrently displays the first avatar 238 and a second elliptical composer graphic on the display after the first trait 240 is selected. FIG. 10 illustrates. In some embodiments the panel illustrated in FIG. 10 is immediately displayed after a user break in the panel displayed in FIG. 9 is detected. Each different portion 1004 of the second elliptical composer graphic 1002 provides a different value 242 for the trait "skin color" that is associated with the second elliptical composer graphic 1002. As such, the second elliptical composer graphic 1002 takes on properties that the user is applying to their avatar 238. So, if the user opens up the second elliptical composer graphic 1002, the user can pick their skin color. In the embodiment illustrated in FIG. 10, the first 75% of the second elliptical composer graphic has various shades of human colors. And the second elliptical composer graphic 1002 provides more fun colors on the left top. So, if the user slides their finger around the second elliptical composer graphic 1002, the avatar 238 will be updated to instantly change to the skin color corresponding to the portion 1004 of the second elliptical composer graphic 1002 currently being touched by the user. As such, the method further comprises executing a second procedure comprising: (i) displaying on the first avatar the second trait set at a value 242 associated with a respective position of the second elliptical composer graphic selected by the first user 340 without user intervention responsive to the user selection of the respective position of the second elliptical composer graphic, and (ii) associating the value of the first trait with the first avatar 238 that is associated with the position of the second elliptical composer graphic that was selected by the first user 340. This associating displays on the first avatar the second trait set at the selected value 242 of the second trait.

Referring to block 616 of FIG. 6B, the client application 236 repeats the displaying for each portion 1004 of the second elliptical composer graphic 1002 contacted by the first user 340 until a break in user contact with the second elliptical composer graphic 1002 is detected. The position 1004 of the second elliptical component 1002 that is selected by the first user 340 is the position of the second elliptical composer graphic 1002 that was last contacted by the first user 340 when the break with the second elliptical component 1002 was detected.

Referring to block 618 of FIG. 6B, in some embodiments, the method further comprises receiving a specification of a gender of the first avatar 238. In such instances, the client application 236 includes a gender layer 244 on the first avatar 238 that is selected from the set of "male gender" and "female gender" responsive to the specification of gender from the first user 340. Moreover, in accordance with block 618, the client application 234 receives a selection of one or more topical categories 248 from an enumerated plurality of topical categories (e.g., using the interface illustrated in FIG. 8), and associates the one or more topical categories with the first avatar 238 (e.g., by inclusion in the user's profile 246 illustrated in FIG. 2).

Referring to block 620 of FIG. 6C, in some embodiments a selection of a first electronic communication 252 is received within the client application 236. The electronic communication 252 is associated with a topical category 248 in the one or more topical categories. The method continues by forming a sticker 256 comprising an altered version 258 of the first avatar responsive to the selection of the first electronic communication 252. The altered version 258 of the first avatar comprises one or more visible layers that are present in the first avatar and one or more visible layers that are not present in the first avatar. The purpose of the one or more visible layers that are not present in the first avatar 238 is to alter the expression of the first avatar 238 so that it is seen as "reacting" the information conveyed in the first electronic communication.

In some such embodiments, the sticker 256, which may be for example in JPEG format, is fused with the first electronic communication 252 to form a message. In some such embodiments, the message is communicated to one or more other users 340 using the application. In some embodiments, the client application 236 accomplishes the distribution of the message to one or more other users using application programming interface (API) calls that are supported by one or more social networking applications that are installed on the user's client device 102. For instance, if the user has FACEBOOK MESSENGER, TWITTER, SNAPCHAT, iMESSAGE, etc. (or other social networking applications) installed on the client application, API calls supported by these applications can be used by the client application 236 to distribute the message to one or more other users that are among the first user's FACEBOOK MESSENGER, TWITTER, SNAPCHAT, iMESSAGE, etc. (or other social networking applications) contacts.

In some embodiments, the sticker 256, which may be for example in JPEG format as discussed above, is not fused with the first electronic communication 252. In some embodiments, the sticker 256, is in MP4 format or some other format that supports animation. Further in such embodiments, the sticker 256 is not fused with the first electronic communication 252. In some such embodiments, the sticker is communicated to one or more other users 340 using the application. In some such embodiments, the client application 236 accomplishes the communication of the sticker to one or more other users using application programming interface (API) calls that are supported by one or more social networking applications that are installed on the user's client device 102. For instance, if the user has FACEBOOK MESSENGER, TWITTER, SNAPCHAT, iMESSAGE, etc. (or other social networking applications) installed on the client application, API calls supported by these applications can be used by the client application 236 to distribute the sticker to one or more other users that are among the first user's FACEBOOK MESSENGER, TWITTER, SNAPCHAT, iMESSAGE, etc. (or other social networking applications) contacts.

Referring to block 622 of FIG. 6C, in some embodiments, the first electronic communication 252 is selected from among a plurality of electronic communications by the first user 340 (e.g., from among at least three electronic communications, from among at least five electronic communications, from among at least 10 electronic communications, etc.). Each electronic communication in the plurality of electronic communications is associated with a category 248 in the one or more topical categories.

Referring to block 624 of FIG. 6C, in some embodiments, the forming the sticker 256 comprises concurrently displaying the altered version 258 of the first avatar and an emotion slide bar on the display. An example of this is illustrated in FIG. 16. First user selection of each different portion 1604 of the emotion slide bar 1602 displays a different emotion on the altered version 258 of the first avatar from a discrete set of emotions. In some embodiments, the slide bar includes five or more portions each representing a different emotion, ten or more portions each representing a different emotion, or 25 or more portions each representing a different emotion. Responsive to receiving a user swipe of the emotion slide bar, the different emotion displayed on the altered version 258 of the first avatar is changed to the emotion associated with the different portion of the emotion slide bar in which the user swipe ended. Referring to block 626 of FIG. 6C, in some embodiments the altered version 258 of the first avatar includes a pair of eyes, a pair of eyelids, a set of lips, and a pair of eyebrows, and each respective emotion in the discrete set of emotions specifies at least a first characteristic position for the set of lips of the first avatar and a second characteristic position for the pair of eyebrows of the first avatar.

Figure 6D:
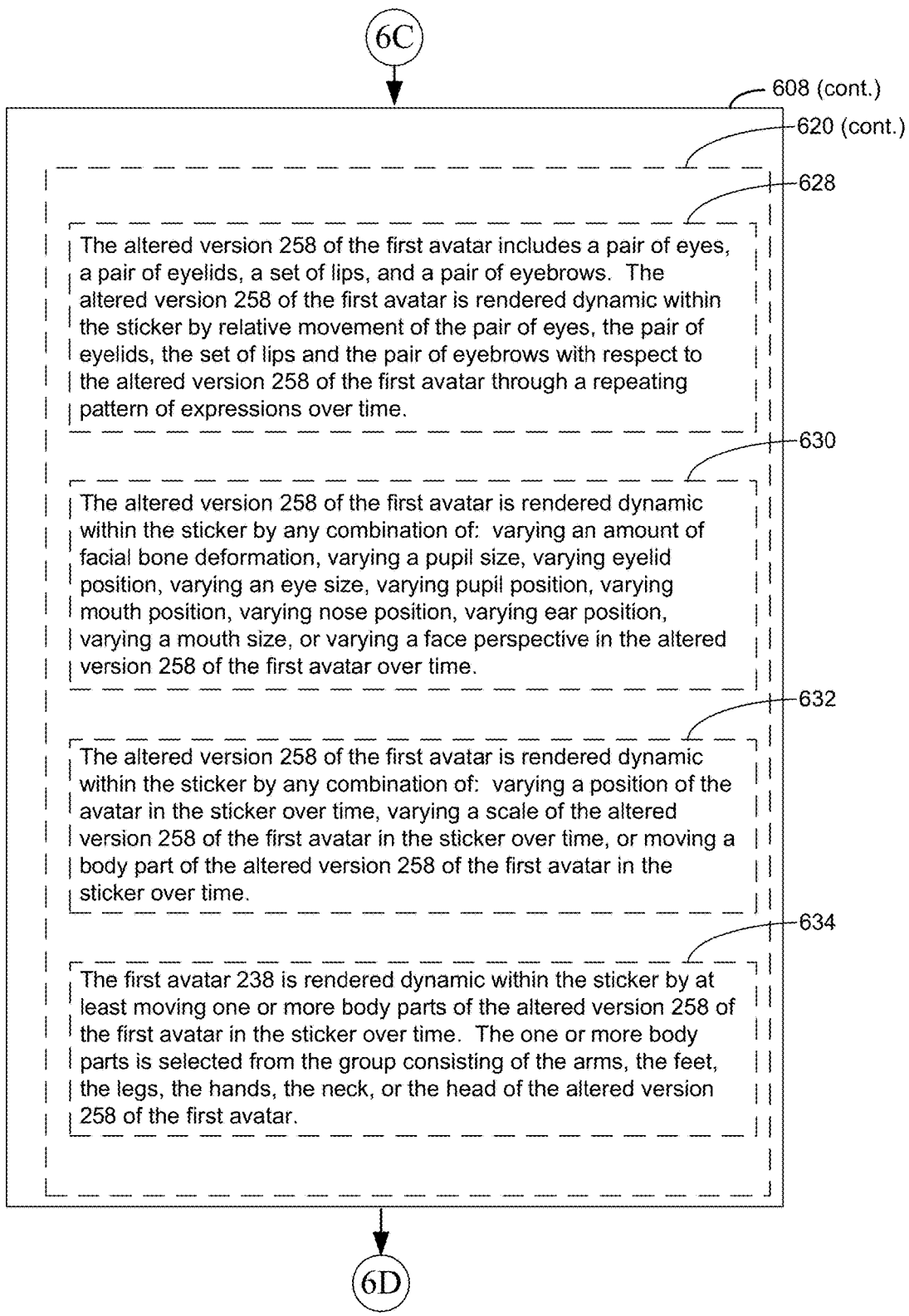

Referring to block 628 of FIG. 6D, in some embodiments, the altered version 258 of the first avatar includes a pair of eyes, a pair of eyelids, a set of lips, and a pair of eyebrows. The altered version 258 of the first avatar is rendered dynamic within the sticker by relative movement of the pair of eyes, the pair of eyelids, the set of lips and the pair of eyebrows with respect to the altered version 258 of the first avatar through a repeating pattern of expressions over time. For instance, referring to FIG. 17, in some embodiments, the altered version 258 of the first avatar is rendered dynamic by moving the eyebrows of the depicted avatar 258-1 within the sticker 256 through a repeating pattern over time. For example, the eyebrows of the depicted avatar 258-1 within the sticker 256 are posed within the sticker in a first position (e.g., lowered) for few milliseconds, then posed within the sticker in a second position (e.g., straight) for a few milliseconds, and then posed within the sticker in a third position (e.g., raised) for a few milliseconds. This sequence is then repeated with the eyebrows returning to the first position, and then cycling through the second and third position over and over again. In some embodiments, the repeating pattern has three discrete independent positions that are cycled through as outlined above. More typically, the repeating pattern has ten or more discrete independent positions that are cycled through, or one hundred or more discrete independent positions that are cycled through. In some embodiments, each position is depicted for at least one millisecond, at least 10 milliseconds, at least 100 milliseconds, or at least 250 milliseconds before moving on to the next position.

Referring to block 630 of FIG. 6D, in some embodiments the altered version 258 of the first avatar is rendered dynamic within the sticker by any combination of: varying an amount of facial bone deformation, varying a pupil size, varying eyelid position, varying an eye size, varying pupil position, varying mouth position, varying nose position, varying ear position, varying a mouth size, or varying a face perspective in the altered version 258 of the first avatar over time.

As another example, referring to FIG. 17, in some embodiments, the altered version 258 of the first avatar is rendered dynamic (e.g., within the sticker) by changing the size of the eyes of the depicted avatar 258-1 within the sticker 256 over time, moving the eyelids of the depicted avatar 258-1 within the sticker 256 through a first repeating pattern over time, and moving the lips of the depicted avatar 258-1 within the sticker 256 through a second repeating pattern over time, and/or moving the eyebrows of the depicted avatar 258-1 within the sticker 256 through a third repeating pattern over time where the first, second, and third repeating pattern is the same or different. That is, they may have different numbers of independent positions that are cycled through, and on different timing schedules (e.g., each independent position of the first repeating pattern may be rendered in the sticker 256 for a different amount of time than each independent position of the second repeating pattern).

Referring to block 632 of FIG. 6D, in some embodiments the altered version 258 of the first avatar is rendered dynamic within the sticker (e.g., within the sticker) by any combination of: varying a position of the avatar in the sticker over time, varying a scale of the altered version 258 of the first avatar in the sticker over time, or moving a body part of the altered version 258 of the first avatar in the sticker over time.

Referring to block 634 of FIG. 6D, in some embodiments the first avatar 238 is rendered dynamic within the sticker (e.g., within the sticker) by at least moving one or more body parts of the altered version 258 of the first avatar in the sticker over time. the one or more body parts is selected from the group consisting of the arms, the feet, the legs, the hands, the neck, or the head of the altered version 258 of the first avatar.

Figure 6E:
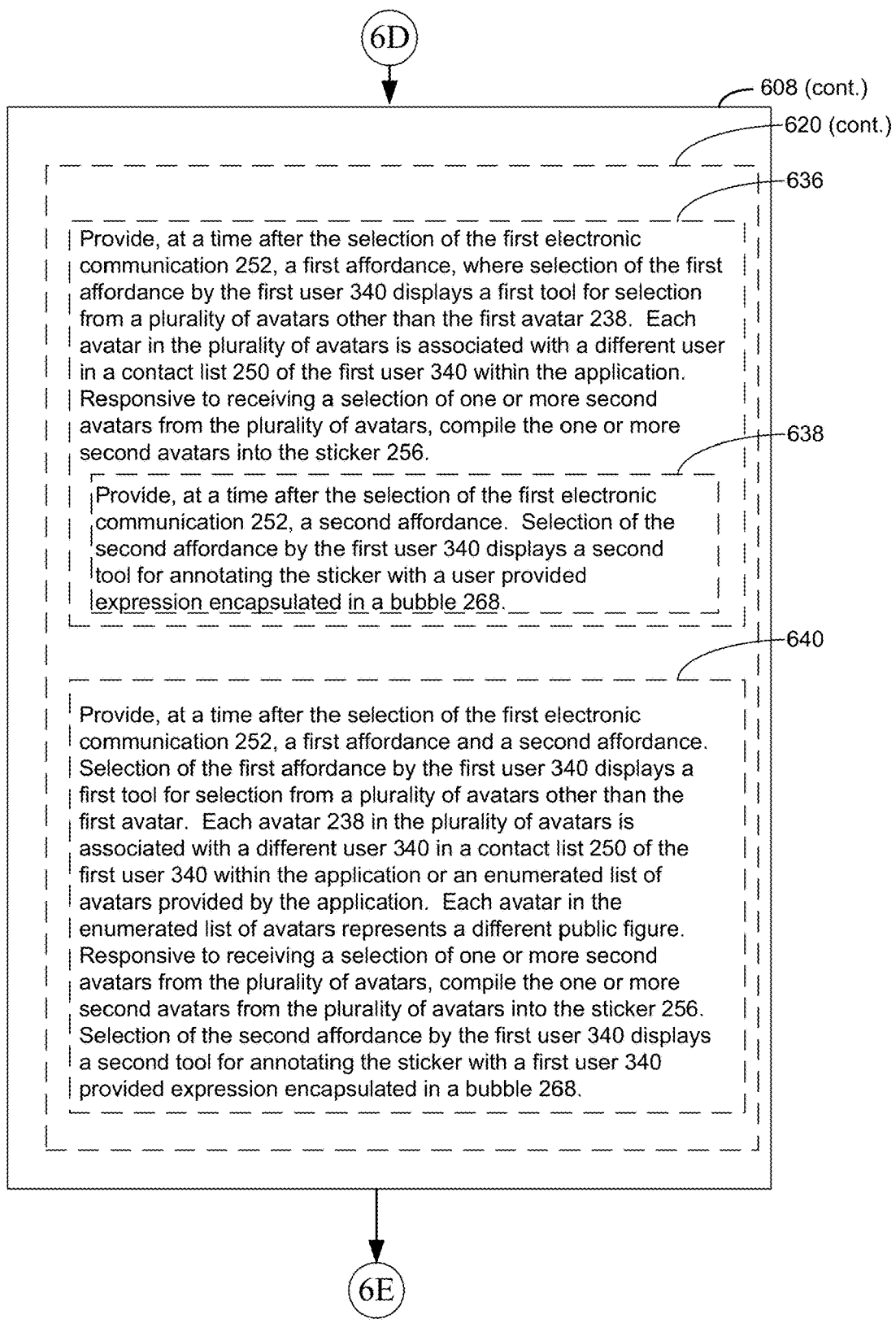

Referring to block 636 of FIG. 6E, in some embodiments the client application 236 provides at a time after the selection of the first electronic communication 252, a first affordance (e.g., a check box, a radio button, a slide bar, an input field, a radio button, a drop-down menu, a shopping cart, etc.). Selection of the first affordance by the first user 340 displays a first tool for selection from a plurality of avatars other than the first avatar 238. Each avatar in the plurality of avatars is associated with a different user in a contact list 250 of the first user 340 within the application. Responsive to receiving a selection of one or more second avatars from the plurality of avatars, the client application 236 compiles the one or more second avatars into the sticker 256. Referring to block 638 of FIG. 6E, in some embodiments, the client application 236 provides, at a time after the selection of the first electronic communication 252, a second affordance (e.g., a check box, a radio button, a slide bar, an input field, a radio button, a drop-down menu, a shopping cart, etc.). Selection of the second affordance by the first user 340 displays a second tool for annotating the sticker with a user provided expression encapsulated in a bubble 268.

Referring to block 640 of FIG. 6E, in some embodiments, the client application 236 provides, at a time after the selection of the first electronic communication 252, a first affordance and a second affordance (e.g., a check box, a radio button, a slide bar, an input field, a radio button, a drop-down menu, a shopping cart, etc.). Selection of the first affordance by the first user 340 displays a first tool for selection from a plurality of avatars other than the first avatar. Each avatar 238 in the plurality of avatars is associated with a different user 340 in a contact list 250 of the first user 340 within the application or an enumerated list of avatars provided by the application. Each avatar in the enumerated list of avatars represents a different public figure. Responsive to receiving a selection of one or more second avatars from the plurality of avatars, the network communication module 234 compiles the one or more second avatars from the plurality of avatars into the sticker 256. Selection of the second affordance by the first user 340 displays a second tool for annotating the sticker with a first user 340 provided expression encapsulated in a bubble 268.

Figure 6F:
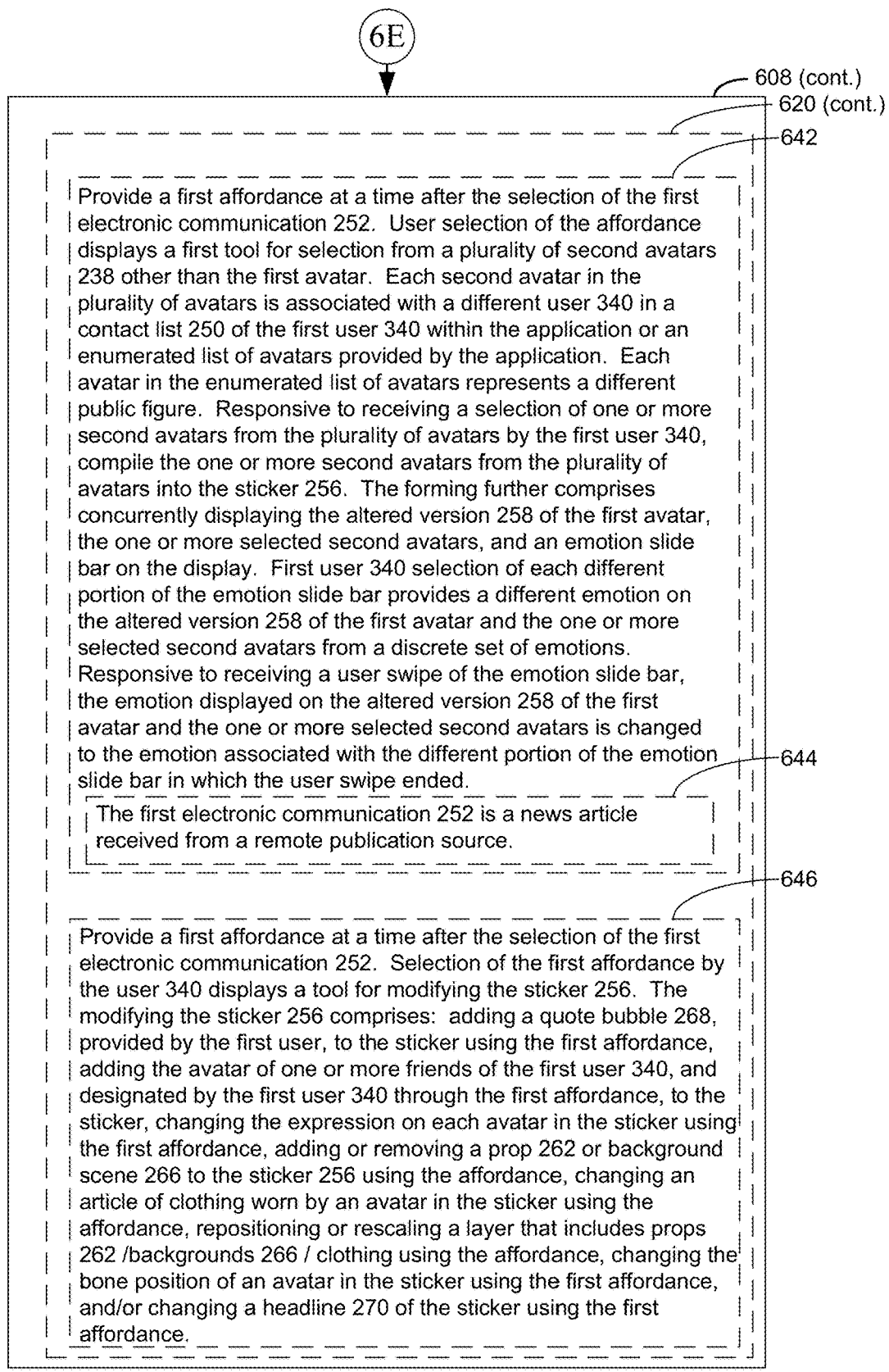

Referring to block 642 of FIG. 6F, in some embodiments, network communication module 234 provide a first affordance at a time after the selection of the first electronic communication 252. User selection of the affordance displays a first tool for selection from a plurality of second avatars 238 other than the first avatar. Each second avatar in the plurality of avatars is associated with a different user 340 in a contact list 250 of the first user 340 within the application or an enumerated list of avatars provided by the application. Each avatar in the enumerated list of avatars represents a different public figure. Responsive to receiving a selection of one or more second avatars from the plurality of avatars by the first user 340, the client application 236 compiles the one or more second avatars from the plurality of avatars into the sticker 256. The forming further comprises concurrently displaying the altered version 258 of the first avatar, the one or more selected second avatars, and an emotion slide bar on the display. First user 340 selection of each different portion of the emotion slide bar provides a different emotion on the altered version 258 of the first avatar and the one or more selected second avatars from a discrete set of emotions. An example of this is illustrated in FIG. 16. First user selection of each different portion 1602 of the emotion slide bar 1602 displays a different emotion on the altered version 258 of the first avatar and each second avatar in the one or more second avatars from a discrete set of emotions. Responsive to receiving a user swipe of the emotion slide bar 1602, the emotion displayed on the altered version 258 of the first avatar and the one or more selected second avatars is changed to the emotion associated with the different portion 1604 of the emotion slide bar 1602 in which the user swipe ended.

Referring to block 644 of FIG. 6F, in some embodiments the first electronic communication 252 is a news article received from a remote publication source. For instance, in some embodiments the remote publication source is CABLE NEWS NETWORK (CNN), FOX NEWS, REUTERS, or the ASSOCIATED PRESS and the news article is published by one of these remote publication sources over communication network 104.

Referring to block 646 of FIG. 6F, in some embodiments the client application 236 provides a first affordance (e.g., a check box, a radio button, a slide bar, an input field, a radio button, a drop-down menu, a shopping cart, etc.) at a time after the selection of the first electronic communication 252. Selection of the first affordance by the user 340 displays a tool for modifying the sticker 256. The modifying the sticker 256 in accordance with block 646 comprises adding a quote bubble 268, provided by the first user, to the sticker using the first affordance, adding the avatar of one or more friends of the first user 340, and designated by the first user 340 through the first affordance, to the sticker, changing the expression on each avatar in the sticker using the first affordance, adding or removing a prop 262 or background scene 266 to the sticker 256 using the affordance, changing an article of clothing worn by an avatar in the sticker using the affordance, repositioning or rescaling a layer that includes props 262/backgrounds 266/clothing using the affordance, changing the bone position of an avatar in the sticker using the first affordance, and/or changing a headline 270 of the sticker using the first affordance.

In some embodiments, the modifying the sticker 256 in accordance with block 646 comprises associating a sound construct 260, selected by the first user, to the sticker 256. In some embodiments, the sound construct 260 is sound recorded by the first user, such as a recorded message made by the first user. In some embodiments, the sound construct 260 is less than three seconds, less than 10 seconds, less than 30 seconds, less than one minute or less than 5 minutes of sound recorded in an uncompressed audio format, pulse-code modulation (PCM) format, waveform audio file (WAV) format, audio interchange file format (AIFF), MPEG-Audio Layer 3 (MP3) format, advanced audio coding (AAC) format, OGG (Vorbis) format, WINDOWS media audio (WMA) format, free lossless audio (FLAC) format, APPLE lossless audio codec (ALAC) format, WINDOWS media audio (WMA) format, or some other format. In some embodiments, the sound construct is a song or a part of a song. In some embodiments, the sound construct 260 comprises a sound effect, such as horns blowing, a crowd cheering, a crowd booing, or person crying, or a person laughing, etc.

In some embodiments, the modifying the sticker 256 in accordance with block 646 comprises adding or removing a prop 262 to the sticker using the affordance. For instance, FIG. 15 illustrates a prop 262 in the sticker 256. Non-limiting examples of props 262 a user can use to modify the sticker in accordance with block 446 includes furniture, tools, flags, balloons, signs, crosses, weapons, garbage cans, animals, cages, or other objects. In some embodiments, the user selects the prop 262 for inclusion in the sticker 256 from a stock panel of props offered by client application 236. In some embodiments, the user is able to add their own props 262 the stock panel of props offered by client application 236 for inclusion in the sticker 256 in accordance with block 446.

In some embodiments, the modifying the sticker 256 in accordance with block 646 comprises adding a background scene 266 to the sticker 256 using the affordance. FIG. 15 illustrates one such background scene 266, which is highlighted with a dotted line (which is not part of the sticker 256). The background scene 266 of FIG. 15, by way of illustration, includes birds being targeted with guns.

In some embodiments, the modifying the sticker 256 in accordance with block 646 comprises adding and/or changing a headline 270 of the sticker using the first affordance. FIG. 15 illustrates a headline 270. If the user does not edit the headline 270, the headline 270 is the sticker provided in the original default electronic communication 252 that the user selected at the outset.

Server Implementations and Bridge Tool.

Figure 7A:
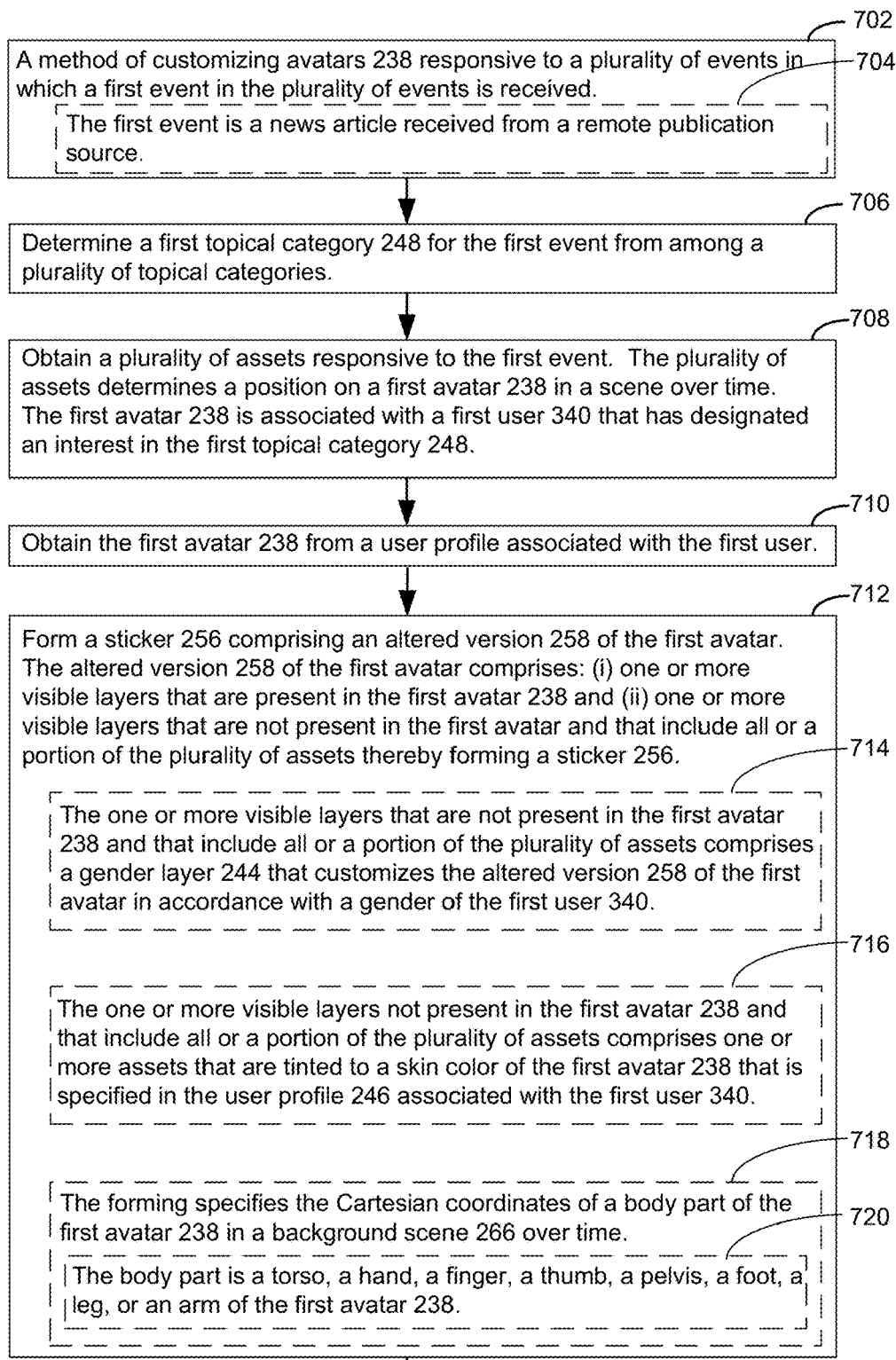
FIGS. 7A, 7B, and 7C are flow diagrams collectively illustrating a method of customizing an avatar in accordance with some embodiments.
Figure 7B:
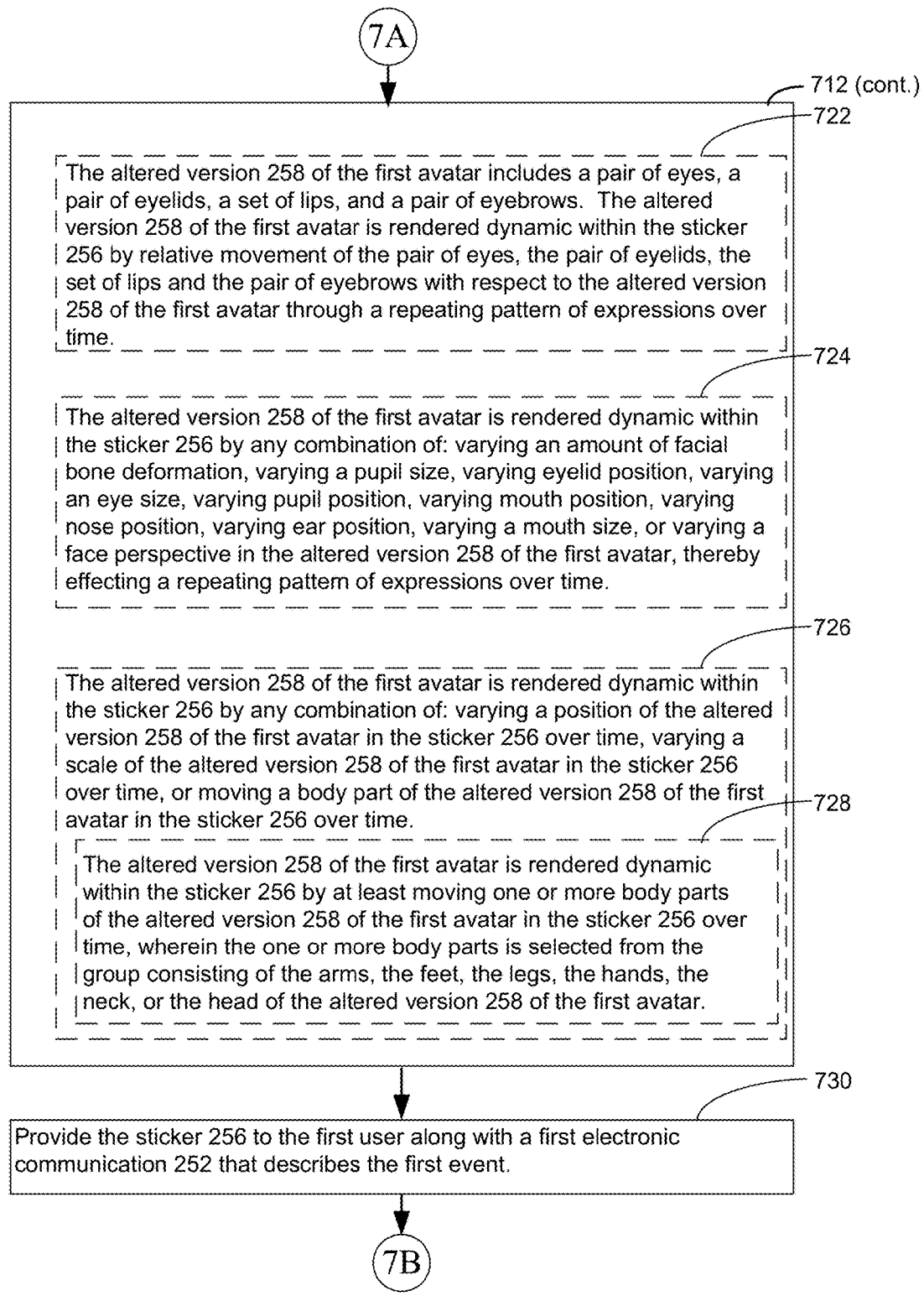
Figure 7C:
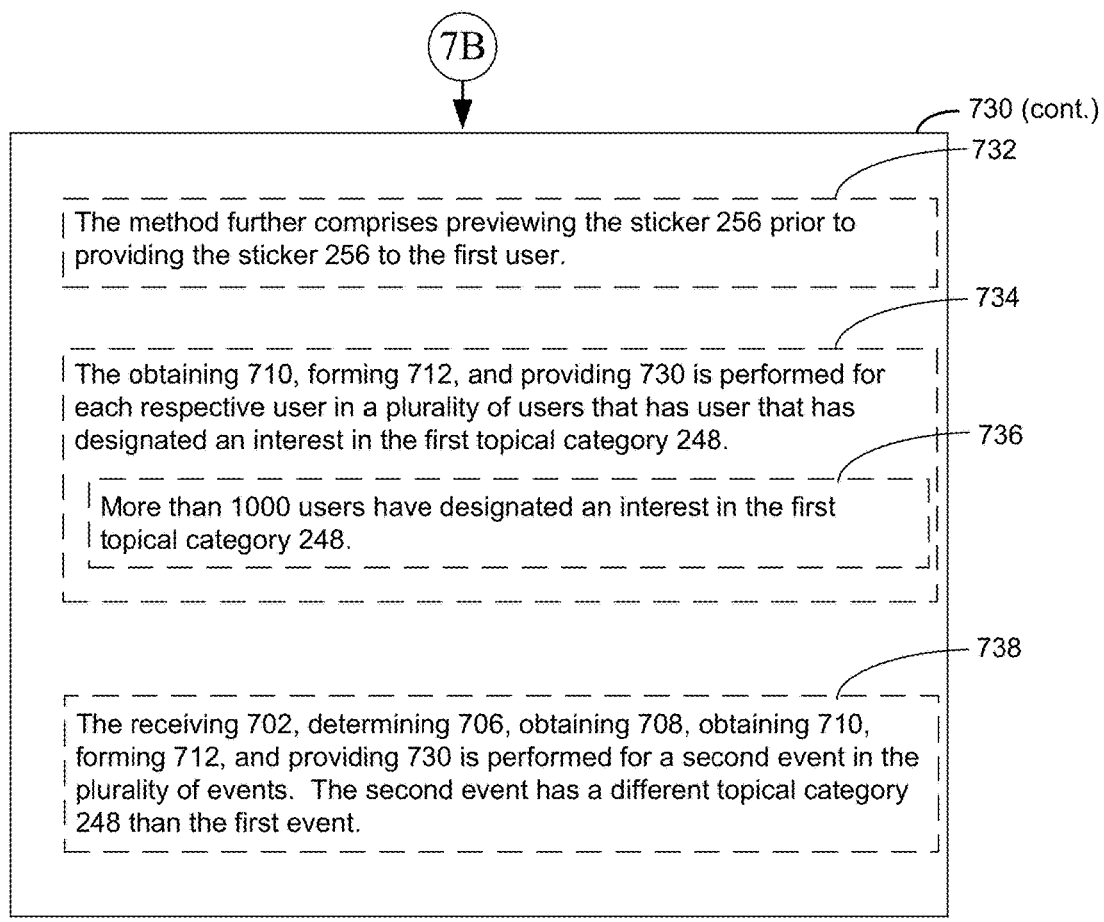

Referring to FIG. 7, a server implementation bridge tool in accordance with some aspects of the present disclosure is provided. In some embodiments, the server implementation bridge tool is a component of application server module 108 illustrated in FIGS. 1 and 3.

Referring to block 702, this aspect of the present disclosure provides a method of customizing avatars 238 responsive to a plurality of events in which a first event in the plurality of events is received. Referring to block 704, in some embodiments, the first event is a news article received from a remote publication source. Referring to block 706 of FIG. 7A, in some embodiments, a first topical category 248 is determined for the first event from among a plurality of topical categories. Then, referring to block 708, a plurality of assets is obtained responsive to the first event. The plurality of assets determines a position on a first avatar 238 in a scene over time. The first avatar 238 is associated with a first user 340 that has designated an interest in the first topical category 248.

In response to an event, described in an electronic communication 252, a designer, illustrator, and/or animator operating in conjunction with server system 106 can design a sticker 256 that describes the event. For instance, consider the hypothetical event in which TWITTER stock plunges and that TWITTER stockholders have begun to retaliate. A designer, illustrator, and/or animator builds a sticker 256 that includes background 266 illustrated in FIG. 15, that is blue birds representing TWITTER being shot at. This sticker can then be imported into the "Scene Builder" bridge tool 1902 illustrated in FIG. 19. In some embodiments, the initial template sticker 256 designed by a designer, illustrator, and/or animator in response to an electronic communication 252 concerning an event is designed in a commercial application such as ADOBE PHOTOSHOP. Regardless of its originating source, all the assets associated with the designed sticker 256 made responsive to the event in the electronic communication 252 are imported into the scene builder module 1902 for further modification by a designer, illustrator, and/or animator before sending the final product to an end client user as a sticker for the end client user to then modify and share with select contacts of the end client user.

In some embodiments, the assets associated with the designed sticker 256 made responsive to the event in the electronic communication 252 that are imported into the Scene Builder 1902 constitute a plurality of layers. Advantageously, the scene builder module allows a user to rearrange or adjust each of the assets. For instance, affordances X 1902, Y 1904, and Z 1906 respectively allow a user to independently position assets relative to each other along the X, Y, and Z Cartesian axes of the scene. Affordance 1908 allows the designer to independently scale each of the assets to different sizes within the scene, while affordance 1910 allows the designer to independently rotate each of the assets with respect to the overall scene. Affordances 1912, 1914, 1916, and 1918 respectively allow the designer to promote an asset forward relative to other assets, send an asset backward relative to other assets, bring an asset to the front before all other assets, and send an asset to the back behind all other assets. In some embodiments, a layer is a sprite sheet animation. A sprite sheet is a bitmap image file that contains several smaller graphics in a tiled grid arrangement. By compiling several graphics into a single data construct, the sticker, the enable animation of the layer in other applications that receive the sticker.

Advantageously, the bridge tool 1902 allows the designer to designate which layers within a sticker 256 will be visible to which users. This is useful, for instance, for customizing the sticker 256 in a gender specific manner. For instance, for each layer, the designer can designate permissions such as "show this layer to all our users," show this layer to male users, "show this layer to female users." This allows the designer to use bridge tool 1902 to have each user wear custom clothes, for instance the designer will make a male shirt in a layer that is only visible to male users, a female shirt in a layer that is only visible to female user, and so forth.

Advantageously further, the bridge tool 1902 can be used to tint a layer. Consider the case where the designer wants a sticker 256 where the altered avatar 258 has comically large hands. The designer can draw hands (or import an asset depicting hands) that are not part of the avatar's original hands. The designer then matches the user's avatar's skin colors, to tint the new hands to the user's skin color. The bridge tool 1902, or software working in conjunction with the bridge tool 1902 then, creates the sticker 256 containing the altered avatar 258 with a layer of tinting and then gender.

Panels 1920 "User Avatar" and 1922 "Friend Avatar" allow the designer to input the data from a commercial software package to position an avatar 238 to thereby form altered avatar 258. For instance, the designer can use panels 1920 and 1922 to adjust avatar body positions (e.g., place the avatar's arm up, place the avatar's leg up, etc.) The designer, illustrator, and/or animator can also upload other assets to do some facial modification. The designer, illustrator, and/or animator can also upload full avatar body movement/animations.

Expression options panel 1924 of the bridge tool 1902 allows the user to animate avatar facial expressions. Because very fast turnaround is needed between event notification and electronic communication distribution 252 with stickers 256 highly specific, but focused, animation tools are provided in some embodiments. Consider the case where the designer, responsive to an event, is designing a first sticker 256 where the altered avatar 258 is holding a golf club and the designer is designing a second sticker 256 where the altered avatar is holding a baseball bat. In both stickers 256 an animated expression may be desired: in the golf club sticker the designer wants to convey a face looking downwards whereas in the baseball sticker the designer wants to convey a face looking upwards. Advantageously, to support this type of avatar alteration, the disclosed systems and methods provide a library of animated expressions. In some embodiments there are more than 100 versions of each expression. The designer picks from among these expressions, which are accessed through panel 1924. For instance, as illustrated in panel 1924, the designer can quickly set which direction the altered avatar 258 eyes are focused, whether the eyes are blinking, mouth movement and face perspective. Thus, the designer can use panel 1924 to designate whether the pupils of the altered avatar 258 are to move or to be fixed. The designer can use panel 1924 to designate whether the eyes of the altered avatar 258 are to be able to blink or not. The designer can use panel 1924 to designate whether the mouth of the altered avatar 258 is to move or not. The designer can use panel 1924 to designate whether the face of the altered avatar 258 is to move or not. Further, the designer can use affordance 1926 to pick an actual expression from a library of expressions.

Furthermore, the bridge tool 1902 provides body presets 1928. Consider the case where the designer wants the altered avatar 258 to be parasailing in response to an event or to be in a spacesuit in response to an event. In such instances, body presets 1928 are invoked to insert only portions of the altered avatar 258 into a sticker 256 (e.g., "insert only the head" of the actual avatar into the sticker 256). Then the designer can just add a layer that includes a spacesuit. In this way, the avatar appears to be in a spacesuit. Likewise, body presets 1928 of bridge tool 1902 has presets for avatars without legs. This is useful in situations where the designer, for example, wants the altered avatar that will be appearing in a sticker 256 to be skates. In such an instance, the designer would make a gendered, painted asset, and then put on a legless avatar body to the asset in order to form a sticker 256 that conveys the image of an avatar on skates.

Thus, the bridge tool 1902 allows a designer to develop a sticker 256 for each user event possible. In some embodiments, the bridge tool 1902 provides over 3 million different avatar combinations. The bridge tool 1902 serves as a way to acquire assets from commercial packages that serve as the props 262, foreground elements 264, and background 266 of scenes. Moreover, the bridge tool 1902 allows for the rearrangement, scaling, and coloring of these components, and to determine which client user stickers 256 get which components (e.g., as in the gender example discussed above). One of the assets acquired is the base avatar 238 of each prospective client user. This base avatar 238 is then modified using the bridge tool 1902 to form the altered avatar 258 that appears to be reacting to the event associated with an electronic communication 252. The bridge tool is advantageously in the form of a computer graphic interface because designers prefer to work visually rather than programmatically. FIGS. 20 and 21 illustrate example animated stickers in accordance with an aspect of the present disclosure.

As such, the bridge tool 1902 enhances a work flow in which a news or another form of event breaks. When this occurs, a brief writer, within 10 to 15 minutes, writes up a description almost like a director on what the brief write thinks the sticker describing the event should look like. Then, a designer/illustrator makes the sticker and mocks it up, sketching it out within an hour. The designer can use the bridge tool 1902 tool once the sticker 256 is ready to be sent out to users so that such users can get the electronic communication 252 conveying the event and the proposed sticker 256 that shows the altered avatar 258 reacting to the event, within their respective client applications 236. In some embodiments, this entire work flow occurs within an hour or two of the breaking of the event.

Thus, consider the case where there are 100 client users that are all interested in the Golden State Warriors. Consider further that the Warriors win a game. It is determined that this is newsworthy. So, a summary of the game is made and the disclosed systems and methods are used to communicate this to the 100 relevant users. As such, a sticker is designed that conveys the Warriors winning, and then for each respective user of the 100 users, the respective user's avatar 238 is modified and incorporated, as an altered avatar 258, into the sticker 256 received by that user in conjunction with a headline in the sticker conveying that the Warriors won the game, where the altered avatar shows their favorable reaction to their favorite team winning a game. The avatars for those 100 people are all different, so the disclosed systems and methods must pull up each of the 100 different default avatars and change their expression in the manner specified by the bridge tool 1902 in order to form the 100 different stickers for the 100 different users. This scale is merely exemplary. In fact, in more typical instances, there are 1000 or more different targeted users for a given electronic communication, each requiring a unique sticker 256 using the disclosed techniques, there are 10,000 or more different targeted users for a given electronic communication, each requiring a unique sticker 256 using the disclosed techniques, 100,000 or more different targeted users for a given electronic communication, each requiring a unique sticker 256 using the disclosed techniques, or 1,000,000 or more different targeted users for a given electronic communication, each requiring a unique sticker 256 using the disclosed techniques. Thus, the disclosed systems and methods take what a designer has implemented through the bridge tool 1902 and outputs hundreds, thousands, tens of thousands, or millions of different stickers, one for each client user.

Thus, in typical embodiments, the bridge tool 1902 is focused on the components of an avatar 238 that have to do with expression, but don't have to do with hair color or skin color or all the other things that are coded in the base avatar 238 that were set up by the user, using for example the processes outlined in FIGS. 9 through 12. In typical embodiments, the bridge tool 1902 modifies avatar body position, a gender layer, a tint layer, expression, or body presets. Thus, for example, consider the case where the Incredible Hulk has a new movie coming out and it is contemplated that a lot of stickers about the Incredible Hulk will be needed. An Incredible Hulk Body Preset can be added to bridge tool 1902 component 1928 that will take any user's avatar's skin color, whatever it is, and turn it green. So the designer in this tool, using Body Presets 1928, selects the Incredible Hulk body preset and the avatar 238 of every single user gets the selected body Preset: e.g., the body preset could constitute an added big nose, small nose, whatever, with the skin color turned green in forming the sticker 256 that includes the altered avatar 258 showing that user's avatar reacting an electronic communication pertaining to the Incredible Hulk movie. Thus, advantageously, the bridge tool 1902 can be used to specify several different things about the avatar that then get globally processed against many, unique avatars that were each created by a user. As such, the designer does not have to go in and change everybody's avatar manually. They use the bridge tool 1902 to just change a unique set of features that are applied to each avatar 238 to thereby form the unique avatars 258 responsive to an event that are in the stickers 256. In some embodiments, the avatar 238 is put into a sticker verbatim, e.g., with no changes. More typically, the bridge tool 1902 is used to form altered avatars in which, for example, hats or wigs have been put on them (e.g., to represent Donald Trump) or clothing has been changed, etc.

In this way, the client application 236 is self-promoting in the sense that it is going to strike a chord with some client users—the altered avatar that comes out—and they will laugh and see themselves with this quite unique expression that is unique in that it is what their reaction would have been themselves as a person to an event. And then they will share it with other users. The ability to include the altered avatar of a friend just adds to the uniqueness of the sticker 256 that is derived. Further, the ability of the user to add a message in a bubble to the sticker 256 adds to the uniqueness of the sticker 256 that is derived for an event. As such, the disclosed systems and methods are combining (1) a user's chosen avatar 238 for themselves coupled with a designer's modifications in reaction to something newsworthy, that newsworthy thing being something that the user themselves said was a category that they would be interested in. Further, the user can add a friend or not add a friend. Further, the user can add a bubble or not add a bubble message. The user can then share the sticker 256 with people on a timely basis in reaction to the news or other types of events.

Accordingly, in some embodiments the first avatar 238 is obtained from a user profile associated with the first user. Then, referring to block 712, a sticker 256 is formed comprising an altered version 258 of the first avatar. The altered version 258 of the first avatar comprises: (i) one or more visible layers that are present in the first avatar 238 and (ii) one or more visible layers that are not present in the first avatar and that include all or a portion of the plurality of assets thereby forming a sticker 256. Referring to block 714, in some embodiments the one or more visible layers that are not present in the first avatar 238 comprises a gender layer 244 that customizes the altered version 258 of the first avatar in accordance with a gender of the first user 340. Referring to block 716, in some embodiments, the one or more visible layers not present in the first avatar 238 and that include all or a portion of the plurality of assets comprises one or more assets that are tinted to a skin color of the first avatar 238 that is specified in the user profile 246 associated with the first user 340. Referring to block 718, in some embodiments the forming specifies the Cartesian coordinates of a body part of the first avatar 238 in a background scene 266 over time. Referring to block 720, in some embodiments, the body part is a torso, a hand, a finger, a thumb, a pelvis, a foot, a leg, or an arm of the first avatar 238.

Referring to block 722, in some embodiments, the altered version 258 of the first avatar includes a pair of eyes, a pair of eyelids, a set of lips, and a pair of eyebrows. The altered version 258 of the first avatar is rendered dynamic within the sticker 256 by relative movement of the pair of eyes, the pair of eyelids, the set of lips and the pair of eyebrows with respect to the altered version 258 of the first avatar through a repeating pattern of expressions over time.

Referring to block 724, in some embodiments, the altered version 258 of the first avatar is rendered dynamic within the sticker 256 by any combination of: varying an amount of facial bone deformation, varying a pupil size, varying eyelid position, varying an eye size, varying pupil position, varying mouth position, varying nose position, varying ear position, varying a mouth size, or varying a face perspective in the altered version 258 of the first avatar, thereby effecting a repeating pattern of expressions over time.

Referring to block 726, in some embodiments, the altered version 258 of the first avatar is rendered dynamic within the sticker 256 by any combination of: varying a position of the altered version 258 of the first avatar in the sticker 256 over time, varying a scale of the altered version 258 of the first avatar in the sticker 256 over time, or moving a body part of the altered version 258 of the first avatar in the sticker 256 over time.

Referring to block 728, in some embodiments, the altered version 258 of the first avatar is rendered dynamic within the sticker 256 by at least moving one or more body parts of the altered version 258 of the first avatar in the sticker 256 over time, where the one or more body parts is selected from the group consisting of the arms, the feet, the legs, the hands, the neck, or the head of the altered version 258 of the first avatar.

Referring to block 730, in some embodiments, the sticker 256 is provided to the first user along with a first electronic communication 252 that describes the first event.

Referring to block 732, in some embodiments, the method further comprises previewing the sticker 256 prior to providing the sticker 256 to the first user (e.g., using the bridge tool 1902).

Referring to block 733, in some embodiments, the obtaining 710, forming 712, and providing 730 is performed for each respective user in a plurality of users that has user that has designated an interest in the first topical category 248. For instance, referring to block 736, in some embodiments, more than 1000 users, more than 10,000 users, or more than 100,000 users have designated an interest in the first topical category 248.

Referring to block 733, in some embodiments the receiving of block 702, the determining of block 706, the obtaining of block 708, the obtaining of block 710, the forming of block 712, and the providing of block 730 are performed for a second event in the plurality of events, where the second event has a different topical category 248 than the first event.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method of customizing a first avatar responsive to an event, the method comprising:
   A) receiving a first event from a remote source;
   B) determining a first topical category for the first event from among a plurality of topical categories;
   C) obtaining a plurality of assets and a scene that are each responsive to the first event, wherein each respective asset in the plurality of assets determines a position of a portion of the first avatar in the scene over time, wherein the scene provides contextual information related to the first event, and wherein the first avatar is associated with a first user that has designated an interest in the first topical category;
   D) obtaining the first avatar from a user profile associated with the first user;
   E) forming a sticker comprising the scene with an altered version of the first avatar overlaid on the scene, wherein the altered version of the first avatar comprises: (i) one or more visible layers that are present in the first avatar obtained from the user profile and (ii) one or more visible layers that are not present in the first avatar obtained from the user profile and that include all or a portion of the plurality of assets, and wherein the forming the sticker comprises dynamic rendering of the scene based on one or more animated props and/or one or more background elements;
   F) providing the sticker to the first user; and
   G) responsive to input from the first user, sharing the sticker with a plurality of users designated by the first user.

2. The method of claim 1, wherein the providing F) further provides to the first user a first electronic communication that describes the first event.

3. The method of claim 1, wherein one or more visible layers that are not present in the first avatar and that include all or a portion of the plurality of assets comprises a gender layer that customizes the altered version of the first avatar in accordance with a gender of the first user.

4. The method of claim 1, wherein one or more visible layers that are not present in the first avatar and that include all or a portion of the plurality of assets comprises one or more assets that are tinted to a skin color of the first avatar that is specified in the user profile associated with the first user.

5. The method of claim 1, wherein the forming E) specifies the Cartesian coordinates of a body part of the first avatar in the scene over time.

6. The method of claim 5, wherein the body part is a torso, a hand, a finger, a thumb, a pelvis, a foot, a leg, or an arm of the first avatar.

7. The method of claim 1, the method further comprising previewing the sticker at a remote location prior to providing the sticker to the first user.

8. The method of claim 1, wherein the obtaining D), forming E), and providing F) is performed for each respective user, in a plurality of users, that has designated an interest in the first topical category.

9. The method of claim 8, wherein more than 1000 users have designated an interest in the first topical category.

10. The method of claim 1, wherein the first event is a news article received from a remote publication source.

11. The method of claim 1, wherein
   the altered version of the first avatar includes a pair of eyes, a pair of eyelids, a set of lips, and a pair of eyebrows, and
   the altered version of the first avatar is rendered dynamic within the sticker by relative movement of the pair of eyes, the pair of eyelids, the set of lips and the pair of eyebrows with respect to the altered version of the first avatar through a repeating pattern of expressions over time.

12. The method of claim 1, wherein the altered version of the first avatar is rendered dynamic within the sticker by any combination of: varying an amount of facial bone deformation, varying a pupil size, varying eyelid position, varying an eye size, varying pupil position, varying mouth position, varying nose position, varying ear position, varying a mouth size, or varying a face perspective in the altered version of the first avatar, thereby effecting a repeating pattern of expressions over time.

13. The method of claim 1, wherein the altered version of the first avatar is rendered dynamic within the sticker by any combination of: varying a position of the altered version of the first avatar in the sticker over time, varying a scale of the altered version of the first avatar in the sticker over time, or moving a body part of the altered version of the first avatar in the sticker over time.

14. The method of claim 1, wherein the altered version of the first avatar is rendered dynamic within the sticker by at least moving one or more body parts of the altered version of the first avatar in the sticker over time, wherein the one or more body parts is selected from the group consisting of the arms, the feet, the legs, the hands, the neck, or the head of the altered version of the first avatar.

15. The method of claim 1, wherein
   the method further comprises accepting a modification sticker from the first user, and
   the sharing G) comprises sharing the modification of the sticker with the plurality of users designated by the first user.

16. The method of claim 15, wherein the modification of the sticker is the addition by the first user of a message in a bubble on the sticker.

17. The method of claim 15, wherein the modification of the sticker is the addition by the first user of an avatar of a friend of the first message on the sticker in addition to the altered version of the first avatar.

18. The method of claim 15, wherein the modification of the sticker is the association of a sound construct selected by the first user to the sticker.

19. The method of claim 15, wherein the modification of the sticker is the addition of a background scene selected by the first user to the sticker.

20. The method of claim 15, wherein the modification of the sticker is the addition to the sticker of a headline message selected by the first user.

21. The method of claim 1, wherein
   the first event is a victory achieved by a sports team,
   the contextual information related to the first event conveys the victory achieved by the sports team, and
   the one or more visible layers that are not present in the first avatar obtained from the user profile of the first user cause the first avatar to look like the first avatar has a favorable reaction to the victory achieved by the sports team in the sticker.

22. A computer system for customizing a first avatar responsive to an event in an application having the first avatar representing a first user, the computer system comprising at least one processor, a display, and memory storing at least one program for execution by the at least one processor, the at least one program comprising instructions for:

A) receiving a first event from a remote source;
B) determining a first topical category for the first event from among a plurality of topical categories;
C) obtaining a plurality of assets and a scene that are each responsive to the first event, wherein each respective asset in the plurality of assets determines a position of a portion of the first avatar in the scene over time, wherein the scene provides contextual information related to the first event, and wherein the first avatar is associated with a first user that has designated an interest in the first topical category;
D) obtaining the first avatar from a user profile associated with the first user;
E) forming a sticker comprising the scene with an altered version of the first avatar overlaid on the scene, wherein the altered version of the first avatar comprises: (i) one or more visible layers that are present in the first avatar obtained from the user profile and (ii) one or more visible layers that are not present in the first avatar obtained from the user profile and that include all or a portion of the plurality of assets, and wherein the forming the sticker comprises dynamic rendering of the scene based on one or more animated props and/or one or more background elements; and
F) providing the sticker to the first user; and
G) responsive to input from the first user, sharing the sticker with a plurality of users designated by the first user.

23. The computer system of claim 22, wherein the forming E) specifies the Cartesian coordinates of a body part of the first avatar in the scene over time.

24. The computer system of claim 22, wherein the providing F) further provides to the first user a first electronic communication that describes the first event.

25. The computer system of claim 22, wherein the at least one program provides a plurality of affordances that collectively permit a designer to independently position respective assets in the plurality of assets relative to each other along X, Y, and Z Cartesian axes of the scene.

26. The computer system of claim 22, wherein the at least one program provides an affordance that permits a designer to independently scale each asset in the plurality of assets to a different size in the scene.

27. The computer system of claim 22, wherein the at least one program enables a designer to specify a permission for a first layer in the one or more visible layers, and wherein the first layer is conditionally shown to the first user in the sticker when an attribute of the first user satisfies the permission.

28. The computer system of claim 22, wherein the avatar has a face with eyes and a mouth and the at least one program enables a designer to form the altered version of the first avatar by setting a direction the altered avatar eyes are focused, whether the eyes are blinking or not, whether the mouth is to moving or not and whether the face of the altered avatar is moving or not.

29. The computer system of claim 22, wherein that at least one program provides a plurality of affordances, wherein each respective affordance in the plurality of affordances is associated with a different portion of the first avatar and wherein invocation of a respective affordance in the plurality of affordances enables a designer to insert or not insert a corresponding portion of the first avatar into the sticker in the form of the altered version of the first avatar.

30. A non-transitory computer readable storage medium storing an application having a first avatar representing a first user, the application comprising instructions for:

A) receiving a first event from a remote source;
B) determining a first topical category for the first event from among a plurality of topical categories;
C) obtaining a plurality of assets and a scene that are each responsive to the first event, wherein each respective asset in the plurality of assets determines a position of a portion of the first avatar in the scene over time, wherein the scene provides contextual information related to the first event, and wherein the first avatar is associated with a first user that has designated an interest in the first topical category;
D) obtaining the first avatar from a user profile associated with the first user;
E) forming a sticker comprising the scene with an altered version of the first avatar overlaid on the scene, wherein the altered version of the first avatar comprises: (i) one or more visible layers that are present in the first avatar obtained from the user profile and (ii) one or more visible layers that are not present in the first avatar obtained from the user profile and that include all or a portion of the plurality of assets, and wherein the forming the sticker comprises dynamic rendering of the scene based on one or more animated props and/or one or more background elements; and
F) providing the sticker to the first user; and
G) responsive to input from the first user, sharing the sticker with a plurality of users designated by the first user.

31. The non-transitory computer readable storage medium of claim 30, wherein the forming E) specifies the Cartesian coordinates of a body part of the first avatar in the scene over time.

32. The non-transitory computer readable storage medium of claim 30, wherein the providing F) further provides to the first user a first electronic communication that describes the first event.

* * * * *